United States Patent [19]
Ludwig et al.

[11] Patent Number: 5,854,893
[45] Date of Patent: Dec. 29, 1998

[54] SYSTEM FOR TELECONFERENCING IN WHICH COLLABORATION TYPES AND PARTICIPANTS BY NAMES OR ICONS ARE SELECTED BY A PARTICIPANT OF THE TELECONFERENCE

[75] Inventors: Lester F. Ludwig, Foster City; J. Chris Lauwers, Menlo Park; Keith A. Lantz, Los Altos; Gerald J. Burnett, Atherton, all of Calif.; Emmett R. Burns, Incline Village, Nev.

[73] Assignee: Collaboration Properties, Inc., Incline Village, Nev.

[21] Appl. No.: 660,880

[22] Filed: Jun. 10, 1996

Related U.S. Application Data

[62] Division of Ser. No. 131,523, Oct. 1, 1993, Pat. No. 5,689,641.

[51] Int. Cl.⁶ ...................................................... G06F 13/00
[52] U.S. Cl. ................................ 395/200.34; 395/200.35; 395/200.57; 395/200.61; 395/200.76; 395/200.79
[58] Field of Search ....................... 395/200.34; 370/264; 358/400; 379/93.21

[56] References Cited

U.S. PATENT DOCUMENTS

| | | | |
|---|---|---|---|
| 3,723,653 | 3/1973 | Tatsuzawa | 348/17 |
| 3,873,771 | 3/1975 | Kleinerman et al. | 370/204 |

(List continued on next page.)

FOREIGN PATENT DOCUMENTS

| | | |
|---|---|---|
| 0 190 060 | 8/1986 | European Pat. Off. . |
| 0 354 370 | 12/1989 | European Pat. Off. . |

(List continued on next page.)

OTHER PUBLICATIONS

*Software Architecture for Integration of Video Services in the Etherphone System* by P. Venkat Rangan, and Daniel C. Swinehart (IEEE Journal on Selected Areas in Communications, vol. 9, No. 9 Dec. 1991).

*Multimedia Conferencing in the Etherphone Environment* by Harrick M. Vin, Polle T. Zellweger, Daniel C. Swinehart, and P. Venkat Rangan (Xerox Palo Alto Research Center) Oct. 1991.

(List continued on next page.)

*Primary Examiner*—Thomas C. Lee
*Assistant Examiner*—Anderson J. Chen
*Attorney, Agent, or Firm*—Cooley Godward LLP; Craig P. Opperman, Esq.

[57] ABSTRACT

A multimedia collaboration system that integrates separate real-time and asynchronous networks—the former for real-time audio and video, and the latter for control signals and textual, graphical and other data—in a manner that is interoperable across different computer and network operating system platforms and which closely approximates the experience of face-to-face collaboration, while liberating the participants from the limitations of time and distance. These capabilities are achieved by exploiting a variety of hardware, software and networking technologies in a manner that preserves the quality and integrity of audio/video/data and other multimedia information, even after wide area transmission, and at a significantly reduced networking cost as compared to what would be required by presently known approaches. The system architecture is readily scalable to the largest enterprise network environments. It accommodates differing levels of collaborative capabilities available to individual users and permits high-quality audio and video capabilities to be readily superimposed onto existing personal computers and workstations and their interconnecting LANs and WANs. In a particular preferred embodiment, a plurality of geographically dispersed multimedia LANs are interconnected by a WAN. The demands made on the WAN are significantly reduced by employing multi-hopping techniques, including dynamically avoiding the unnecessary decompression of data at intermediate hops, and exploiting video mosaicing, cut-and-paste and audio mixing technologies so that significantly fewer wide area transmission paths are required while maintaining the high quality of the transmitted audio/video.

24 Claims, 34 Drawing Sheets

U.S. PATENT DOCUMENTS

| | | |
|---|---|---|
| 3,974,337 | 8/1976 | Tatsuzawa ............................... 370/483 |
| 4,005,265 | 1/1977 | Verhoeckx et al. ...................... 348/482 |
| 4,210,927 | 7/1980 | Yumde et al. ............................. 348/23 |
| 4,441,180 | 4/1984 | Schussler et al. ...................... 359/123 |
| 4,516,156 | 5/1985 | Fabris et al. .............................. 348/15 |
| 4,529,839 | 7/1985 | Colton et al. ........................... 348/415 |
| 4,529,840 | 7/1985 | Colton et al. ............................. 348/15 |
| 4,531,024 | 7/1985 | Colton et al. ........................ 379/93.14 |
| 4,574,374 | 3/1986 | Scordo .................................... 370/265 |
| 4,645,872 | 2/1987 | Pressman et al. ........................ 348/15 |
| 4,650,929 | 3/1987 | Boerger et al. ........................... 348/15 |
| 4,710,917 | 12/1987 | Tomkins et al. ................... 395/200.34 |
| 4,837,798 | 6/1989 | Cohen et al. .............................. 379/88 |
| 4,961,211 | 10/1990 | Tsugane et al. .......................... 348/15 |
| 4,987,492 | 1/1991 | Stults et al. ............................... 348/15 |
| 4,995,071 | 2/1991 | Weber et al. .............................. 348/15 |
| 5,003,532 | 3/1991 | Ashida et al. ............................. 348/15 |
| 5,010,399 | 4/1991 | Goodman et al. ........................ 348/14 |
| 5,027,400 | 6/1991 | Baji et al. .................................. 348/20 |
| 5,042,062 | 8/1991 | Lee et al. .................................. 379/54 |
| 5,099,510 | 3/1992 | Blinken, Jr. et al. .................... 379/202 |
| 5,130,793 | 7/1992 | Bordry et al. ............................... 348/6 |
| 5,130,801 | 7/1992 | Yamaguchi ............................... 348/15 |
| 5,170,427 | 12/1992 | Guichard et al. ......................... 348/14 |
| 5,195,086 | 3/1993 | Baumgartner et al. ................. 370/264 |
| 5,200,989 | 4/1993 | Milone et al. ............................. 348/16 |
| 5,202,957 | 4/1993 | Serrao et al. .............................. 348/19 |
| 5,218,627 | 6/1993 | Corey et al. ............................... 348/16 |
| 5,283,637 | 2/1994 | Goolcharan .............................. 348/17 |
| 5,315,633 | 5/1994 | Champa .................................... 348/16 |
| 5,373,549 | 12/1994 | Bales et al. ........................... 379/93.21 |
| 5,374,952 | 12/1994 | Flohr ......................................... 348/12 |
| 5,408,526 | 4/1995 | McFarland et al. .................... 379/202 |
| 5,471,318 | 11/1995 | Ahuja et al. ............................. 358/400 |
| 5,608,653 | 3/1997 | Palmer et al. ...................... 395/200.34 |

FOREIGN PATENT DOCUMENTS

| | | |
|---|---|---|
| 0 414 222 | 8/1990 | European Pat. Off. . |
| 0 497 022 | 1/1991 | European Pat. Off. . |
| 0 516 371 | 5/1992 | European Pat. Off. . |
| 0 523 618 | 7/1992 | European Pat. Off. . |
| 0 523 626 | 7/1992 | European Pat. Off. . |
| 0 561 381 | 3/1993 | European Pat. Off. . |
| 35 07 152 | 8/1985 | Germany . |

OTHER PUBLICATIONS

*An Experiment in Integrated Multimedia Conferencing* by Keith A Lantz, Department of Computer Science, Stanford University, Stanford, CA 94305, Dec. 1986.

*Collaboration Technology Research at Olivetti Research California* by Keith A. Lantz, J. Chris Lauwers, Barry Arons, Carl Binding, Pehong Chen, Jim Donahue, Thomas A. Joseph, Richard Koo, Allyn Romanow, Chris Schmandt, and Wayne Yamamoto, Aug. 1989.

*Collaboration Awareness in Support of Collaboration Transparency: Requirements for the Next Generation of Shared Window Systems* by J. Chris Lauwers and Keith A. Lantz of Olivetti Research California, Version of Apr. 1989.

Replicated Architectures for Shared Window Systems: A Critique by J. Chris Lauwers, Thomas A. Joseph, Keith A. Lantz and Allyn L. romanow of Olivetti Research California, Version of Apr. 1990.

*Systems Integration '90* by Peter A. Ng, C.V. Ramamoorthy, Laurence C. Seifert and Raymond T. Yeh (Apr. 23–26, 1990).

The American Users Forum (Niu–Forum) Aug. 6–9, 1990).

*A Network Environment for Studying Multimedia Network Architecture and Control* (1989 Globecom, by Robert Lank, Laura Pate).

*Frontiers in Computer Communications Technology*, Sigcomm '87 Workshop (Aug. 11–13, 1987).

*Spider: An Investigation in Collaborative Technologies and Their Effects on Network Performance* by Roderick E. Perkins.

Statement by attorney for Applicants—Describing Product Development.

*Optimal Communication Architectures for Multimedia Conferencing in Distributed Systems,* Multimedia Laboratory Dept. of Computer Science and Engineering, University of San Diego, La Jolla, CA by Srinivas Ramanathan, P. Venkat Rangan, Harrick M. Vin, and Thomas Kaeppner.

*Optimmum Connection Paths for a Class of Videoconference*, Yiu–Wing Leung and Tak–Shing Yum, Department of Information Engineering, the Chinese University of Hong Kong, Shatin, Hong Kong.

*Desk Top Video Conferencing—An Important Feature of Future Visual Communications* by Christoph Weiss, Siemens AG—Munich—West Germany.

*Hierarchical Conferencing Architectures for Inter–Group Multimedia Collaboration,* Multimedia Laboratory Department of Computer Science and Engineering University of California at San Diego, La Jolla, by Harrick M. Vin, P. Venkat Rangan and Srinivas Ramanathan.

*Telekommunikation von Angesichtzu Angesicht* 2323 Telcom Report 9 (1986) Sep./Okt., No.5, Erlangen, W. Germany by Peter Klein.

Crawford, et al., "Videomatic Switching: System and Services," Digital Communications, 1988 Int. (1988).

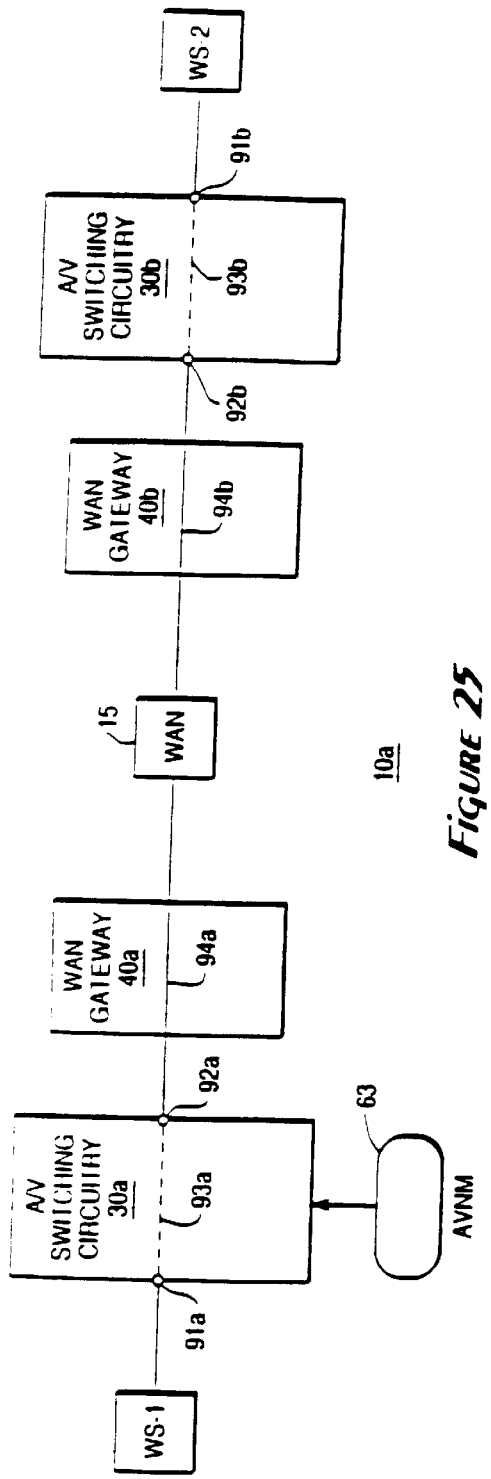
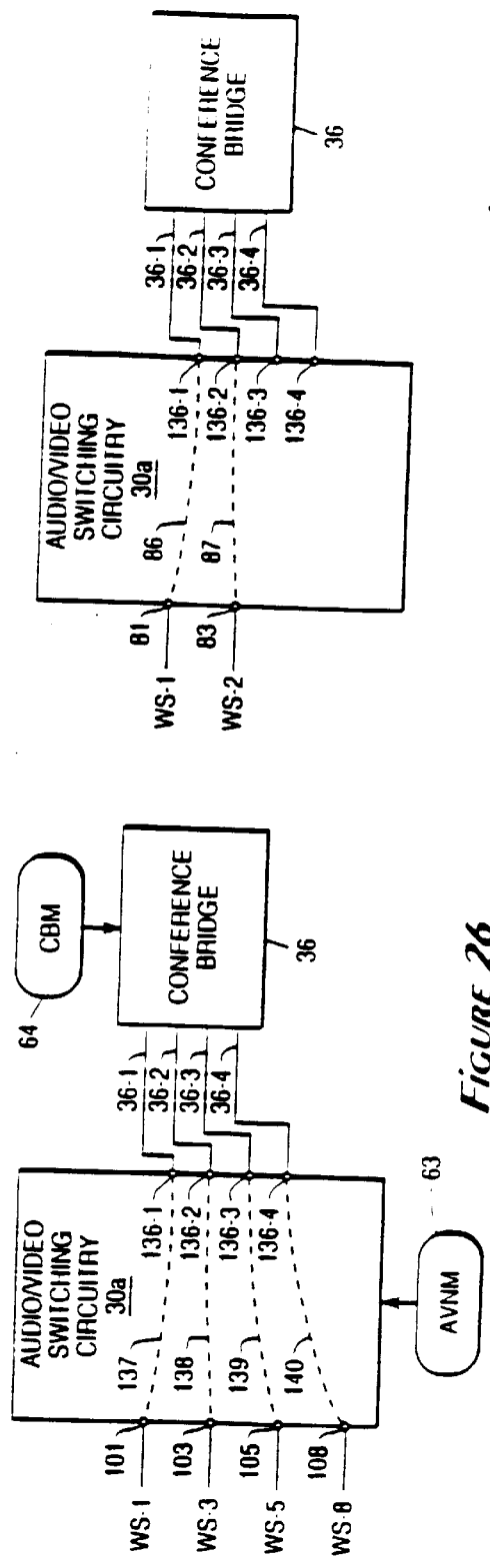
Figure 25
Figure 26
Figure 27

SYSTEM FOR TELECONFERENCING IN WHICH COLLABORATION TYPES AND PARTICIPANTS BY NAMES OR ICONS ARE SELECTED BY A PARTICIPANT OF THE TELECONFERENCE

CROSS REFERENCE TO RELATED APPLICATIONS

This application is a divisional of U.S. application Ser. No. 08/131,523, filed Oct. 1, 1993 now U.S. Pat. No. 5,689,641.

BACKGROUND OF THE INVENTION

The present invention relates to computer-based systems for enhancing collaboration between and among individuals who are separated by distance and/or time (referred to herein as "distributed collaboration"). Principal among the invention's goals is to replicate in a desktop environment, to the maximum extent possible, the full range, level and intensity of interpersonal communication and information sharing which would occur if all the participants were together in the same room at the same time (referred to herein as "face-to-face collaboration").

It is well known to behavioral scientists that interpersonal communication involves a large number of subtle and complex visual cues, referred to by names like "eye contact" and "body language," which provide additional information over and above the spoken words and explicit gestures. These cues are, for the most part, processed subconsciously by the participants, and often control the course of a meeting.

In addition to spoken words, demonstrative gestures and behavioral cues, collaboration often involves the sharing of visual information—e.g., printed material such as articles, drawings, photographs, charts and graphs, as well as videotapes and computer-based animations, visualizations and other displays—in such a way that the participants can collectively and interactively examine, discuss, annotate and revise the information. This combination of spoken words, gestures, visual cues and interactive data sharing significantly enhances the effectiveness of collaboration in a variety of contexts, such as "brainstorming" sessions among professionals in a particular field, consultations between one or more experts and one or more clients, sensitive business or political negotiations, and the like. In distributed collaboration settings, then, where the participants cannot be in the same place at the same time, the beneficial effects of face-to-face collaboration will be realized only to the extent that each of the remotely located participants can be "recreated" at each site.

To illustrate the difficulties inherent in reproducing the beneficial effects of face-to-face collaboration in a distributed collaboration environment, consider the case of decision-making in the fast-moving commodities trading markets, where many thousands of dollars of profit (or loss) may depend on an expert trader making the right decision within hours, or even minutes, of receiving a request from a distant client. The expert requires immediate access to a wide range of potentially relevant information such as financial data, historical pricing information, current price quotes, newswire services, government policies and programs, economic forecasts, weather reports, etc. Much of this information can be processed by the expert in isolation. However, before making a decision to buy or sell, he or she will frequently need to discuss the information with other experts, who may be geographically dispersed, and with the client. One or more of these other experts may be in a meeting, on another call, or otherwise temporarily unavailable. In this event, the expert must communicate "asynchronously"—to bridge time as well as distance.

As discussed below, prior art desktop videoconferencing systems provide, at best, only a partial solution to the challenges of distributed collaboration in real time, primarily because of their lack of high-quality video (which is necessary for capturing the visual cues discussed above) and their limited data sharing capabilities. Similarly, telephone answering machines, voice mail, fax machines and conventional electronic mail systems provide incomplete solutions to the problems presented by deferred (asynchronous) collaboration because they are totally incapable of communicating visual cues, gestures, etc. and, like conventional videoconferencing systems, are generally limited in the richness of the data that can be exchanged.

It has been proposed to extend traditional videoconferencing capabilities from conference centers, where groups of participants must assemble in the same room, to the desktop, where individual participants may remain in their office or home. Such a system is disclosed in U.S. Pat. No. 4,710,917 to Tompkins et al. for Video Conferencing Network issued on Dec. 1, 1987. It has also been proposed to augment such video conferencing systems with limited "video mail" facilities. However, such dedicated videoconferencing systems (and extensions thereof) do not effectively leverage the investment in existing embedded information infrastructures—such as desktop personal computers and workstations, local area network (LAN) and wide area network (WAN) environments, building wiring, etc.—to facilitate interactive sharing of data in the form of text, images, charts, graphs, recorded video, screen displays and the like. That is, they attempt to add computing capabilities to a videoconferencing system, rather than adding multimedia and collaborative capabilities to the user's existing computer system. Thus, while such systems may be useful in limited contexts, they do not provide the capabilities required for maximally effective collaboration, and are not cost-effective.

Conversely, audio and video capture and processing capabilities have recently been integrated into desktop and portable personal computers and workstations (hereinafter generically referred to as "workstations"). These capabilities have been used primarily in desktop multimedia authoring systems for producing CD-ROM-based works. While such systems are capable of processing, combining, and recording audio, video and data locally (i.e., at the desktop), they do not adequately support networked collaborative environments, principally due to the substantial bandwidth requirements for real-time transmission of high-quality, digitized audio and full-motion video which preclude conventional LANs from supporting more than a few workstations. Thus, although currently available desktop multimedia computers frequently include videoconferencing and other multimedia or collaborative capabilities within their advertised feature set (see, e.g., A. Reinhardt, "Video Conquers the Desktop," BYTE, September 1993, pp. 64–90), such systems have not yet solved the many problems inherent in any practical implementation of a scalable collaboration system.

SUMMARY OF THE INVENTION

In accordance with the present invention, computer hardware, software and communications technologies are combined in novel ways to produce a multimedia collaboration system that greatly facilitates distributed collaboration, in part by replicating the benefits of face-to-face collaboration. The system tightly integrates a carefully selected set of multimedia and collaborative capabilities, principal among which are desktop teleconferencing and multimedia mail.

As used herein, desktop teleconferencing includes real-time audio and/or video teleconferencing, as well as data conferencing. Data conferencing, in turn, includes snapshot sharing (sharing of "snapshots" of selected regions of the user's screen), application sharing (shared control of running applications), shared whiteboard (equivalent to sharing a "blank" window), and associated telepointing and annotation capabilities. Teleconferences may be recorded and stored for later playback, including both audio/video and all data interactions.

While desktop teleconferencing supports real-time interactions, multimedia mail permits the asynchronous exchange of arbitrary multimedia documents, including previously recorded teleconferences. Indeed, it is to be understood that the multimedia capabilities underlying desktop teleconferencing and multimedia mail also greatly facilitate the creation, viewing, and manipulation of high-quality multimedia documents in general, including animations and visualizations that might be developed, for example, in the course of information analysis and modeling. Further, these animations and visualizations may be generated for individual rather than collaborative use, such that the present invention has utility beyond a collaboration context.

The preferred embodiment of the invention is a collaborative multimedia workstation (CMW) system wherein very high-quality audio and video capabilities can be readily superimposed onto an enterprise's existing computing and network infrastructure, including workstations, LANs, WANs, and building wiring.

In a preferred embodiment, the system architecture employs separate real-time and asynchronous networks—the former for real-time audio and video, and the latter for non-real-time audio and video, text, graphics and other data, as well as control signals. These networks are interoperable across different computers (e.g., Macintosh, Intel-based PCs, and Sun workstations), operating systems (e.g., Apple System 7, DOS/Windows, and UNIX) and network operating systems (e.g., Novell Netware and Sun ONC+). In many cases, both networks can actually share the same cabling and wall jack connector.

The system architecture also accommodates the situation in which the user's desktop computing and/or communications equipment provides varying levels of media-handling capability. For example, a collaboration session—whether real-time or asynchronous—may include participants whose equipment provides capabilities ranging from audio only (a telephone) or data only (a personal computer with a modem) to a full complement of real-time, high-fidelity audio and full-motion video, and high-speed data network facilities.

The CMW system architecture is readily scalable to very large enterprise-wide network environments accommodating thousands of users. Further, it is an open architecture that can accommodate appropriate standards. Finally, the CMW system incorporates an intuitive, yet powerful, user interface, making the system easy to learn and use.

The present invention thus provides a distributed multimedia collaboration environment that achieves the benefits of face-to-face collaboration as nearly as possible, leverages ("snaps on to") existing computing and network infrastructure to the maximum extent possible, scales to very large networks consisting of thousand of workstations, accommodates emerging standards, and is easy to learn and use. The specific nature of the invention, as well as its objects, features, advantages and uses, will become more readily apparent from the following detailed description and examples, and from the accompanying drawings.

BRIEF DESCRIPTION OF THE DRAWINGS

FIG. 25 is a block and schematic diagram illustrating how physical connections are preferably established in MLANs such as illustrated in FIG. 3, for a two-party call between a first CMW located at one site and a second CMW located at a remote site.

FIGS. 26 and 27 are block and schematic diagrams illustrating how conference bridging is preferably provided in the MLAN of FIG. 3.

DETAILED DESCRIPTION OF THE PREFERRED EMBODIMENTS

OVERALL SYSTEM ARCHITECTURE

Figure 1:
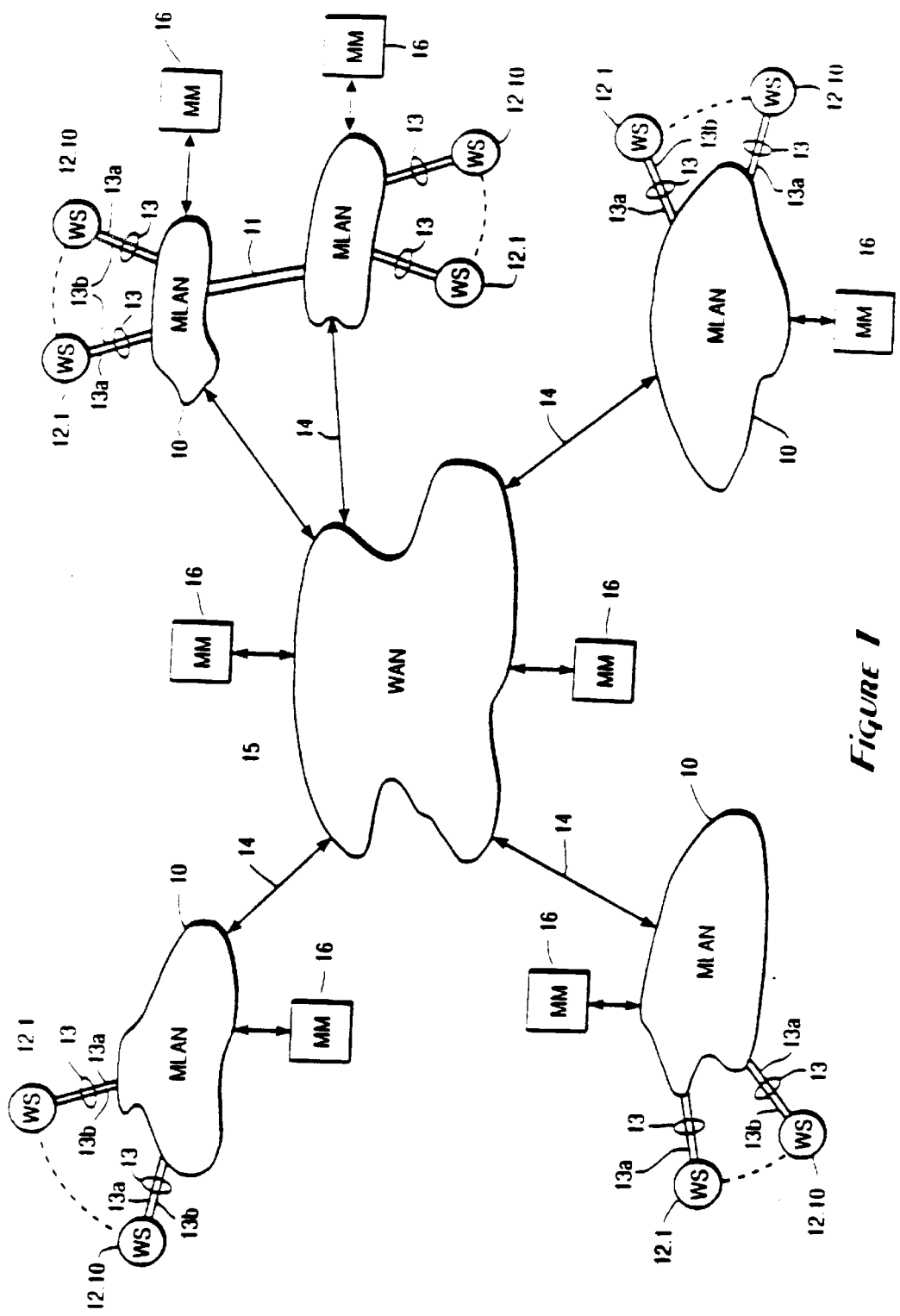
FIG. 1 is an enterprise view of a desktop collaboration system embodiment of the present invention.

Referring initially to FIG. 1, illustrated therein is an overall diagrammatic view of a multimedia collaboration system in accordance with the present invention. As shown, each of a plurality of "multimedia local area networks" (MLANs) 10 connects, via lines 13, a plurality of CMWs 12-1 to 12-10 and provides audio/video/data networking for supporting collaboration among CMW users. WAN 15 in turn connects multiple MLANs 10, and typically includes appropriate combinations of common carrier analog and digital transmission networks. Multiple MLANs 10 on the same physical premises may be connected via bridges/routes 11, as shown, to WANs and one another.

In accordance with the present invention, the system of FIG. 1 accommodates both "real time" delay- and jitter-sensitive signals (e.g., real-time audio and video teleconferencing) and classical asynchronous data (e.g., data control signals as well as shared textual, graphics and other media) communication among multiple CMWs 12 regardless of their location. Although only ten CMWs 12 are illustrated in FIG. 1, it will be understood that many more could be provided. As also indicated in FIG. 1, various other multimedia resources 16 (e.g., VCRs, laserdiscs, TV feeds, etc.) are connected to MLANs 10 and are thereby accessible by individual CMWs 12.

CMW 12 in FIG. 1 may use any of a variety of types of operating systems, such as Apple System 7, UNIX, DOS/Windows and OS/2. The CMWs can also have different types of window systems. Specific preferred embodiments of a CMW 12 are described hereinafter in connection with FIGS. 18A and 18B. Note that this invention allows for a mix of operating systems and window systems across individual CMWs.

In the preferred embodiment, CMW 12 in FIG. 1 provides real-time audio/video/data capabilities along with the usual data processing capabilities provided by its operating system. CMW 12 also provides for bidirectional communication, via lines 13, within MLAN 10, for audio/video signals as well as data signals. Audio/video signals transmitted from a CMW 12 typically comprise a high-quality live video image and audio of the CMW operator. These signals are obtained from a video camera and microphone provided at the CMW (via an add-on unit or partially or totally integrated into the CMW), processed, and then made available to low-cost network transmission subsystems.

Audio/video signals received by a CMW 12 from MLAN 10 may typically include: video images of one or more conference participants and associated audio, video and audio from multimedia mail, previously recorded audio/video from previous calls and conferences, and standard broadcast television (e.g., CN). Received video signals are displayed on the CMW screen or on an adjacent monitor, and the accompanying audio is reproduced by a speaker provided in or near the CMW. In general, the required transducers and signal processing hardware could be integrated into the CMW, or be provided via a CMW add-on unit, as appropriate.

Figure 2A:
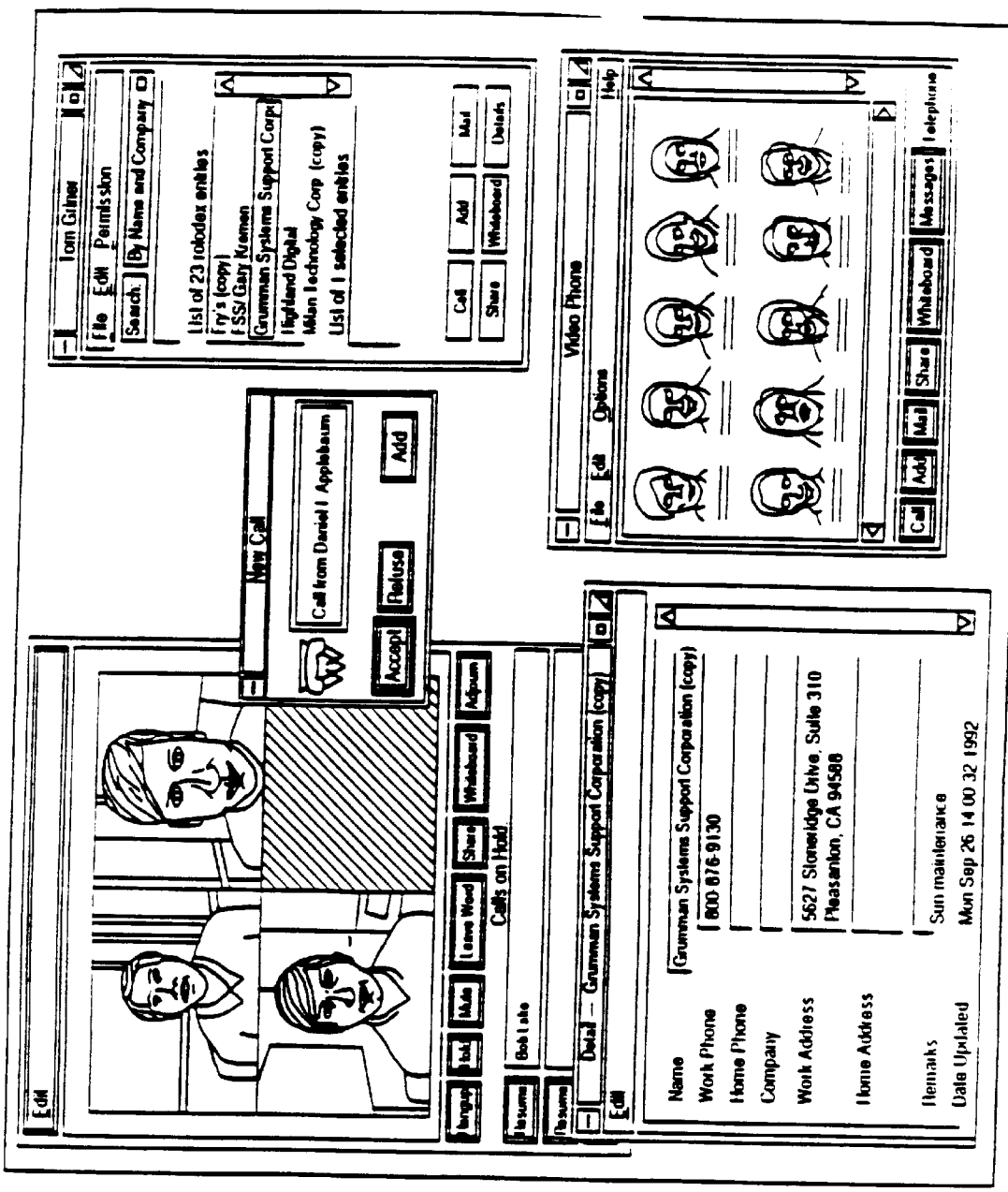
FIGS. 2A and 2B, are photographs which attempt to illustrate, to the extent possible in a still image, the high-quality of the full-motion video and related user interface displays that appear on typical CMW screens which may be generated during operation of a preferred embodiment of the invention.
Figure 2B:
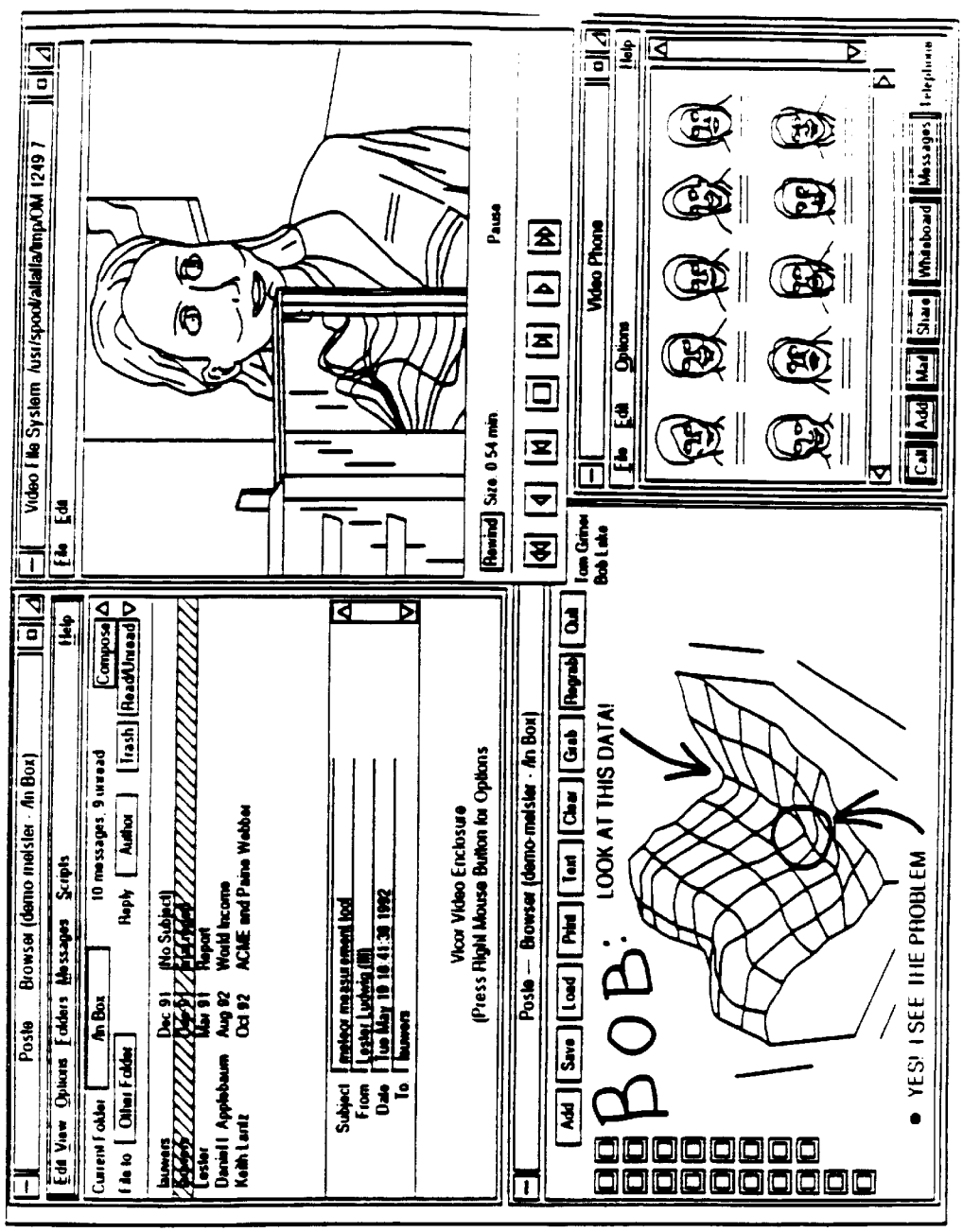

In the preferred embodiment, it has been found particularly advantageous to provide the above-described video at standard NTSC-quality TV performance (i.e., 30 frames per second at 640×480 pixels per frame and the equivalent of 24 bits of color per pixel) with accompanying high-fidelity audio (typically between 7 and 15 KHz). For example, FIG. 2A illustrates a CMW screen containing live, full-motion video of three conference participants, while FIG. 2B illustrates data shared and annotated by those conferees (lower left window).

MULTIMEDIA LOCAL AREA NETWORK

Figure 3:
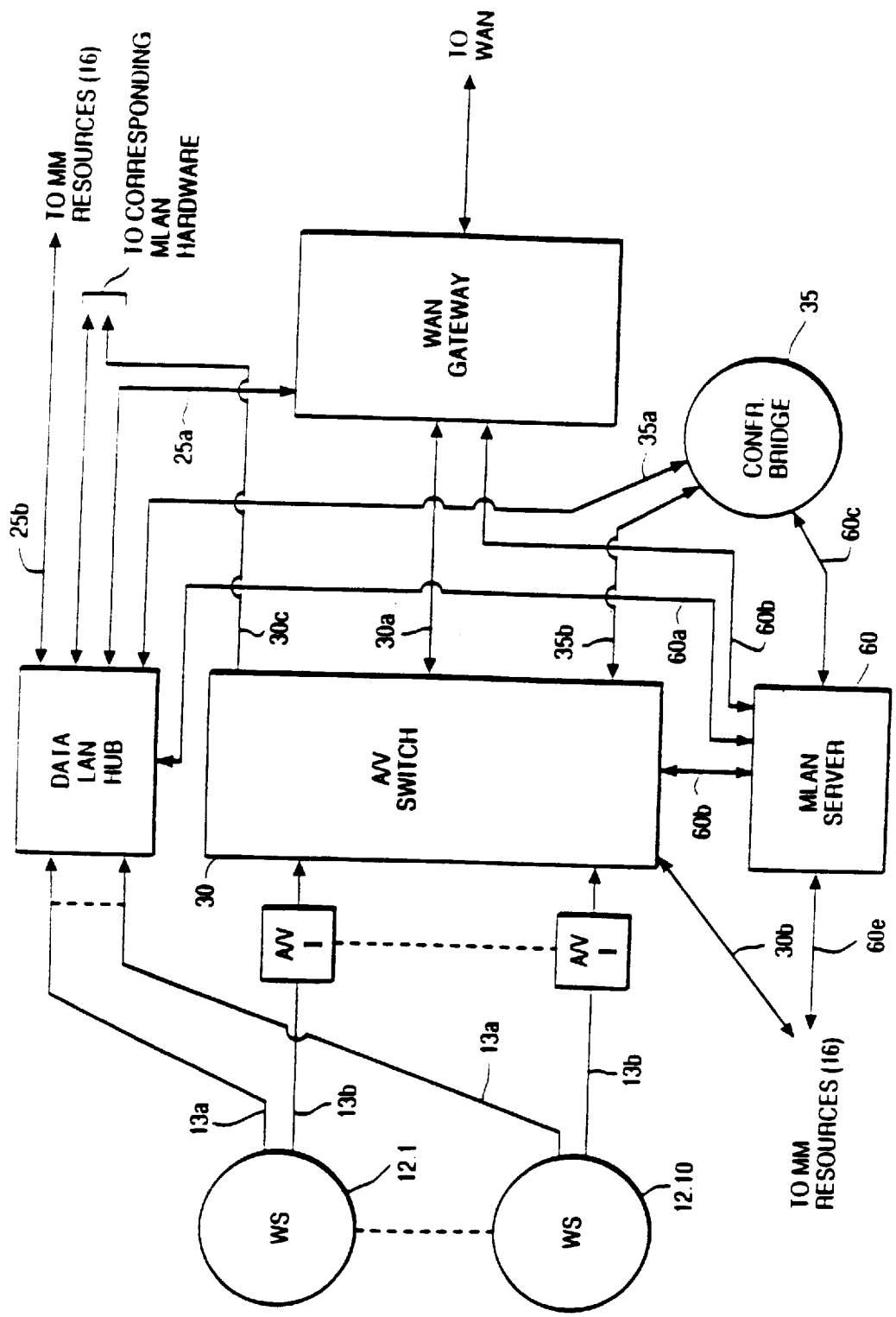
FIG. 3 is a block and schematic diagram of a preferred embodiment of a "multimedia local area network" (MLAN) in accordance with a desktop collaboration system embodiment of the present invention.

Referring next to FIG. 3, illustrated therein is a preferred embodiment of MLAN 10 having ten CMWs (12-1, 12-2, –12-10), coupled therein via lines 13a and 13b. MLAN 10 typically extends over a distance from a few hundred feet to a few miles, and is usually located within a building or a group of proximate buildings.

Given the current state of networking technologies, it is useful (for the sake of maintaining quality and minimizing costs) to provide separate signal paths for real-time audio/video and classical asynchronous data communications (including digitized audio and video enclosures of multimedia mail messages that are free from real-time delivery constraints). At the moment, analog methods for carrying real-time audio/video are preferred. In the future, digital methods may be used. Eventually, digital audio and video signal paths may be multiplexed with the data signal path as a common digital stream. Another alternative is to multiplex real-time and asynchronous data paths together using analog multiplexing methods. For the purposes of the present application, however, we will treat these two signal paths as using physically separate wires. Further, as the current preferred embodiment uses analog networking for audio and video, it also physically separates the real-time and asynchronous switching vehicles and, in particular, assumes an analog audio/video switch. In the future, a common switching vehicle (e.g., ATM) could be used.

The MLAN 10 thus can be implemented in the preferred embodiment using conventional technology, such as typical Data LAN hubs 25 and A/V Switching Circuitry 30 (as used in television studios and other closed-circuit television networks), linked to the CMWs 12 via appropriate transceivers and unshielded twisted pair (UTP) wiring. Note in FIG. 1 that lines 13, which interconnect each CMW 12 within its respective MLAN 10, comprise two sets of lines 13a and 13b. Lines 13a provide bidirectional communication of audio/video within MLAN 10, while lines 13b provide for the bidirectional communication of data. This separation permits conventional LANs to be used for data communications and a supplemental network to be used for audio/video communications. Although this separation is advantageous in the preferred embodiment, it is again to be understood that audio/video/data networking can also be implemented using a single pair of lines for both audio/video and data communications via a very wide variety of analog and digital multiplexing schemes.

While lines 13a and 13b may be implemented in various ways, it is currently preferred to use commonly installed 4-pair UTP telephone wires, wherein one pair is used for incoming video with accompanying audio (mono or stereo) multiplexed in, wherein another pair is used for outgoing multiplexed audio/video, and wherein the remaining two pairs are used for carrying incoming and outgoing data in ways consistent with existing LANs. For example, 10BaseT Ethernet uses RJ-45 pins 1, 2, 4, and 6, leaving pins 3, 5, 7, and 8 available for the two A/V twisted pairs. The resulting system is compatible with standard (AT&T 258A, EIA/TIA 568, 8P8C, 10BaseT, ISDN, 6P6C, etc.) telephone wiring found commonly throughout telephone and LAN cable plants in most office buildings throughout the world. These UTP wires are used in a hierarchy or peer arrangements of star topologies to create MLAN 10, described below. Note that the distance range of the data wires often must match that of the video and audio. Various UTP-compatible data LAN networks may be used, such as Ethernet, token ring, FDDI, ATM, etc. For distances longer than the maximum distance specified by the data LAN protocol, data signals can be additionally processed for proper UTP operations.

As shown in FIG. 3, lines 13a from each CMW 12 are coupled to a conventional Data LAN hub 25, which facilitates the communication of data (including control signals) among such CMWs. Lines 13b in FIG. 3 are connected to A/V Switching Circuitry 30. One or more conference bridges 35 are coupled to A/V Switching Circuitry 30 and possibly (if needed) the Data LAN hub 25, via lines 35b and 35a, respectively, for providing multi-party Conferencing in a particularly advantageous manner, as will hereinafter be described in detail. A WAN gateway 40 provides for bidirectional communication between MLAN 10 and WAN 15 in FIG. 1. For this purpose, Data LAN hub 25 and A/V Switching Circuitry 30 are coupled to WAN gateway 40 via outputs 25a and 30a, respectively. Other devices connect to the A/V Switching Circuitry 30 and Data LAN hub 25 to add additional features (such as multimedia mail, conference recording, etc.) as discussed below.

Control of A/V Switching Circuitry 30, conference bridges 35 and WAN gateway 40 in FIG. 3 is provided by MLAN Server 60 via lines 60b, 60c, and 60d, respectively. In a preferred embodiment, MLAN Server 60 supports the TCP/IP network protocol suite. Accordingly, software processes on CMWs 12 communicate with one another and MLAN Server 60 via MLAN 10 using these protocols. Other network protocols could also be used, such as IPX. The manner in which software running on MLAN Server 60 controls the operation of MLAN 10 will be described in detail hereinafter.

Note in FIG. 3 that Data LAN hub 25, A/V Switching Circuitry 30 and MLAN Server 60 also provide respective lines 25b, 30b, and 60c for coupling to additional multimedia resources 16 (FIG. 1), such as multimedia document management, multimedia databases, radio/TV channels, etc. Data LAN hub 25 (via bridges/routers 11 in FIG. 1) and A/V Switching Circuitry 30 additionally provide lines 25c and 30c for coupling to one or more other MLANs 10 which may be in the same locality (i.e., not far enough away to require use of WAN technology). Where WANs are required, WAN gateways 40 are used to provide highest quality compression methods and standards in a shared resource fashion, thus minimizing costs at the workstation for a given WAN quality level, as discussed below.

The basic operation of the preferred embodiment of the resulting collaboration system shown in FIGS. 1 and 3 will next be considered. Important features of the present invention reside in providing not only multi-party real-time desktop audio/video/data teleconferencing among geographically distributed CMWs, but also in providing from the same desktop audio/video/data/text/graphics mail capabilities, as well as access to other resources, such as databases, audio and video files, overview cameras, standard TV channels, etc. FIG. 2B illustrates a CMW screen showing a multimedia EMAIL mailbox (top left window) containing references to a number of received messages along with a video enclosure (top right window) to the selected message.

A/V Switching Circuitry 30 (whether digital or analog as in the preferred embodiment) provides common audio/video switching for CMWs 12, conference bridges 35, WAN gateway 40 and multimedia resources 16, as determined by MLAN Server 60, which in turn controls conference bridges 35 and WAN gateway 40. Similarly, asynchronous data is communicated within MLAN 10 utilizing common data communications formats where possible (e.g., for snapshot sharing) so that the system can handle such data in a common manner, regardless of origin, thereby facilitating multimedia mail and data sharing as well as audio/video communications.

For example, to provide multi-party teleconferencing, an initiating CMW 12 signals MLAN Server 60 via Data LAN hub 25 identifying the desired conference participants. After determining which of these conferees will accept the call, MLAN Server 60 controls A/V Switching Circuitry 30 (and CMW software via the data network) to set up the required audio/video and data paths to conferees at the same location as the initiating CMW.

When one or more conferees are at distant locations, the respective MLAN Servers 60 of the involved MLANs 10, on a peer-to-peer basis, control their respective A/V Switching Circuitry 30, conference bridges 35, and WAN gateways 40 to set up appropriate communication paths (via WAN 15 in FIG. 1) as required for interconnecting the conferees. MLAN Servers 60 also communicate with one another via data paths so that each MLAN 10 contains updated information as to the capabilities of all of the system CMWs 12, and also the current locations of all parties available for teleconferencing.

The data conferencing component of the above-described system supports the sharing of visual information at one or more CMWs (as described in greater detail below). This encompasses both "snapshot sharing" (sharing "snapshots" of complete or partial screens, or of one or more selected windows) and "application sharing" (sharing both the control and display of running applications). When transferring images, lossless or slightly lossy image compression can be used to reduce network bandwidth requirements and user-perceived delay while maintaining high image quality.

In all cases, any participant can point at or annotate the shared data. These associated telepointers and annotations appear on every participant's CMW screen as they are drawn (i.e., effectively in real-time). For example, note FIG. 2B which illustrates a typical CMW screen during a multi-party teleconferencing session, wherein the screen contains annotated shared data as well as video images of the conferees. As described in greater detail below, all or portions of the audio/video and data of the teleconference can be recorded at a CMW (or within MLAN 10), complete with all the data interactions.

In the above-described preferred embodiment, audio/video file services can be implemented either at the individual CMWs 12 or by employing a centralized audio/video storage server. This is one example of the many types of additional servers that can be added to the basic system of MLANs 10. A similar approach is used for incorporating other multimedia services, such as commercial TV channels, multimedia mail, multimedia document management, multimedia conference recording, visualization servers, etc. (as described in greater detail below). Certainly, applications that run self-contained on a CMW can be readily added, but the invention extends this capability greatly in the way that MLAN 10, storage and other functions are implemented and leveraged.

In particular, standard signal formats, network interfaces, user interface messages, and call models can allow virtually any multimedia resource to be smoothly integrated into the system. Factors facilitating such smooth integration include: (i) a common mechanism for user access across the network; (ii) a common metaphor (e.g., placing a call) for the user to initiate use of such resource; (iii) the ability for one function (e.g., a multimedia conference or multimedia database) to access and exchange information with another function (e.g., multimedia mail); and (iv) the ability to extend such access of one networked function by another networked function to relatively complex nestings of simpler functions (for example, record a multimedia conference in which a group of users has accessed multimedia mail messages and transferred them to a multimedia database, and then send part of the conference recording just created as a new multimedia mail message, utilizing a multimedia mail editor if necessary).

A simple example of the smooth integration of functions made possible by the above-described approach is that the GUI and software used for snapshot sharing (described below) can also be used as an input/output interface for multimedia mail and more general forms of multimedia documents. This can be accomplished by structuring the interprocess communication protocols to be uniform across all these applications. More complicated examples—specifically multimedia conference recording, multimedia mail and multimedia document management—will be presented in detail below.

WIDE AREA NETWORK

Figure 4:
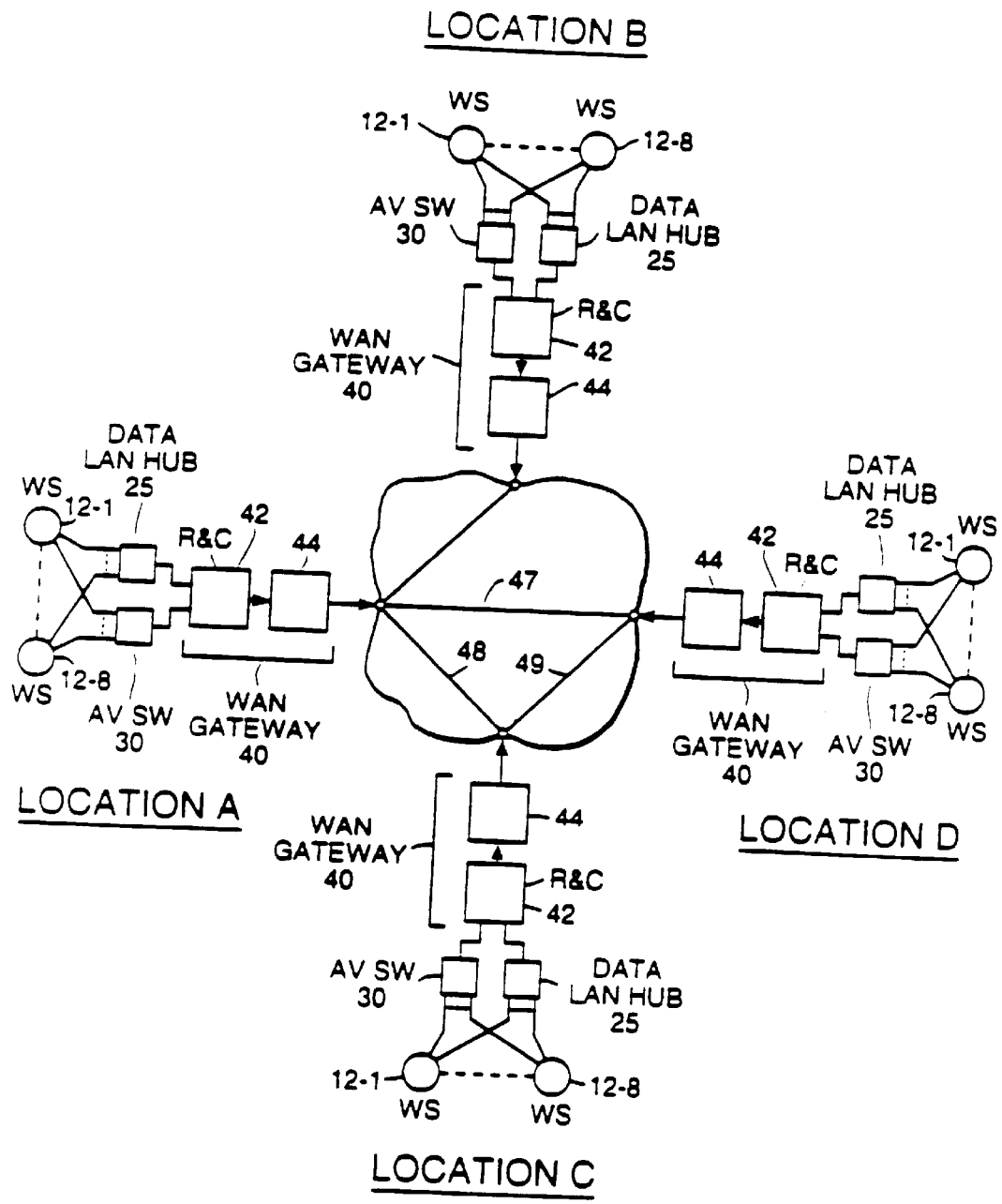
FIG. 4 is a block and schematic diagram illustrating how a plurality of geographically dispersed MLANs of the type shown in FIG. 3 can be connected via a wide area network in accordance with the present invention.

Next to be described in connection with FIG. 4 is the advantageous manner in which the present invention provides for real-time audio/video/data communication among geographically dispersed MLANs 10 via WAN 15 (FIG. 1), whereby communication delays, cost and degradation of video quality are significantly minimized from what would otherwise be expected.

Four MLANs 10 are illustrated at locations A, B, C and D. CMWs 12-1 to 12-10, A/V Switching Circuitry 30, Data LAN hub 25, and WAN gateway 40 at each location correspond to those shown in FIGS. 1 and 3. WAN gateway 40 in FIG. 4 will be seen to comprise a router/codec (R&C) bank 42 coupled to WAN 15 via WAN switching multiplexer 44. The router is used for data interconnection and the codec is used for audio/video interconnection (for multimedia mail and document transmission, as well as videoconferencing). Codecs from multiple vendors, or supporting various compression algorithms may be employed. In the preferred embodiment, the router and codec are combined with the switching multiplexer to form a single integrated unit.

Typically, WAN 15 is comprised of T1 or ISDN common-carrier-provided digital links (switched or dedicated), in which case WAN switching multiplexers 44 are of the appropriate type (T1, ISDN, fractional T1, T3, switched 56 Kbps, etc.). Note that the WAN switching multiplexer 44 typically creates subchannels whose bandwidth is a multiple of 64 Kbps (i.e., 256 Kbps, 384, 768, etc.) among the T1, T3 or ISDN carriers. Inverse multiplexers may be required when using 56 Kbps dedicated or switched services from these carriers.

In the MLAN 10 to WAN 15 direction, router/codec bank 42 in FIG. 4 provides conventional analog-to-digital conversion and compression of audio/video signals received from A/V Switching Circuitry 30 for transmission to WAN 15 via WAN switching multiplexer 44, along with transmission and routing of data signals received from Data LAN hub 25. In the WAN 15 to MLAN 10 direction, each router/codec bank 42 in FIG. 4 provides digital-to-analog conversion and decompression of audio/video digital signals received from WAN 15 via WAN switching multiplexer 44 for transmission to A/V Switching Circuitry 30, along with the transmission to Data LAN hub 25 of data signals received from WAN 15.

The system also provides optimal routes for audio/video signals through the WAN. For example, in FIG. 4, location A can take either a direct route to location D via path 47, or a two-hop route through location C via paths 48 and 49. If the direct path 47 linking location A and location D is unavailable, the multipath route via location C and paths 48 and 49 could be used.

In a more complex network, several multi-hop routes are typically available, in which case the routing system handles the decision making, which for example can be based on network loading considerations. Note the resulting two-level network hierarchy: a MLAN 10 to MLAN 10 (i.e., site-to-site) service connecting codecs with one another only at connection endpoints.

Figure 5:
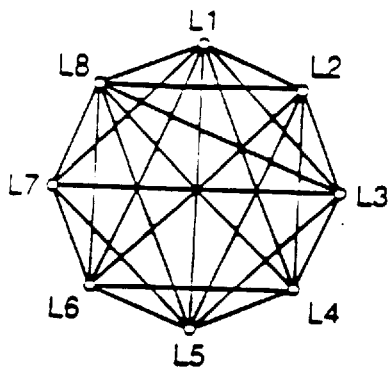
FIG. 5 is a schematic diagram illustrating how collaboration sites at distant locations L1–L8 are conventionally interconnected over a wide area network by individually connecting each site to every other site.
Figure 6:
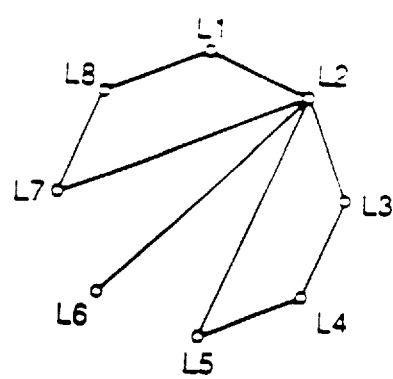
FIG. 6 is a schematic diagram illustrating how collaboration sites at distant locations L1–L8 are interconnected over a wide area network in a preferred embodiment of the invention using a multi-hopping approach.

The cost savings made possible by providing the above-described multi-hop capability (with intermediate codec bypassing) are very significant as will become evident by noting the examples of FIGS. 5 and 6. FIG. 5 shows that using the conventional "fully connected mesh" location-to-location approach, thirty-six WAN links are required for interconnecting the nine locations L1 to L8. On the other hand, using the above multi-hop capabilities, only nine WAN links are required, as shown in FIG. 6. As the number of locations increase, the difference in cost becomes even greater, growing as the square of the number of sites. For example, for 100 locations, the conventional approach would require about 5,000 WAN links, while the multi-hop approach of the present invention would typically require 300 or fewer (possibly considerably fewer) WAN links. Although specific WAN links for the multi-hop approach of the invention would require higher bandwidth to carry the additional traffic, the cost involved is very much smaller as compared to the cost for the very much larger number of WAN links required by the conventional approach.

At the endpoints of a wide-area call, the WAN switching multiplexer routes audio/video signals directly from the WAN network interface through an available codec to MLAN 10 and vice versa. At intermediate hops in the network, however, video signals are routed from one network interface on the WAN switching multiplexer to another network interface. Although A/V Switching Circuitry 30 could be used for this purpose, the preferred embodiment provides switching functionality inside the WAN switching multiplexer. By doing so, it avoids having to route audio/video signals through codecs to the analog switching circuitry, thereby avoiding additional codec delays at the intermediate locations.

A product capable of performing the basic switching functions described above for WAN switching multiplexer 44 is available from Teleos Corporation, Eatontown, N.J. This product is not known to have been used for providing audio/video multi-hopping and dynamic switching among various WAN links as described above.

In addition to the above-described multiple-hop approach, the preferred embodiment of the present invention provides a particularly advantageous way of minimizing delay, cost and degradation of video quality in a multi-party video teleconference involving geographically dispersed sites, while still delivering full conference views of all participants. Normally, in order for the CMWs at all sites to be provided with live audio/video of every participant in a teleconference simultaneously, each site has to allocate (in router/codec bank 42 in FIG. 4) a separate codec for each participant, as well as a like number of WAN trunks (via WAN switching multiplexer 44 in FIG. 4).

As will next be described, however, the preferred embodiment of the invention advantageously permits each wide area audio/video teleconference to use only one codec at each site, and a minimum number of WAN digital trunks. Basically, the preferred embodiment achieves this most important result by employing "distributed" video mosaicing via a video "cut-and-paste" technology along with distributed audio mixing.

DISTRIBUTED VIDEO MOSAICING

Figure 7:
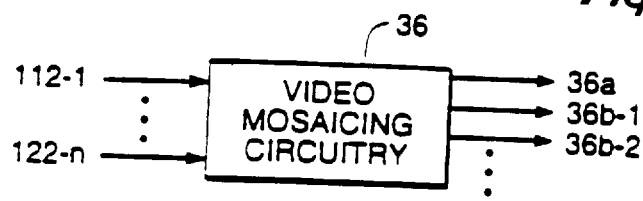
FIG. 7 is a block diagram illustrating a preferred embodiment of video mosaicing circuitry provided in the MLAN of FIG. 3.

FIG. 7 illustrates a preferred way of providing video mosaicing in the MLAN of FIG. 3 —i.e., by combining the individual analog video pictures from the individuals participating in a teleconference into a single analog mosaic picture. As shown in FIG. 7, analog video signals 112-1 to 112-n from the participants of a teleconference are applied to video mosaicing circuitry 36, which in the preferred embodiment is provided as part of conference bridge 35 in FIG. 3. These analog video inputs 112-1 to 112-n are obtained from the A/V Switching Circuitry 30 (FIG. 3) and may include video signals from CMWs at one or more distant sites (received via WAN gateway 40) as well as from other CMWs at the local site.

In the preferred embodiment, video mosaicing circuitry 36 is capable of receiving N individual analog video picture signals (where N is a squared integer, i.e., 4, 9, 16, etc.). Circuitry 36 first reduces the size of the N input video signals by reducing the resolutions of each by a factor of M (where M is the square root of N (i.e., 2, 3, 4, etc.), and then arranging them in an M-by-M mosaic of N images. The resulting single analog mosaic 36a obtained from video mosaicing circuitry 36 is then transmitted to the individual CMWs for display on the screens thereof.

Figure 8A:
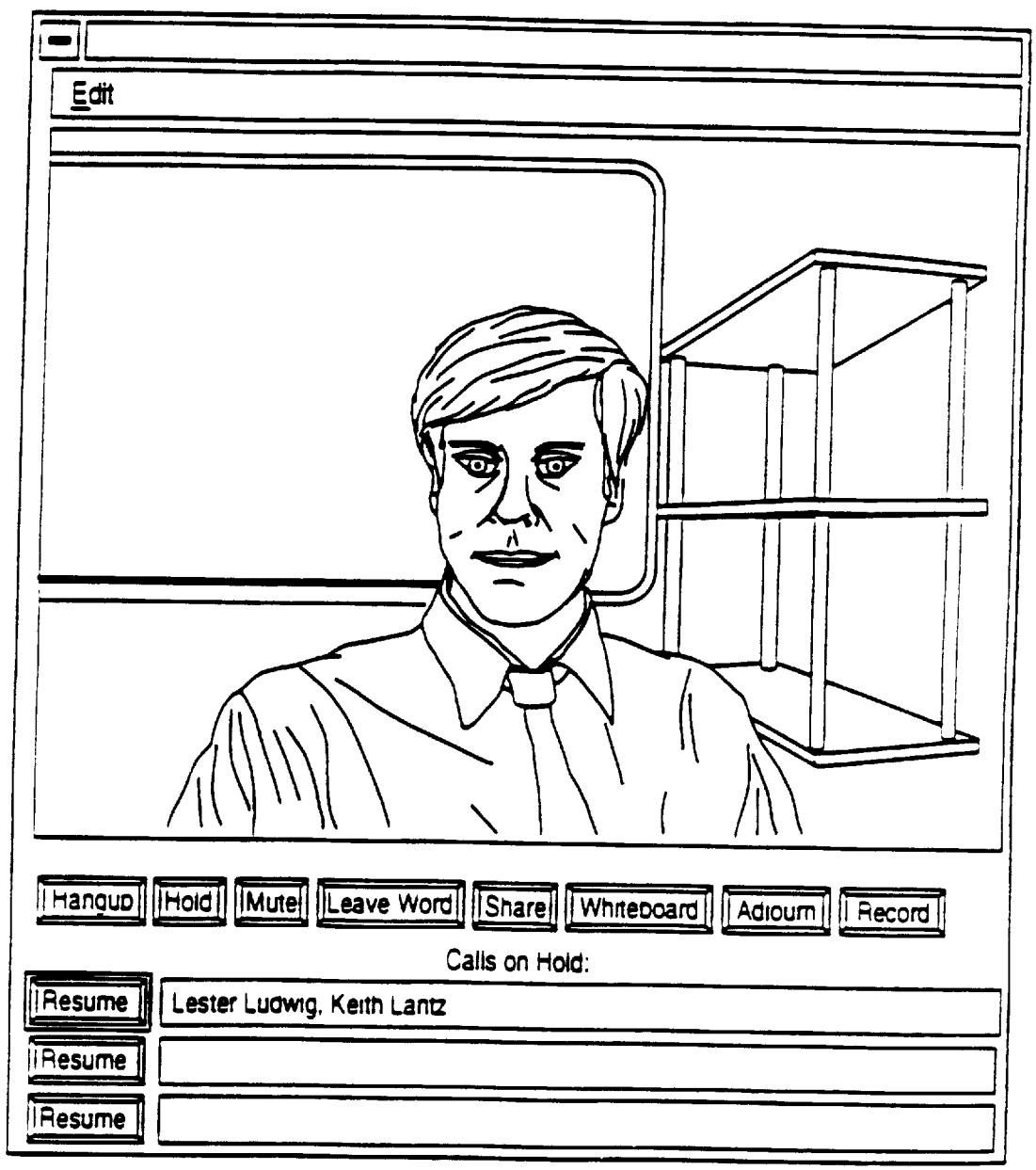
FIGS. 8A, 8B and 8C illustrate the video window on a typical CMW screen which may be generated during operation of a preferred embodiment of the present invention, and which contains only the callee for two-party calls (8A) and a video mosaic of all participants, e.g., for four-party (8B) or eight-party (8C) conference calls.
Figure 8B:
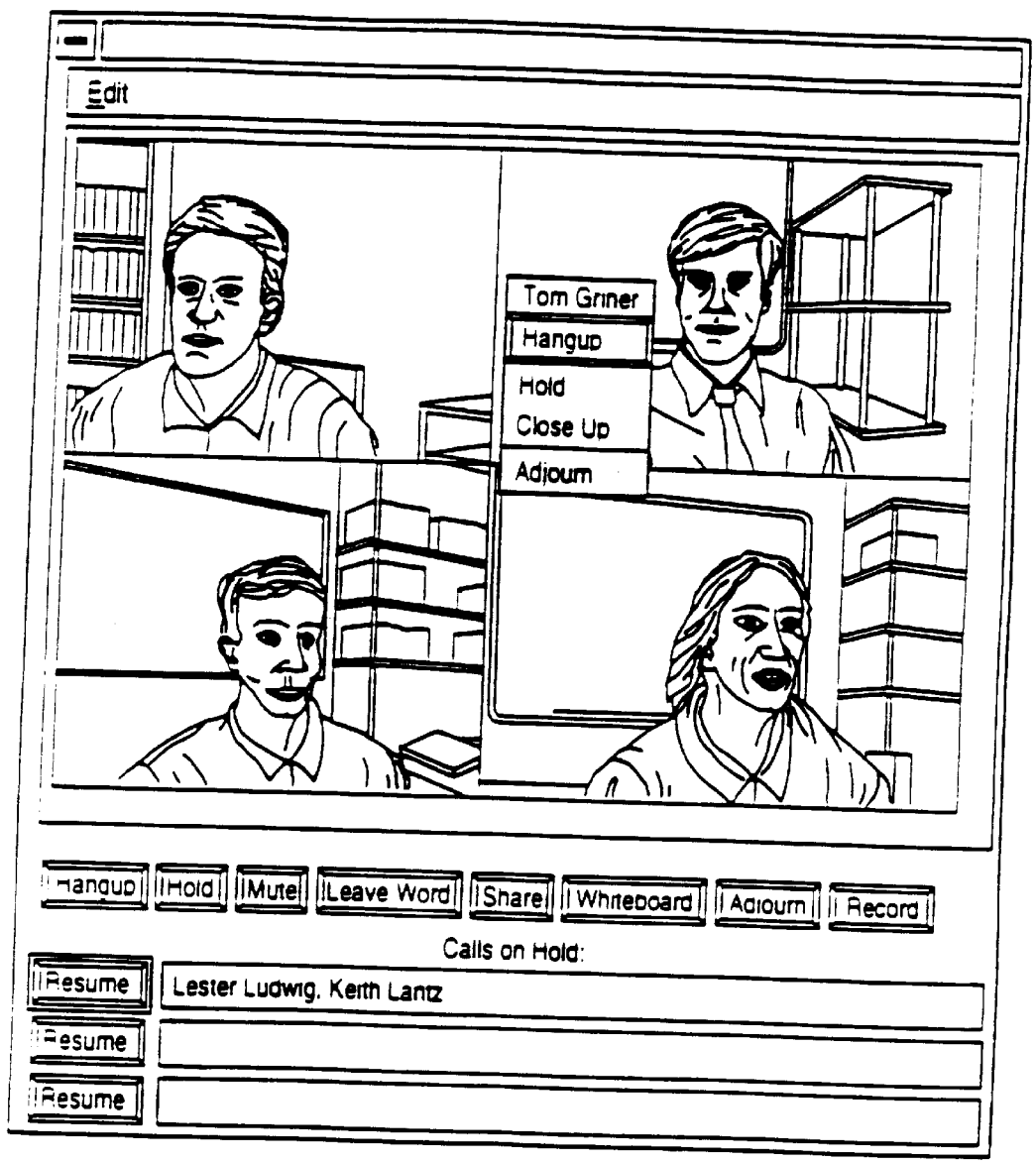

As will become evident hereinafter, it may be preferable to send a different mosaic to distant sites, in which case video mosaicing circuitry 36 would provide an additional mosaic 36b for this purpose. A typical displayed mosaic picture (N=4, M=2) showing three participants is illustrated in FIG. 2A. A mosaic containing four participants is shown in FIG. 8B. It will be appreciated that, since a mosaic (36a or 36b) can be transmitted as a single video picture to an other site, via WAN 15 (FIGS. 1 and 4), only one codec and digital trunk are required. Of course, if only a single individual video picture is required to be sent from a site, it may be sent directly without being included in a mosaic.

Figure 8C:
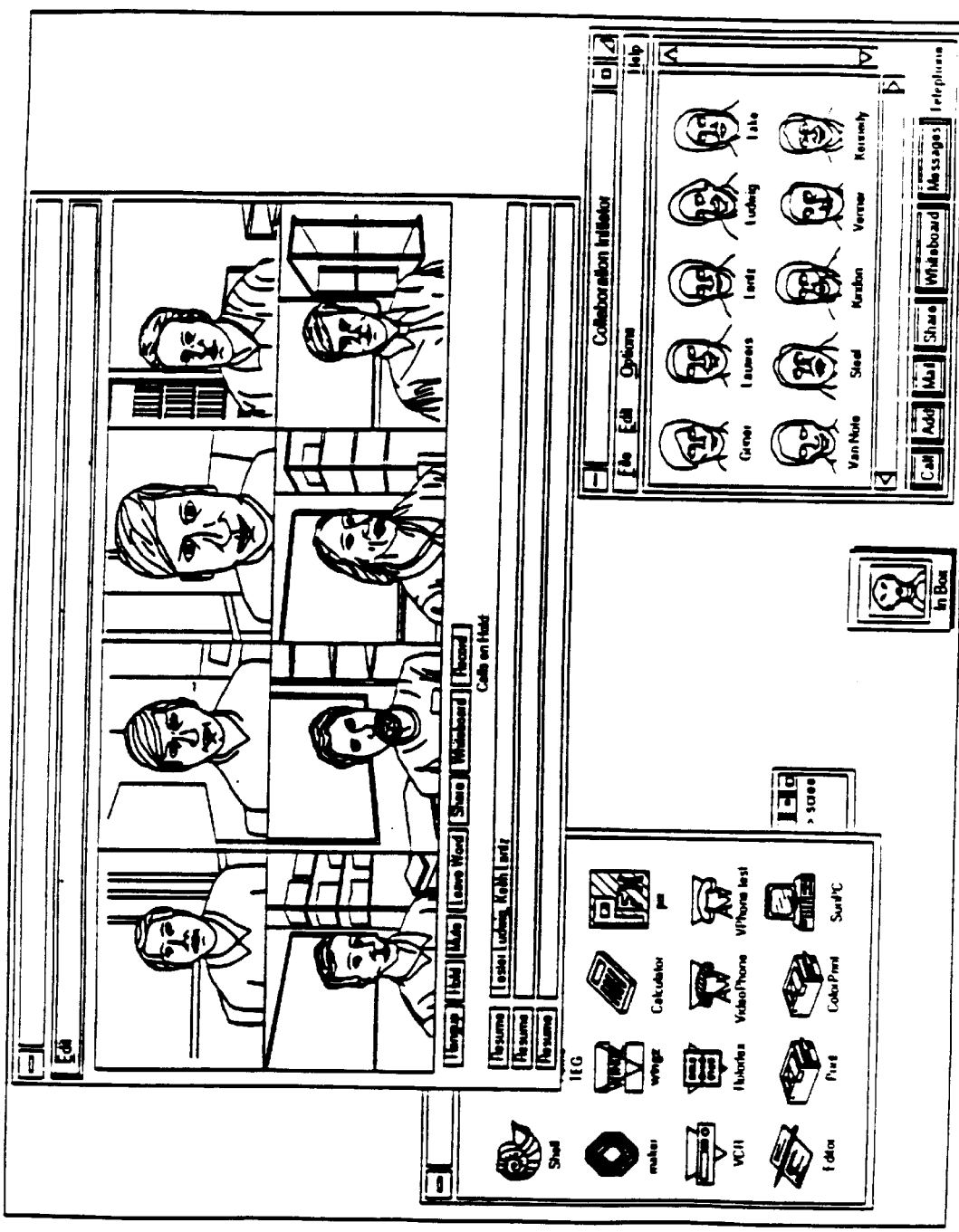

Note that for large conferences it is possible to employ multiple video mosaics, one for each video window supported by the CMWs (see, e.g., FIG. 8C). In very large conferences, it is also possible to display video only from a select focus group whose members are selected by a dynamic "floor control" mechanism. Also note that, with additional mosaic hardware, it is possible to give each CMW its own mosaic. This can be used in small conferences to raise the maximum number of participants (from $M^2$ to $M^2+1$—i.e., 5, 10, 17, etc.) or to give everyone in a large conference their own "focus group" view.

Also note that the entire video mosaicing approach described thus far and continued below applies should digital video transmission be used in lieu of analog transmission, particularly since both mosaic and video window implementations use digital formats internally and in current products are transformed to and from analog for external interfacing. In particular, note that mosaicing can be done digitally without decompression with many existing compression schemes. Further, with an all-digital approach, mosaicing can be done as needed directly on the CMW.

Figure 9:
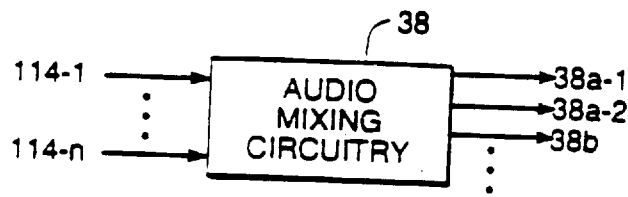
FIG. 9 is a block diagram illustrating a preferred embodiment of audio mixing circuitry provided in the MLAN of FIG. 3.

FIG. 9 illustrates preferred audio mixing circuitry 38 for use in conjunction with the video mosaicing circuitry 36 in FIG. 7, both of which may be part of conference bridges 35 in FIG. 3. As shown in FIG. 9, audio signals 114-1 to 114-n are applied to audio summing circuitry 38 for combination. These input audio signals 114-1 to 114-n may include audio signals from local participants as well as audio sums from participants at distant sites. Audio mixing circuitry 38 provides a respective "minus-1" sum output 38-1, 38a-2, etc.

for each participant. Thus, each participant hears every conference participant's audio except his/her own.

In the preferred embodiment, sums are decomposed and formed in a distributed fashion, creating partial sums at one site which are completed at other sites by appropriate signal insertion. Accordingly, audio mixing circuitry 38 is able to provide one or more additional sums, such as indicated by output 38, for sending to other sites having conference participants.

Next to be considered is the manner in which video cut-and-paste techniques are advantageously employed in the preferred embodiment. It will be understood that, since video mosaics and/or individual video pictures may be sent from one or more other sites, the problem arises as to how these situations are handled. In the preferred embodiment, video cut-and-paste circuitry 39, as illustrated in FIG. 10, is provided for this purpose, and may also be incorporated in the conference bridges 35 in FIG. 3.

Figure 10:
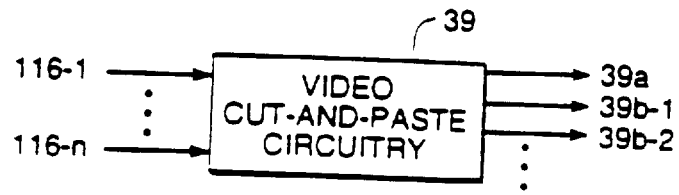
FIG. 10 is a block diagram illustrating video cut-and-paste circuitry provided in the MLAN of FIG. 3.

Referring to FIG. 10, video cut-and-paste circuitry receives analog video inputs 116, which may be comprised of one or more mosaics or single video pictures received from one or more distant sites and a mosaic or single video picture produced by the local site. It is assumed that the local video mosaicing circuitry 36 (FIG. 7) and the video cut-and-paste circuitry 39 have the capability of handling all of the applied individual video pictures, or at least are able to choose which ones are to be displayed based on existing available signals.

The video cut-and-paste circuitry 39 digitizes the incoming analog video inputs 116, selectively rearranges the digital signals on a region-by-region basis to produce a single digital M-by-M mosaic, having individual pictures in selected regions, and then converts the resulting digital mosaic back to analog form to provide a single analog mosaic picture 39a for sending to local participants (and other sites where required) having the individual input video pictures in appropriate regions. This resulting cut-and-paste analog mosaic 39a will provide the same type of display as illustrated in FIG. 8B. As will become evident hereinafter, it is sometimes beneficial to send different cut-and-paste mosaics to different sites, in which case video cut-and-paste circuitry 39 will provide additional cut-and-paste mosaics 39b-1, 39b-2, etc. for this purpose.

Figure 11:
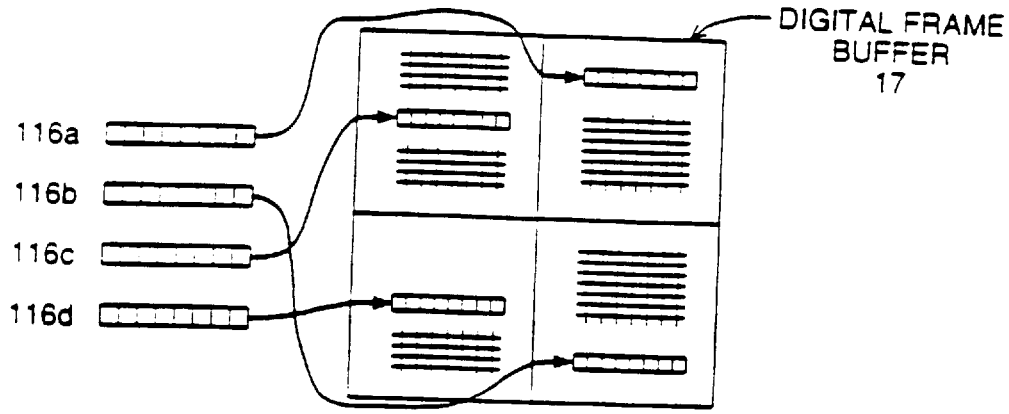
FIG. 11 is a schematic diagram illustrating typical operation of the video cut-and-paste circuitry in FIG. 10.

FIG. 11 diagrammatically illustrates an example of how video cut-and-paste circuitry may operate to provide the cut-and-paste analog mosaic 39a. As shown in FIG. 11, four digitized individual signals 116a, 116b, 116c derived from the input video signals are "pasted" into selected regions of a digital frame buffer 17 to form a digital 2×2 mosaic, which is converted into an output analog video mosaic 39a or 39b in FIG. 10. The required audio partial sums may be provided by audio mixing circuitry 39 in FIG. 9 in the same manner, replacing each cut-and-paste video operation with a partial sum operation.

Having described in connection with FIGS. 7–11 how video mosaicing, audio mixing, video cut-and-pasting, and distributed audio mixing may be performed, the following description of FIGS. 12–17 will illustrate how these capabilities may advantageously be used in combination in the context of wide-area videoconferencing. For these examples, the teleconference is assumed to have four participants designated as A, B, C and D, in which case 2×2 (quad) mosaics are employed. It is to be understood that greater numbers of participants could be provided. Also, two or more simultaneously occurring teleconferences could also be handled, in which case additional mosaicing, cut-and-paste and audio mixing circuitry would be provided at the various sites along with additional WAN paths. For each example, the "A" figure illustrates the video mosaicing and cut-and-pasting provided, and the corresponding "B" figure (having the same figure number) illustrates the associated audio mixing provided. Note that these figures indicate typical delays that might be encountered for each example (with a single "UNIT" delay ranging from 0–450 milliseconds, depending upon available compression technology).

Figure 12A:
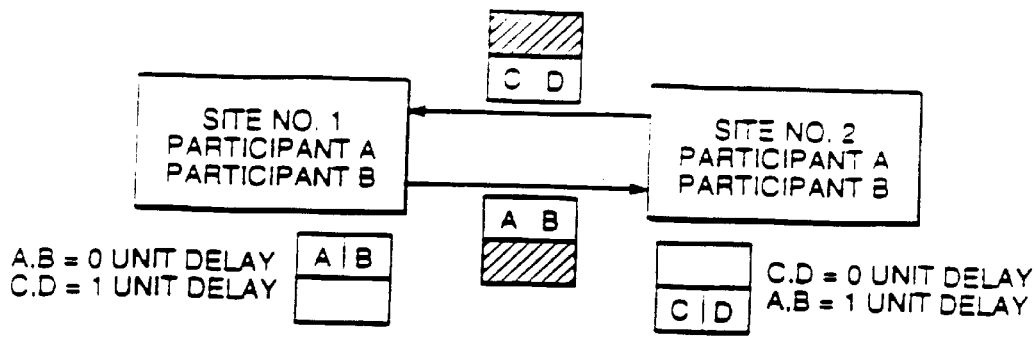
FIGS. 12–17 (consisting of FIGS. 12A, 12B, 13A, 13B, 14A, 14B, 15A, 15B, 16, 17A and 17B) illustrate various examples of how a preferred embodiment of the present invention provides video mosaicing, video cut-and-pasting, and audio mixing at a plurality of distant sites for transmission over a wide area network in order to provide, at the CMW of each conference participant, video images and audio captured from the other conference participants.
Figure 12B:
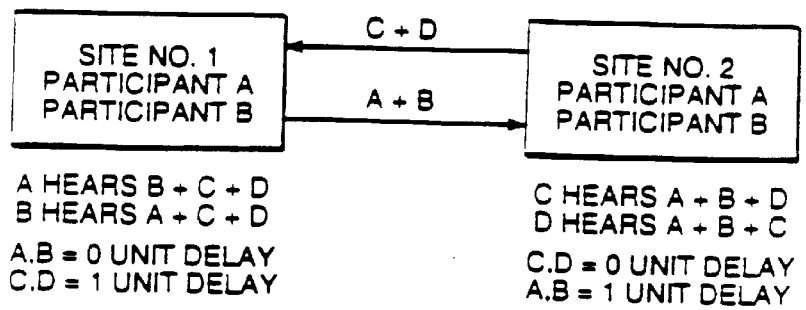

FIGS. 12A and 12B illustrate a 2-site example having two participants A and B at Site #1 and two participants C and D at Site #2. Note that this example requires mosaicing and cut-and-paste at both sites.

Figure 13A:
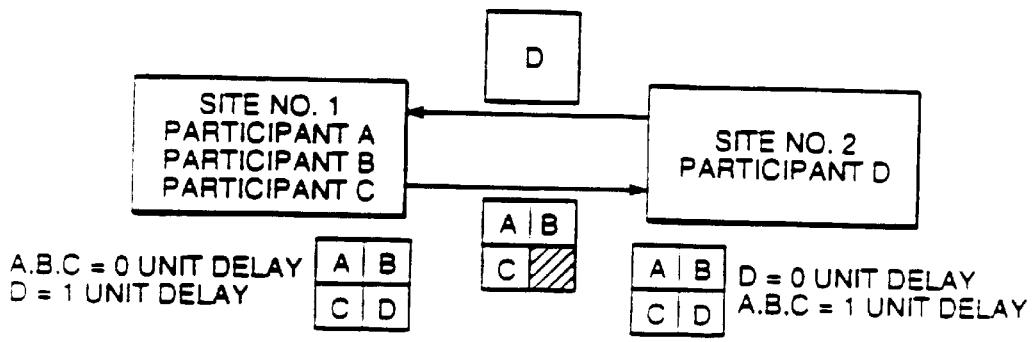
Figure 13B:
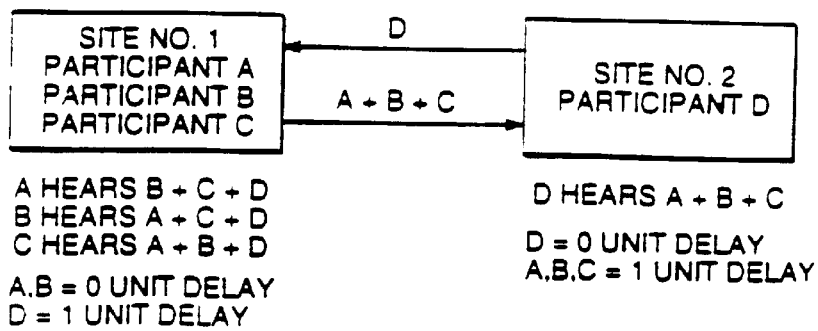

FIGS. 13A and 13B illustrate another 2-site example, but having three participants A, B and C at Site #1 and one participant D at Site #2. Note that this example requires mosaicing at both sites, but cut-and-paste only at Site #2.

Figure 14A:
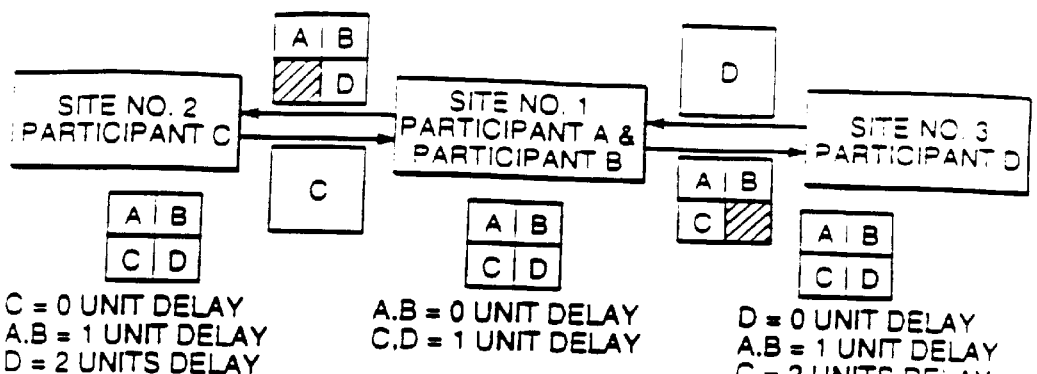
Figure 14B:
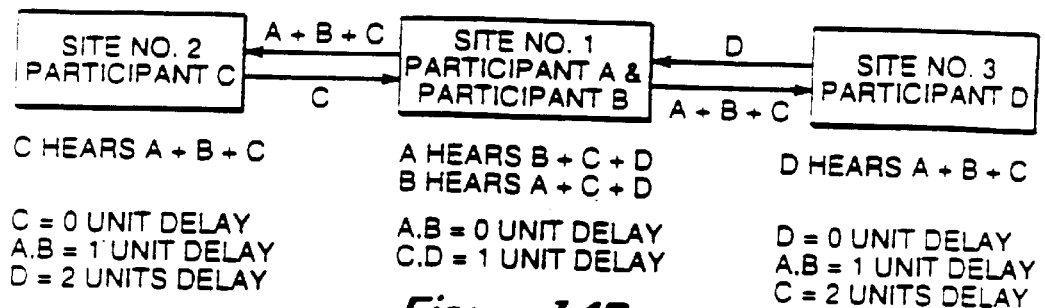

FIGS. 14A and 14B illustrate a 3-site example having participants A and B at Site #1, participant C at Site #2, and participant D at Site #3. At Site #1, the three local videos A, B and C are put into a mosaic which is sent to both Site #2 and Site #3. At Site #2 and Site #3, cut-and-paste is used to insert the single video (C or D) at that site into the empty region in the imported A, B, C mosaic, as shown. Accordingly, mosaicing is required at all three sites, and cut-and-paste is required for only Site #2 and Site #3.

Figure 15A:
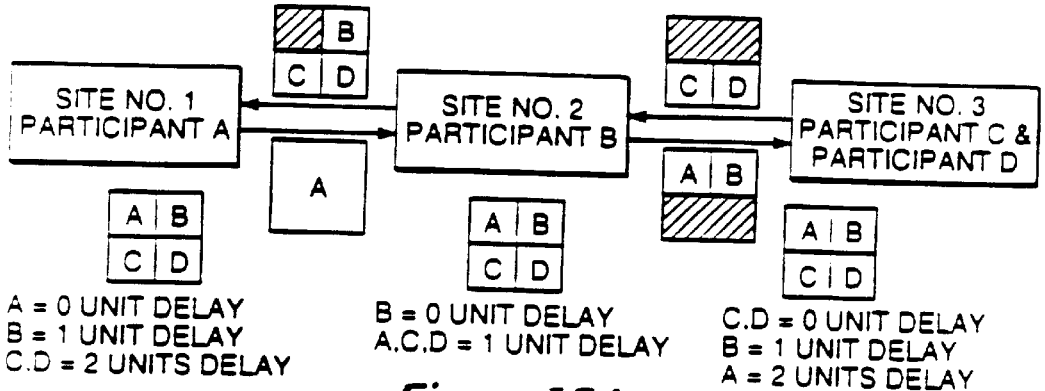
Figure 15B:
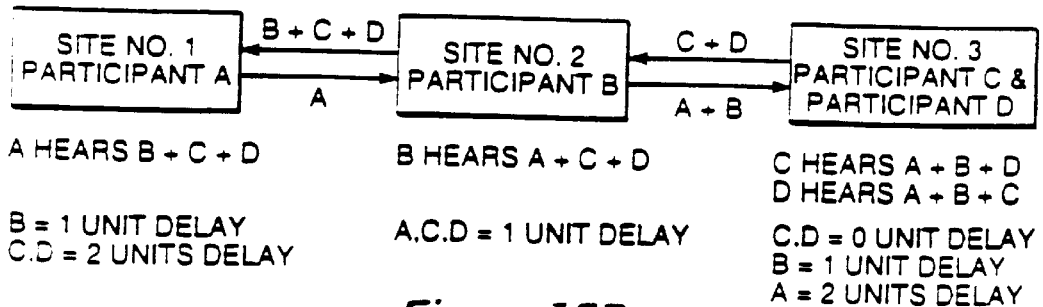

FIGS. 15A and 15B illustrate another 3-site example having participant A at Site #1, participant B at Site #2, and participants C and D at Site #3. Note that mosaicing and cut-and-paste are required at all sites. Site #2 additionally has the capability to send different cut-and-paste mosaics to Sites #1 and Sites #3. Further note with respect to FIG. 15B that Site #2 creates minus-1 audio mixes for Site #1 and Site #2, but only provides a partial audio mix (A&B) for Site #3. These partial mixes are completed at Site #3 by mixing in C's signal to complete D's mix (A+B+C) and D's signal to complete C's mix (A+B+D).

Figure 16:
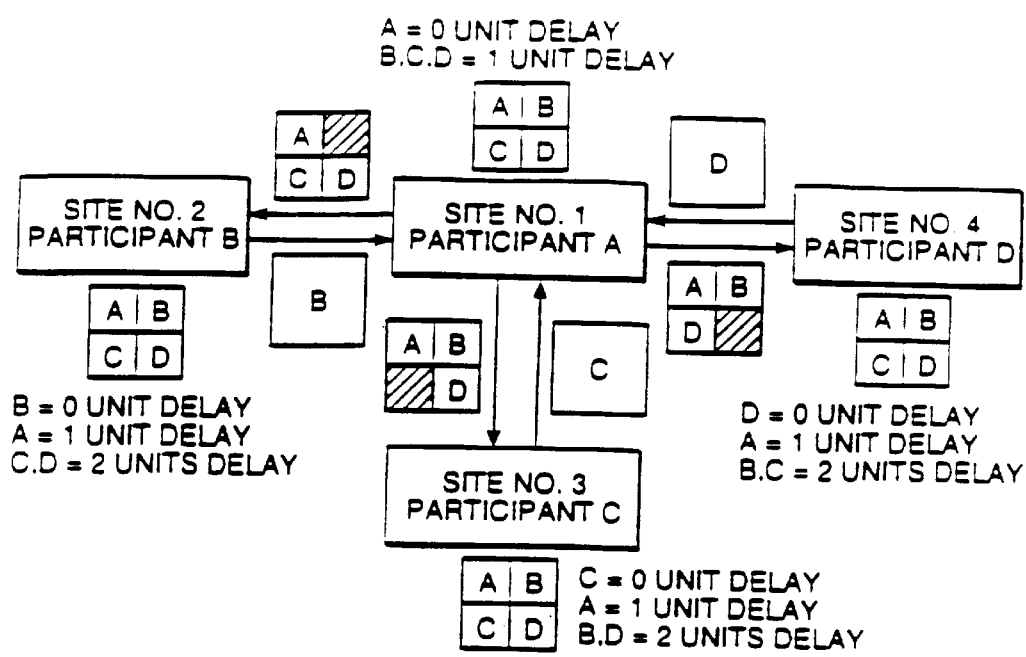

FIG. 16 illustrates a 4-site example employing a star topology, having one participant at each site; that is, participant A is at Site #1, participant B is at Site #2, participant C is at Site #3, and participant D is at Site #4. An audio implementation is not illustrated for this example, since standard minus-1 mixing can be performed at Site #1, and the appropriate sums transmitted to the other sites.

Figure 17A:
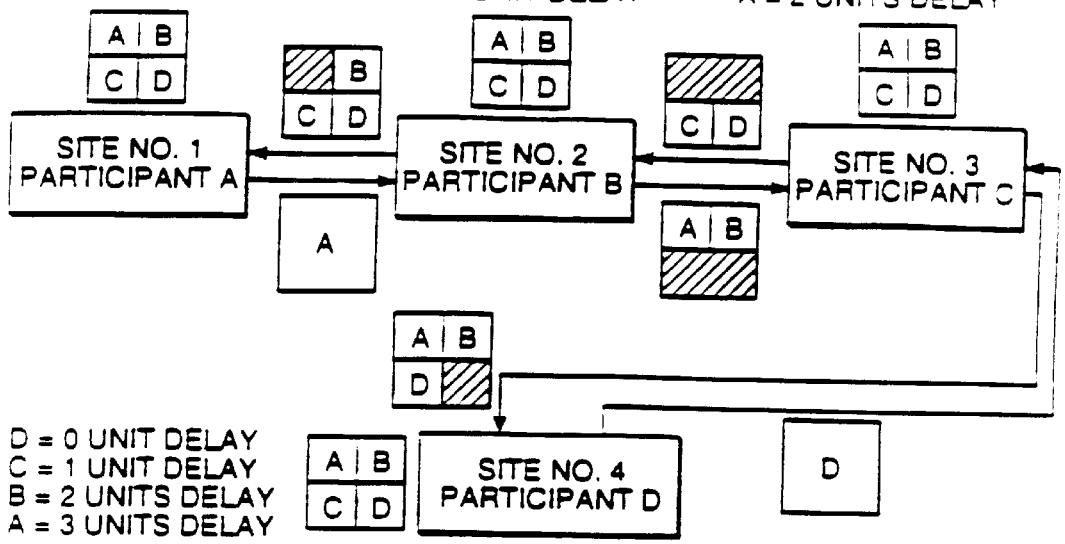
Figure 17B:
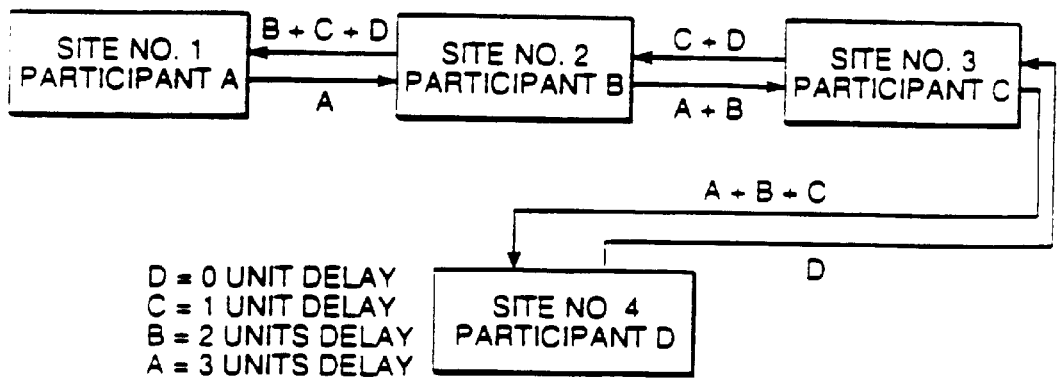

FIGS. 17A and 17B illustrate a 4-site example that also has only one participant at each site, but uses a line topology rather than a star topology as in the example of FIG. 16. Note that this example requires mosaicing and cut-and-paste at all sites. Also note that Site #2 and Site #3 are each required to transmit two different types of cut-and-paste mosaics.

The preferred embodiment also provides the capability of allowing a conference participant to select a close-up of a participant displayed on a mosaic. This capability is provided whenever a full individual video picture is available at that user's site. In such case, the A/V Switching Circuitry 30 (FIG. 3) switches the selected full video picture (whether obtained locally or from another site) to the CMW that requests the close-up.

Next to be described in connection with FIGS. 18A, 18B, 19 and 20 are various preferred embodiments of a CMW in accordance with the invention.

COLLABORATIVE MULTIMEDIA WORKSTATION HARDWARE

Figure 18A:
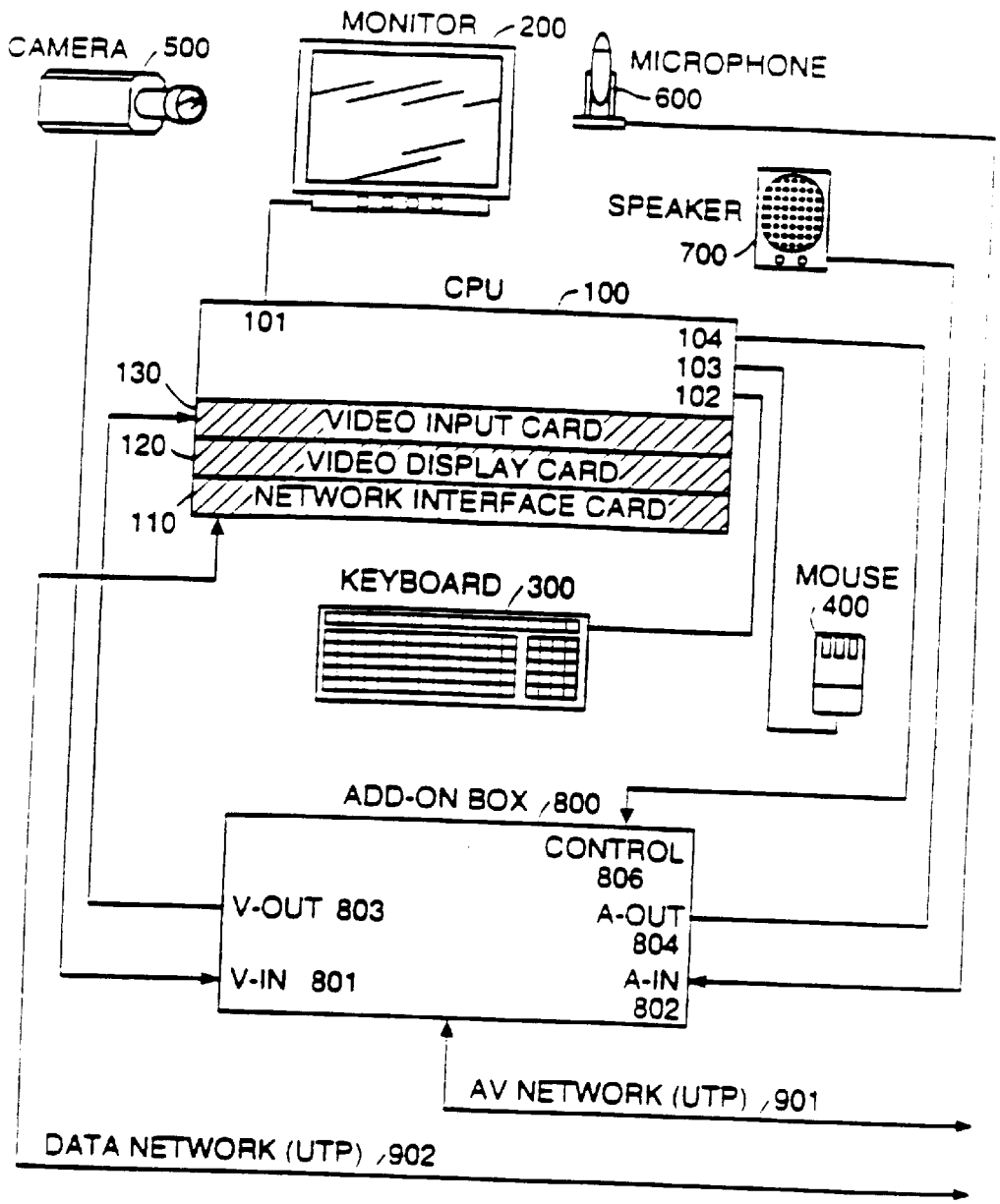
FIGS. 18A and 18B illustrate various preferred embodiments of a CMW which may be employed in accordance with the present invention.

One embodiment of a CMW 12 of the present invention is illustrated in FIG. 18A. Currently available personal computers (e.g., an Apple Macintosh or an IBM-compatible PC, desktop or laptop) and workstations (e.g., a Sun SPARCstation) can be adapted to work with the present invention to provide such features as real-time videoconferencing, data conferencing, multimedia mail, etc. In business situations, it can be advantageous to set up a laptop to operate with reduced functionality via cellular telephone links and removable storage media (e.g., CD-ROM, video tape with timecode support, etc.), but take on full capability back in the office via a docking station connected to the MLAN 10. This requires a voice and data modem as yet another function server attached to the MLAN.

The currently available personal computers and workstations serve as a base workstation platform. The addition of certain audio and video I/O devices to the standard components of the base platform 100 (where standard components include the display monitor 200, keyboard 300 and mouse or tablet (or other pointing device) 400), all of which connect with the base platform box through standard peripheral ports 101, 102 and 103, enables the CMW to generate and receive real-time audio and video signals. These devices include a video camera 500 for capturing the user's image, gestures and surroundings (particularly the user's face and upper body), a microphone 600 for capturing the user's spoken words (and any other sounds generated at the CMW), a speaker 700 for presenting incoming audio signals (such as the spoken words of another participant to a videoconference or audio annotations to a document), a video input card 130 in the base platform 100 for capturing incoming video signals (e.g., the image of another participant to a videoconference, or videomail), and a video display card 120 for displaying video and graphical output on monitor 200 (where video is typically displayed in a separate window).

These peripheral audio and video I/O devices are readily available from a variety of vendors and are just beginning to become standard features in (and often physically integrated into the monitor and/or base platform of) certain personal computers and workstations. See, e.g., the aforementioned BYTE article ("Video Conquers the Desktop"), which describes current models of Apple's Macintosh AV series personal computers and Silicon Graphics' Indy workstations.

Add-on box 800 (shown in FIG. 18A and illustrated in greater detail in FIG. 19) integrates these audio and video I/O devices with additional functions (such as adaptive echo canceling and signal switching) and interfaces with AV Network 901. AV Network 901 is the part of the MLAN 10 which carries bidirectional audio and video signals among the CMWs and A/V Switching Circuitry 30—e.g., utilizing existing UTP wiring to carry audio and video signals (digital or analog, as in the present embodiment).

In the present embodiment, the AV network 901 is separate and distinct from the Data Network 902 portion of the MLAN 10, which carries bidirectional data signals among the CMWs and the Data LAN hub (e.g., an Ethernet network that also utilizes UTP wiring in the present embodiment with a network interface card 110 in each CMW). Note that each CMW will typically be a node on both the AV and the Data Networks.

There are several approaches to implementing Add-on box 800. In a typical videoconference, video camera 500 and microphone 600 capture and transmit outgoing video and audio signals into ports 801 and 802, respectively, of Add-on box 800. These signals are transmitted via Audio/Video I/O port 805 across AV Network 901. Incoming video and audio signals (from another videoconference participant) are received across AV network 901 through Audio/Video I/O port 805. The video signals are sent out of V-OUT port 803 of CMW add-on box 800 to video input card 130 of base platform 100, where they are displayed (typically in a separate video window) on monitor 200 utilizing the standard base platform video display card 120. The audio signals are sent out of A-OUT port 804 of CMW add-on box 800 and played through speaker 700 while the video signals are displayed on monitor 200. The same signal flow occurs for other non-teleconferencing applications of audio and video.

Add-on box 800 can be controlled by CMW software (illustrated in FIG. 20) executed by base platform 100. Control signals can be communicated between base platform port 104 and Add-on box Control port 806 (e.g., an RS-232, Centronics, SCSI or other standard communications port).

Many other embodiments of the CMW illustrated in FIG. 18A will work in accordance with the present invention. For example, Add-on box 800 itself can be implemented as an add-in card to the base platform 100. Connections to the audio and video I/O devices need not change, though the connection for base platform control can be implemented internally (e.g., via the system bus) rather than through an external RS-232 or SCSI peripheral port. Various additional levels of integration can also be achieved as will be evident to those skilled in the art. For example, microphones, speakers, video cameras and UTP transceivers can be integrated into the base platform 100 itself, and all media handling technology and communications can be integrated onto a single card.

A handset/headset jack enables the use of an integrated audio I/O device as an alternate to the separate microphone and speaker. A telephone interface could be integrated into add-on box 800 as a local implementation of computer-integrated telephony. A "hold" (i.e., audio and video mute) switch and/or a separate audio mute switch could be added to Add-on box 800 if such an implementation were deemed preferable to a software-based interface.

Figure 19:
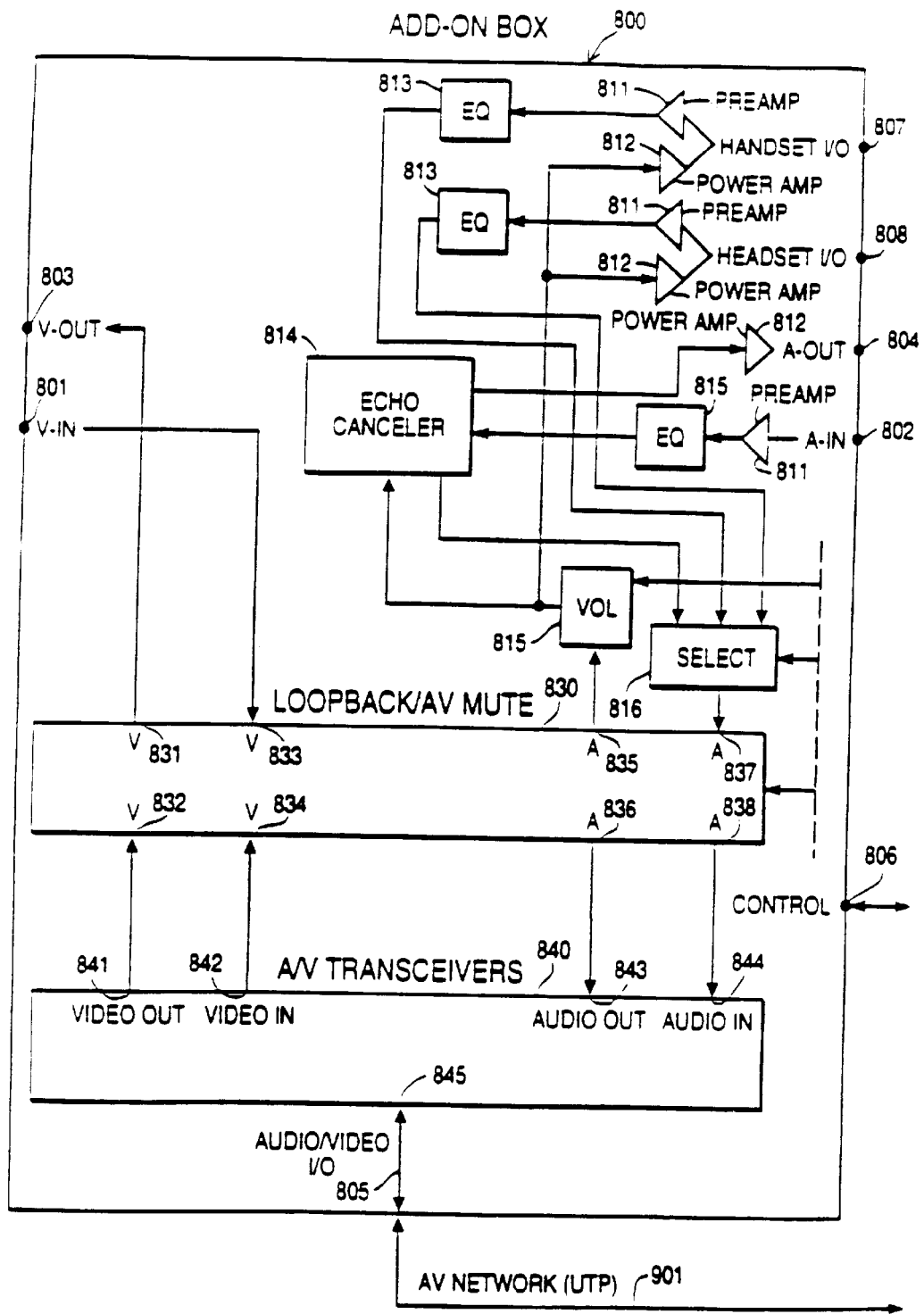
FIG. 19 is a schematic diagram of a preferred embodiment of a CMW add-on box containing integrated audio and video I/O circuitry in accordance with the present invention.

The internals of Add-on box 800 of FIG. 18A are illustrated in FIG. 19. Video signals generated at the CMW (e.g., captured by camera 500 of FIG. 18A) are sent to CMW add-on box 800 via V-IN port 801. They then typically pass unaffected through Loopback/AV Mute circuitry 830 via video ports 833 (input) and 834 (output) and into A/V Transceivers 840 (via Video In port 842) where they are transformed from standard video cable signals to UTP signals and sent out via port 845 and Audio/Video I/O port 805 onto AV Network 901.

The Loopback/AV Mute circuitry 830 can, however, be placed in various modes under software control via Control port 806 (implemented, for example, as a standard UART). If in loopback mode (e.g., for testing incoming and outgoing signals at the CMW), the video signals would be routed back out V-OUT port 803 via video port 831. If in a mute mode (e.g., muting audio, video or both), video signals might, for example, be disconnected and no video signal would be sent out video port 834. Loopback and muting switching functionality is also provided for audio in a similar way. Note that computer control of loopback is very useful for remote testing and diagnostics while manual override of computer control on mute is effective for assured privacy from use of the workstation for electronic spying.

Video input (e.g., captured by the video camera at the CMW of another videoconference participant) is handled in a similar fashion. It is received along AV Network 901 through Audio/Video I/O port 805 and port 845 of A/V Transceivers 840, where it is sent out Video Out port 841 to video port 832 of Loopback/AV Mute circuitry 830, which typically passes such signals out video port 831 to V-OUT port 803 (for receipt by a video input card or other display mechanism, such as LCD display 810 of CMW Side Mount unit 850 in FIG. 18B, to be discussed).

Audio input and output (e.g., for playback through speaker 700 and capture by microphone 600 of FIG. 18A) passes through A/V transceivers 840 (via Audio In port 844 and Audio Out port 843) and Loopback/AV Mute circuitry 830 (through audio ports 837/838 and 836/835) in a similar manner. The audio input and output ports of Add-on box 800 interface with standard amplifier and equalization circuitry, as well as an adaptive room echo canceler 814 to eliminate echo, minimize feedback and provide enhanced audio performance when using a separate microphone and speaker. In particular, use of adaptive room echo cancelers provides high-quality audio interactions in wide area conferences. Because adaptive room echo canceling requires training periods (typically involving an objectionable blast of high-amplitude white noise or tone sequences) for alignment with each acoustic environment, it is preferred that separate echo canceling be dedicated to each workstation rather than sharing a smaller group of echo cancelers across a larger group of workstations.

Audio inputs passing through audio port 835 of Loopback/AV Mute circuitry 830 provide audio signals to a speaker (via standard Echo Canceler circuitry 814 and A-OUT port 804) or to a handset or headset (via I/O ports 807 and 808, respectively, under volume control circuitry 815 controlled by software through Control port 806). In all cases, incoming audio signals pass through power amplifier circuitry 812 before being sent out of Add-on box 800 to the appropriate audio-emitting transducer.

Outgoing audio signals generated at the CMW (e.g., by microphone 600 of FIG. 18A or the mouthpiece of a handset or headset) enter Add-on box 800 via A-IN port 802 (for a microphone) or Handset or Headset I/O ports 807 and 808, respectively. In all cases, outgoing audio signals pass through standard preamplifier (811) and equalization (813) circuitry, whereupon the desired signal is selected by standard "Select" switching circuitry 816 (under software control through Control port 806) and passed to audio port 837 of Loopback/AV Mute circuitry 830.

It is to be understood that A/V Transceivers 840 may include muxing/demuxing facilities so as to enable the transmission of audio/video signals on a single pair of wires, e.g., by encoding audio signals digitally in the vertical retrace interval of the analog video signal. Implementation of other audio and video enhancements, such as stereo audio and external audio/video I/O ports (e.g., for recording signals generated at the CMW), are also well within the capabilities of one skilled in the art. If stereo audio is used in teleconferencing (i.e., to create useful spatial metaphors for users), a second echo canceler may be recommended.

Figure 18B:
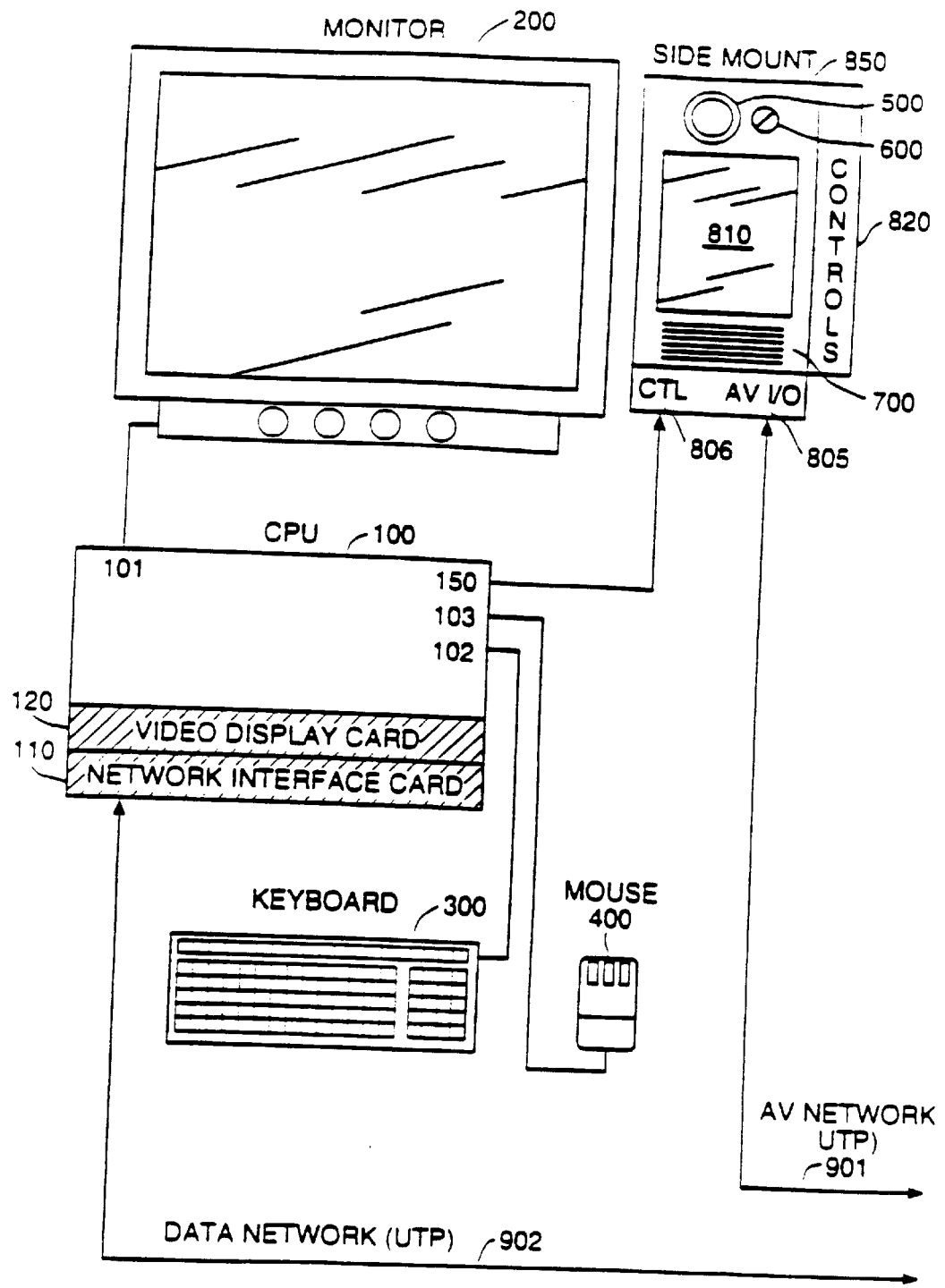

Another embodiment of the CMW of this invention, illustrated in FIG. 18B, utilizes a separate (fully self-contained) "Side Mount" approach which includes its own dedicated video display. This embodiment is advantageous in a variety of situations, such as instances in which additional screen display area is desired (e.g., in a laptop computer or desktop system with a small monitor) or where it is impossible or undesirable to retrofit older, existing or specialized desktop computers for audio/video support. In this embodiment, video camera 500, microphone 600 and speaker 700 of FIG. 18A are integrated together with the functionality of Add-on box 800. Side Mount 850 eliminates the necessity of external connections to these integrated audio and video I/O devices, and includes an LCD display 810 for displaying the incoming video signal (which thus eliminates the need for a base platform video input card 130).

Given the proximity of Side Mount device 850 to the user, and the direct access to audio/video I/O within that device, various additional controls 820 can be provided at the user's touch (all well within the capabilities of those skilled in the art). Note that, with enough additions, Side Mount unit 850 can become virtually a standalone device that does not require a separate computer for services using only audio and video. This also provides a way of supplementing a network of full-feature workstations with a few low-cost additional "audio video intercoms" for certain sectors of an enterprise (such as clerical, reception, factory floor, etc.).

A portable laptop implementation can be made to deliver multimedia mail with video, audio and synchronized annotations via CD-ROM or an add-on videotape unit with separate video, audio and time code tracks (a stereo videotape player can use the second audio channel for time code signals). Videotapes or CD-ROMs can be created in main offices and express mailed, thus avoiding the need for high-bandwidth networking when on the road. Cellular phone links can be used to obtain both voice and data communications (via modems). Modem-based data communications are sufficient to support remote control of mail or presentation playback, annotation, file transfer and fax features. The laptop can then be brought into the office and attached to a docking station where the available MLAN 10 and additional functions adapted from Add-on box 800 can be supplied, providing full CMW capability.

COLLABORATIVE MULTIMEDIA WORKSTATION SOFTWARE

CMW software modules 160 are illustrated generally in FIG. 20 and discussed in greater detail below in conjunction with the software running on MLAN Server 60 of FIG. 3. Software 160 allows the user to initiate and manage (in conjunction with the server software) videoconferencing, data conferencing, multimedia mail and other collaborative sessions with other users across the network.

Also present on the CMW in this embodiment are standard multitasking operating system/GUI software 180 (e.g., Apple Macintosh System 7, Microsoft Windows 3. 1, or UNIX with the "X Window System" and Motif or other GUI "window manager" software) as well as other applications 170, such as word processing and spreadsheet programs. Software modules 161–168 communicate with operating system/GUI software 180 and other applications 170 utilizing standard function calls and interapplication protocols.

The central component of the Collaborative Multimedia Workstation software is the Collaboration Initiator 161. All collaborative functions can be accessed through this module. When the Collaboration Initiator is started, it exchanges initial configuration information with the Audio Video Network Manager (AVNM) 60 (shown in FIG. 3) through Data Network 902. Information is also sent from the Collaboration Initiator to the AVNM indicating the location of the user, the types of services available on that workstation (e.g., videoconferencing, data conferencing, telephony, etc.) and other relevant initialization information.

The Collaboration Initiator presents a user interface that allows the user to initiate collaborative sessions (both realtime and asynchronous). In the preferred embodiment, session participants can be selected from a graphical rolodex 163 that contains a scrollable list of user names or from a list of quick-dial buttons 162. Quick-dial buttons show the face icons for the users they represent. In the preferred embodiment, the icon representing the user is retrieved by the Collaboration Initiator from the Directory Server 66 on MLAN Server 60 when it starts up. Users can dynamically add new quick-dial buttons by dragging the corresponding entries from the graphical rolodex onto the quick-dial panel.

Once the user elects to initiate a collaborative session, he or she selects one or more desired participants by, for example, clicking on that name to select the desired participant from the system rolodex or a personal rolodex, or by clicking on the quick-dial button for that participant (see, e.g., FIG. 2A). In either case, the user then selects the desired session type—e.g., by clicking on a CALL button to initiate a videoconference call, a SHARE button to initiate the sharing of a snapshot image or blank whiteboard, or a MAIL button to send mail. Alternatively, the user can double-click on the rolodex name or a face icon to initiate the default session type—e.g., an audio/video conference call.

The system also allows sessions to be invoked from the keyboard. It provides a graphical editor to bind combinations of participants and session types to certain hot keys. Pressing this hot key (possibly in conjunction with a modifier key, e.g., <Shift> or <Ctrl>) will cause the Collaboration Initiator to start a session of the specified type with the given participants.

Figure 21:
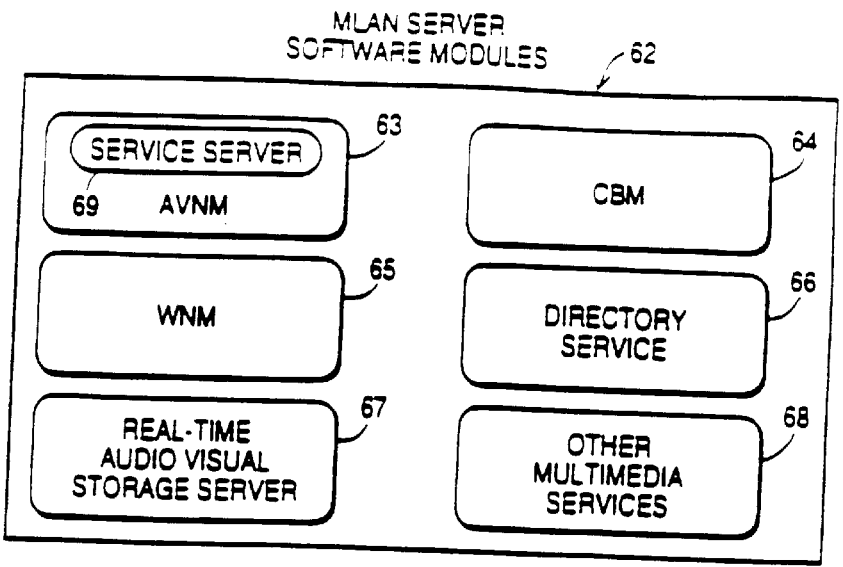
FIG. 21 illustrates software modules which may be provided for running on the MLAN Server in the MLAN of FIG. 3 for controlling operation of the AV and Data Networks.

Once the user selects the desired participant and session type, Collaboration Initiator module 161 retrieves necessary addressing information from Directory Service 66 (see FIG. 21). In the case of a videoconference call, the Collaboration Initiator then communicates with the AVNM (as described in greater detail below) to set up the necessary data structures and manage the various states of that call, and to control A/V Switching Circuitry 30, which selects the appropriate audio and video signals to be transmitted to/from each participant's CMW. In the case of a data conferencing session, the Collaboration Initiator locates, via the AVNM, the Collaboration Initiator modules at the CMWs of the chosen recipients, and sends a message causing the Collaboration Initiator modules to invoke the Snapshot Sharing modules 164 at each participant's CMW. Subsequent videoconferencing and data conferencing functionality is discussed in greater detail below in the context of particular usage scenarios.

As indicated previously, additional collaborative services—such as Mail 165, Application Sharing 166, Computer-Integrated Telephony 167 and Computer Integrated Fax 168—are also available from the CMW by utilizing Collaboration Initiator module 161 to initiate the session (i.e., to contact the participants) and to invoke the appropriate application necessary to manage the collaborative session. When initiating asynchronous collaboration (e.g., mail, fax, etc.), the Collaboration Initiator contacts Directory Service 66 for address information (e.g., EMAIL address, fax number, etc.) for the selected participants and invokes the appropriate collaboration tools with the obtained address information. For real-time sessions, the Collaboration Initiator queries the Service Server module 69 inside AVNM 63 for the current location of the specified participants. Using this location information, it communicates (via the AVNM) with the Collaboration Initiators of the other session participants to coordinate session setup. As a result, the various Collaboration Initiators will invoke modules 166, 167 or 168 (including activating any necessary devices such as the connection between the telephone and the CMW's audio I/O port). Further details on multimedia mail are provided below.

MLAN SERVER SOFTWARE

FIG. 21 diagrammatically illustrates software 62 comprised of various modules (as discussed above) provided for running on MLAN Server 60 (FIG. 3) in the preferred embodiment. It is to be understood that additional software modules could also be provided. It is also to be understood that, although the software illustrated in FIG. 21 offers various significant advantages, as will become evident hereinafter, different forms and arrangements of software may also be employed within the scope of the invention. The software can also be implemented in various sub-parts running as separate processes.

In the preferred embodiment, clients (e.g., software-controlling workstations, VCRs, laserdisks, multimedia resources, etc.) communicate with the MLAN Server Software Modules 62 using the TCP/IP network protocols. Generally, the AVNM 63 cooperates with the Service Server 69, Conference Bridge Manager (CBM 64 in FIG. 21) and the WAN Network Manager (WNM 65 in FIG. 21) to manage communications within and among both MLANs 10 and WANs 15 (FIGS. 1 and 3).

The AVNM additionally cooperates with Audio/Video Storage Server 67 and other multimedia services 68 in FIG. 21 to support various types of collaborative interactions as described herein. CBM 64 in FIG. 21 operates as a client of the AVNM 63 to manage conferencing by controlling the operation of conference bridges 35. This includes management of the video mosaicing circuitry 37, audio mixing circuitry 38 and cut-and-paste circuitry 39 preferably incorporated therein. WNM 65 manages the allocation of paths (codecs and trunks) provided by WAN gateway 40 for accomplishing the communications to other sites called for by the AVNM.

AUDIO VIDEO NETWORK MANAGER

The AVNM 63 manages A/V Switching Circuitry 30 in FIG. 3 for selectively routing audio/video signals to and from CMWs 12, and also to and from WAN gateway 40, as called for by clients. Audio/video devices (e.g., CMWs 12, conference bridges 35, multimedia resources 16 and WAN gateway 40 in FIG. 3) connected to A/V Switching Circuitry 30 in FIG. 3, have physical connections for audio in, audio out, video in and video out. For each device on the network, the AVNM combines these four connections into a port abstraction, wherein each port represents an addressable bidirectional audio/video channel. Each device connected to the network has at least one port. Different ports may share the same physical connections on the switch. For example, a conference bridge may typically have four ports (for 2×2 mosaicing) that share the same video-out connection. Not all devices need both video and audio connections at a port. For example, a TV tuner port needs only incoming audio/video connections.

In response to client program requests, the AVNM provides connectivity between audio/video devices by connecting their ports. Connecting ports is achieved by switching one port's physical input connections to the other port's physical output connections (for both audio and video) and vice-versa. Client programs can specify which of the 4 physical connections on its ports should be switched. This allows client programs to establish unidirectional calls (e.g., by specifying that only the port's input connections should be switched and not the port's output connections) and audio-only or video-only calls (by specifying audio connections only or video connections only).

SERVICE SERVER

Before client programs can access audio/video resources through the AVNM, they must register the collaborative services they provide with the Service Server 69. Examples of these services indicate "video call", "snapshot sharing", "conference" and "video file sharing." These service records are entered into the Service Server's service database. The service database thus keeps track of the location of client programs and the types of collaborative sessions in which they can participate. This allows the Collaboration Initiator to find collaboration participants no matter where they are located. The service database is replicated by all Service Servers: Service Servers communicate with other Service Servers in other MLANs throughout the system to exchange their service records.

Clients may create a plurality of services, depending on the collaborative capabilities desired. When creating a service, a client can specify the network resources (e.g. ports) that will be used by this service. In particular, service information is used to associate a user with the audio/video ports physically connected to the particular CMW into which the user is logged in. Clients that want to receive requests do so by putting their services in listening mode. If clients want to accept incoming data shares, but want to block incoming video calls, they must create different services.

A client can create an exclusive service on a set of ports to prevent other clients from creating services on these ports. This is useful, for example, to prevent multiple conference bridges from managing the same set of conference bridge ports.

Next to be considered is the preferred manner in which the AVNM 63 (FIG. 21), in cooperation with the Service Server 69, CBM 64 and participating CMWs provide for managing A/V Switching Circuitry 30 and conference bridges 35 in FIG. 3 during audio/video/data teleconferencing. The participating CMWs may include workstations located at both local and remote sites.

BASIC TWO-PARTY VIDEOCONFERENCING

As previously described, a CMW includes a Collaboration Initiator software module 161, (see FIG. 20) which is used to establish person-to-person and multiparty calls. The corresponding collaboration initiator window advantageously provides quick-dial face icons of frequently dialed persons, as illustrated, for example, in FIG. 22, which is an enlarged view of typical face icons along with various initiating buttons (described in greater detail below in connection with FIGS. 35–42).

Videoconference calls can be initiated, for example, merely by double-clicking on these icons. When a call is initiated, the CMW typically provides a screen display that includes a live video picture of the remote conference participant, as illustrated for example in FIG. 8A. In the preferred embodiment, this display also includes control buttons/menu items that can be used to place the remote participant on hold, to resume a call on hold, to add one or more participants to the call, to initiate data sharing and to hang up the call.

Figure 23:
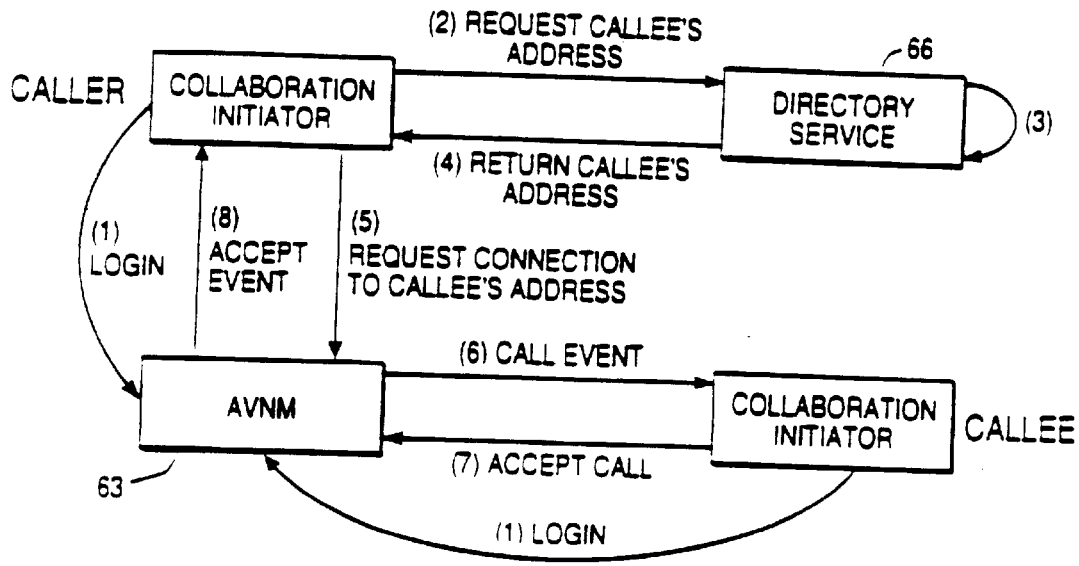
FIG. 23 is a diagrammatic representation of the basic operating events occurring in a preferred embodiment of the present invention during initiation of a two-party call.

The basic underlying software-controlled operations occurring for a two-party call are diagrammatically illustrated in FIG. 23. When a caller initiates a call (e.g., by selecting a user from the graphical rolodex and clicking the call button or by double-clicking the face icon of the callee on the quick-dial panel), the caller's Collaboration Initiator responds by identifying the selected user and requesting that user's address from Directory Service 66, as indicated by (2) in FIG. 23. Directory Service 66 looks up the callee's address in the directory database, as indicated by (3) in FIG. 23, and then returns it to the caller's Collaboration Initiator, as illustrated by (4) in FIG. 23.

The caller's Collaboration Initiator sends a request to the AVNM to place a video call to the caller with the specified address, as indicated by (5) in FIG. 23. The AVNM queries the Service Server to find the service instance of type "video call" whose name corresponds to the callee's address. This service record identifies the location of the callee's Collaboration Initiator as well as the network ports that the callee is connected to. If no service instance is found for the callee, the AVNM notifies the caller that the callee is not logged in. If the callee is local, the AVNM sends a call event to the callee's Collaboration Initiator, as indicated by (6) in FIG. 23. If the callee is at a remote site, the AVNM forwards the call request (5) through the WAN gateway 40 for transmission, via WAN 15 (FIG. 1) to the Collaboration Initiator of the callee's CMW at the remote site.

The callee's Collaboration Initiator can respond to the call event in a variety of ways. In the preferred embodiment, a user-selectable sound is generated to announce the incoming call. The Collaboration Initiator can then act in one of two modes. In "Telephone Mode," the Collaboration Initiator displays an invitation message on the CMW screen that contains the name of the caller and buttons to accept or refuse the call. The Collaboration Initiator will then accept or refuse the call, depending on which button is pressed by the callee. In "Intercom Mode," the Collaboration Initiator accepts all incoming calls automatically, unless there is already another call active on the callee's CMW, in which case behavior reverts to Telephone Mode.

The callee's Collaboration Initiator then notifies the AVNM as to whether the call will be accepted or refused. If the call is accepted, (7), the AVNM sets up the necessary communication paths between the caller and the callee required to establish the call. The AVNM then notifies the caller's Collaboration Initiator that the call has been established by sending it an accept event (8). If the caller and callee are at different sites, their AVNMs will coordinate in setting up the communication paths at both sites, as required by the call.

The AVNM may provide for managing connections among CMWs and other multimedia resources for audio/video/data communications in various ways. The manner employed in the preferred embodiment will next be described.

As has been described previously, the AVNM manages the switches in the A/V Switching Circuitry 30 in FIG. 3 to provide port-to-port connections in response to connection requests from clients. The primary data structure used by the AVNM for managing these connections will be referred to as a callhandle, which is comprised of a plurality of bits, including state bits.

Each port-to-port connection managed by the AVNM comprises two callhandles, one associated with each end of the connection. The callhandle at the client port of the connection permits the client to manage the client's end of the connection. The callhandle mode bits determine the current state of the callhandle and which of a port's four switch connections (video in, video out, audio in, audio out) are involved in a call.

AVNM clients send call requests to the AVNM whenever they want to initiate a call. As part of a call request, the client specifies the local service in which the call will be involved, the name of the specific port to use for the call, identifying information as to the callee, and the call mode. In response, the AVNM creates a callhandle on the caller's port.

All callhandles are created in the "idle" state. The AVNM then puts the caller's callhandle in the "active" state. The AVNM next creates a callhandle for the callee and sends it a call event, which places the callee's callhandle in the "ringing" state. When the callee accepts the call, its callhandle is placed in the "active" state, which results in a physical connection between the caller and the callee. Each port can have an arbitrary number of callhandles bound to it, but typically only one of these callhandles can be active at the same time.

After a call has been set up, AVNM clients can send requests to the AVNM to change the state of the call, which can advantageously be accomplished by controlling the callhandle states. For example, during a call, a call request from another party could arrive. This arrival could be signaled to the user by providing an alert indication in a dialog box on the user's CMW screen. The user could refuse the call by clicking on a refuse button in the dialog box, or by clicking on a "hold" button on the active call window to put the current call on hold and allow the incoming call to be accepted.

The placing of the currently active call on hold can advantageously be accomplished by changing the caller's callhandle from the active state to a "hold" state, which permits the caller to answer incoming calls or initiate new calls, without releasing the previous call. Since the connection set-up to the callee will be retained, a call on hold can conveniently be resumed by the caller clicking on a resume button on the active call window, which returns the corresponding callhandle back to the active state. Typically, multiple calls can be put on hold in this manner. As an aid in managing calls that are on hold, the CMW advantageously provides a hold list display, identifying these on-hold calls and (optionally) the length of time that each party is on hold. A corresponding face icon could be used to identify each on-hold call. In addition, buttons could be provided in this hold display which would allow the user to send a preprogrammed message to a party on hold. For example, this message could advise the callee when the call will be resumed, or could state that the call is being terminated and will be reinitiated at a later time.

Figure 24:
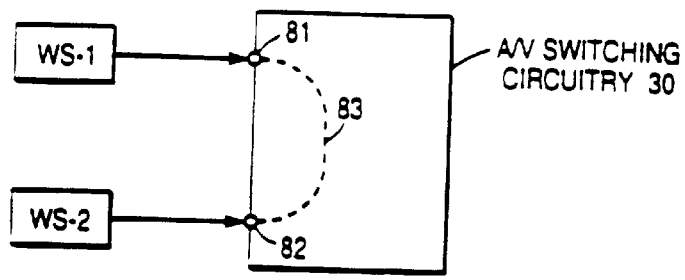
FIG. 24 is a block and schematic diagram illustrating how physical connections are established in the MLAN of FIG. 3 for physically connecting first and second workstations for a two-party videoconference call.

Reference is now directed to FIG. 24 which diagrammatically illustrates how two-party calls are connected for CMWs WS-1 and WS-2, located at the same MLAN 10. As shown in FIG. 24, CMWs WS-1 and WS-2 are coupled to the local A/V Switching Circuitry 30 via ports 81 and 82, respectively. As previously described, when CMW WS-1 calls CMW WS-2, a callhandle is created for each port. If CMW WS-2 accepts the call, these two callhandles become active and in response thereto, the AVNM causes the A/V Switching Circuitry 30 to set up the appropriate connections between ports 81 and 82, as indicated by the dashed line 83.

FIG. 25 diagrammatically illustrates how two-party calls are connected for CMWs WS-1 and WS-2 when located in different MLANs 10a and 10b. As illustrated in FIG. 25, CMW WS-1 of MLAN 10a is connected to a port 91a of A/V Switching Circuitry 30a of MLAN 10a, while CMW WS-2 is connected to a port 91b of the audio/video switching circuit 30b of MLAN 10b. It will be assumed that MLANs 10a and 10b can communicate with each other via ports 92a and 92b (through respective WAN gateways 40a and 40b and WAN 15). A call between CMWs WS-1 and WS-2 can then be established by AVNM of MLAN 10a in response to the creation of callhandles at ports 91a and 92a, setting up appropriate connections between these ports as indicated by dashed line 93a, and by AVNM of MLAN 10b, in response to callhandles created at ports 91 b and 92b, setting up appropriate connections between these ports as indicated by dashed line 93b. Appropriate paths 94a and 94b in WAN gateways 40a and 40b, respectively are set up by the WAN network manager 65 (FIG. 21) in each network.

CONFERENCE CALLS

Next to be described is the specific manner in which the preferred embodiment provides for multi-party conference calls (involving more than two participants). When a multi-party conference call is initiated, the CMW provides a screen that is similar to the screen for two-party calls, which displays a live video picture of the callee's image in a video window. However, for multi-party calls, the screen includes a video mosaic containing a live video picture of each of the conference participants (including the CMW user's own picture), as shown, for example, in FIG. 8B. Of course, other embodiments could show only the remote conference participants (and not the local CMW user) in the conference mosaic (or show a mosaic containing both participants in a two-party call). In addition to the controls shown in FIG. 8B, the multi-party conference screen also includes buttons/menu items that can be used to place individual conference participants on hold, to remove individual participants form the conference, to adjourn the entire conference, or to provide a "close-up" image of a single individual (in place of the video mosaic).

Multi-party conferencing requires all the mechanisms employed for 2-party calls. In addition, it requires the conference bridge manager CBM 64 (FIG. 21) and the conference bridges 36 (FIG. 3). The CBM acts as a client of the AVNM in managing the operation of the conference bridges 36. The CBM also acts a server to other clients on the network. The CBM makes conferencing services available by creating service records of type "conference" in the AVNM service database and associating these services with the ports on A/V Switching Circuitry 30 for connection to conference bridges 36.

Figure 22:
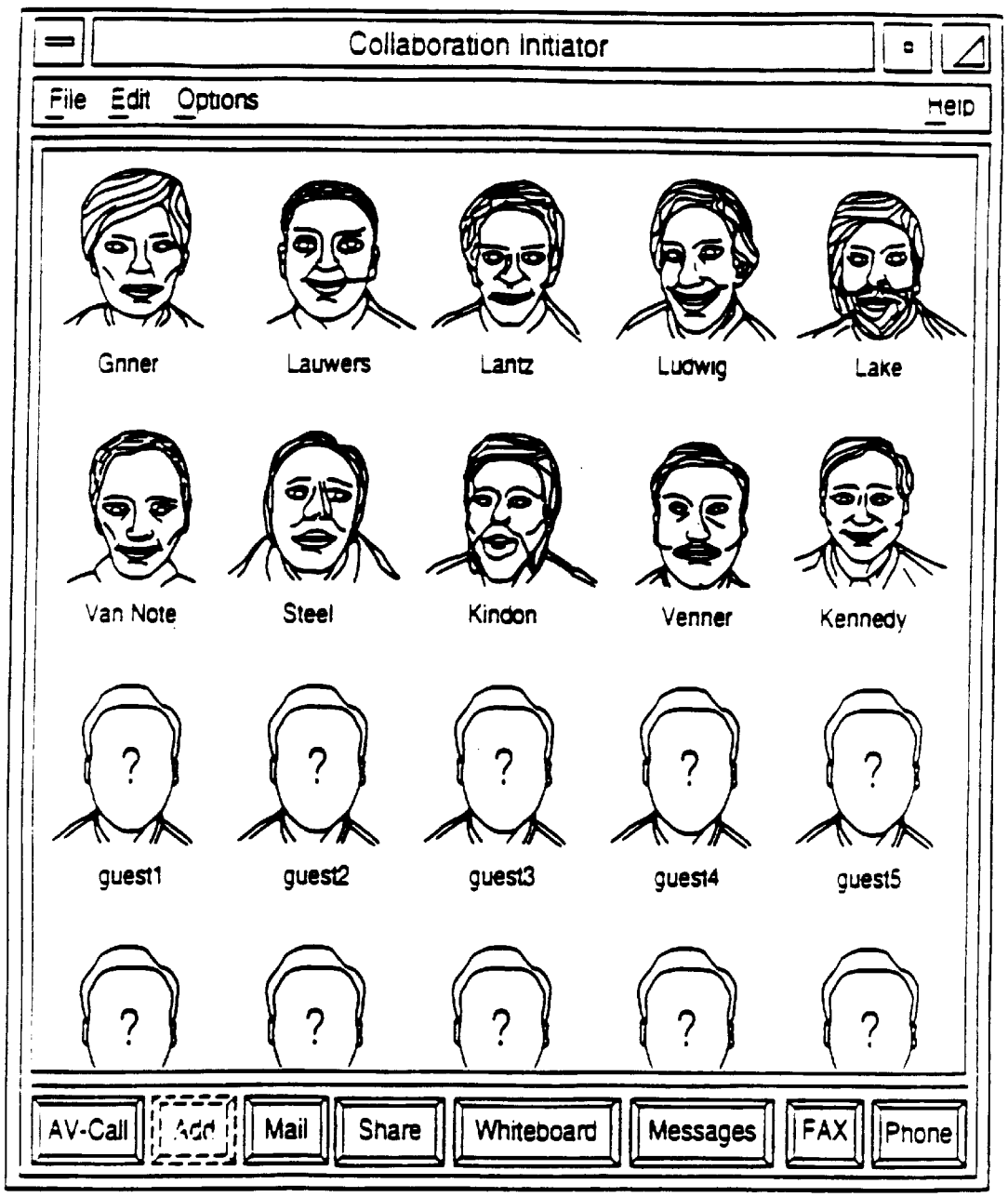
FIG. 22 illustrates an enlarged example of "speed-dial" face icons of certain collaboration participants in a Collaboration Initiator window on a typical CMW screen which may be generated during operation of a preferred embodiment of the present invention.

The preferred embodiment provides two ways for initiating a conference call. The first way is to add one or more parties to an existing two-party call. For this purpose, an ADD button is provided by both the Collaboration Initiator and the Rolodex, as illustrated in FIGS. 2A and 22. To add a new party, a user selects the party to be added (by clicking on the user's rolodex name or face icon as described above) and clicks on the ADD button to invite that new party. Additional parties can be invited in a similar manner. The second way to initiate a conference call is to select the parties in a similar manner and then click on the CALL button (also provided in the Collaboration Initiator and Rolodex windows on the user's CMW screen).

Another alternative embodiment is to initiate a conference call from the beginning by clicking on a CONFERENCE/MOSAIC icon/button/menu item on the CMW screen. This could initiate a conference call with the call initiator as the sole participant (i.e., causing a conference bridge to be allocated such that the caller's image also appears on his/her own screen in a video mosaic, which will also include images of subsequently added participants). New participants could be invited, for example, by selecting each new party's face icon and then clicking on the ADD button.

Next to be considered with reference to FIGS. 26 and 27 is the manner in which conference calls are handled in the preferred embodiment. For the purposes of this description it will be assumed that up to four parties may participate in a conference call. Each conference uses four bridge ports 136-1, 136-2, 136-3 and 136-4 provided on A/V Switching Circuitry 30a, which are respectively coupled to bidirectional audio/video lines 36-1, 36-2, 36-3 and 36-4 connected to conference bridge 36. However, from this description it will be apparent how a conference call may be provided for additional parties, as well as simultaneously occurring conference calls.

Once the Collaboration Initiator determines that a conference is to be initiated, it queries the AVNM for a conference service. If such a service is available, the Collaboration Initiator requests the associated CBM to allocate a conference bridge. The Collaboration Initiator then places an audio/video call to the CBM to initiate the conference. When the CBM accepts the call, the AVNM couples port 101 of CMW WS-1 to lines 36-1 of conference bridge 36 by a connection 137 produced in response to callhandles created for port 101 of WS-1 and bridge port 136-1.

When the user of WS-1 selects the appropriate face icon and clicks the ADD button to invite a new participant to the conference, which will be assumed to be CMW WS-3, the Collaboration Initiator on WS-1 sends an add request to the CBM. In response, the CBM calls WS-3 via WS-3 port 103. When CBM initiates the call, the AVNM creates callhandles for WS-3 port 103 and bridge port 136-2. When WS-3 accepts the call, its callhandle is made "active," resulting in connection 138 being provided to connect WS-3 and lines 136-2 of conference bridge 36. Assuming CMW WS-1 next adds CMW WS-5 and then CMW WS-8, callhandles for their respective ports and bridge ports 136-3 and 136-4 are created, in turn, as described above for WS-1 and WS-3, resulting in connections 139 and 140 being provided to connect WS-5 and WS-9 to conference bridge lines 36-3 and 36-4, respectively. The conferees WS-1, WS-3, WS-5 and WS-8 are thus coupled to conference bridge lines 136-1, 136-2, 136-3 and 136-4, respectively as shown in FIG. 26.

It will be understood that the video mosaicing circuitry 36 and audio mixing circuitry 38 incorporated in conference bridge 36 operate as previously described, to form a resulting four-picture mosaic (FIG. 8B) that is sent to all of the conference participants, which in this example are CMWs WS-1, WS-2, WS-5 and WS-8. Users may leave a conference by just hanging up, which causes the AVNM to delete the associated callhandles and to send a hangup notification to CBM. When CBM receives the notification, it notifies all other conference participants that the participant has exited. In the preferred embodiment, this results in a blackened portion of that participant's video mosaic image being displayed on the screen of all remaining participants.

The manner in which the CBM and the conference bridge 36 operate when conference participants are located at different sites will be evident from the previously described operation of the cut-and-paste circuitry 39 (FIG. 10) with the video mosaicing circuitry 36 (FIG. 7) and audio mixing circuitry 38 (FIG. 9). In such case, each incoming single video picture or mosaic from another site is connected to a respective one of the conference bridge lines 36-1 to 36-4 via WAN gateway 40.

The situation in which a two-party call is converted to a conference call will next be considered in connection with FIG. 27 and the previously considered 2-party call illustrated in FIG. 24. Converting this 2-party call to a conference requires that this two-party call (such as illustrated between WS-1 and WS-2 in FIG. 24) be rerouted dynamically so as to be coupled through conference bridge 36. When the user of WS-1 clicks on the ADD button to add a new party, (for example WS-5), the Collaboration Initiator of WS-1 sends a redirect request to the AVNM, which cooperates with the CBM to break the two-party connection 83 in FIG. 24, and then redirect the callhandles created for ports 81 and 83 to callhandles created for bridge ports 136-1 and 136-2, respectively.

As shown in FIG. 27, this results in producing a connection 86 between WS-1 and bridge port 136-1, and a connection 87 between WS-2 and bridge port 136-2, thereby creating a conference set-up between WS-1 and WS-2. Additional conference participants can then be added as described above for the situations described above in which the conference is initiated by the user of WS-1 either selecting multiple participants initially or merely selecting a "conference" and then adding subsequent participants.

Having described the preferred manner in which two-party calls and conference calls are set up in the preferred embodiment, the preferred manner in which data conferencing is provided between CMWs will next be described.

DATA CONFERENCING

Figure 20:
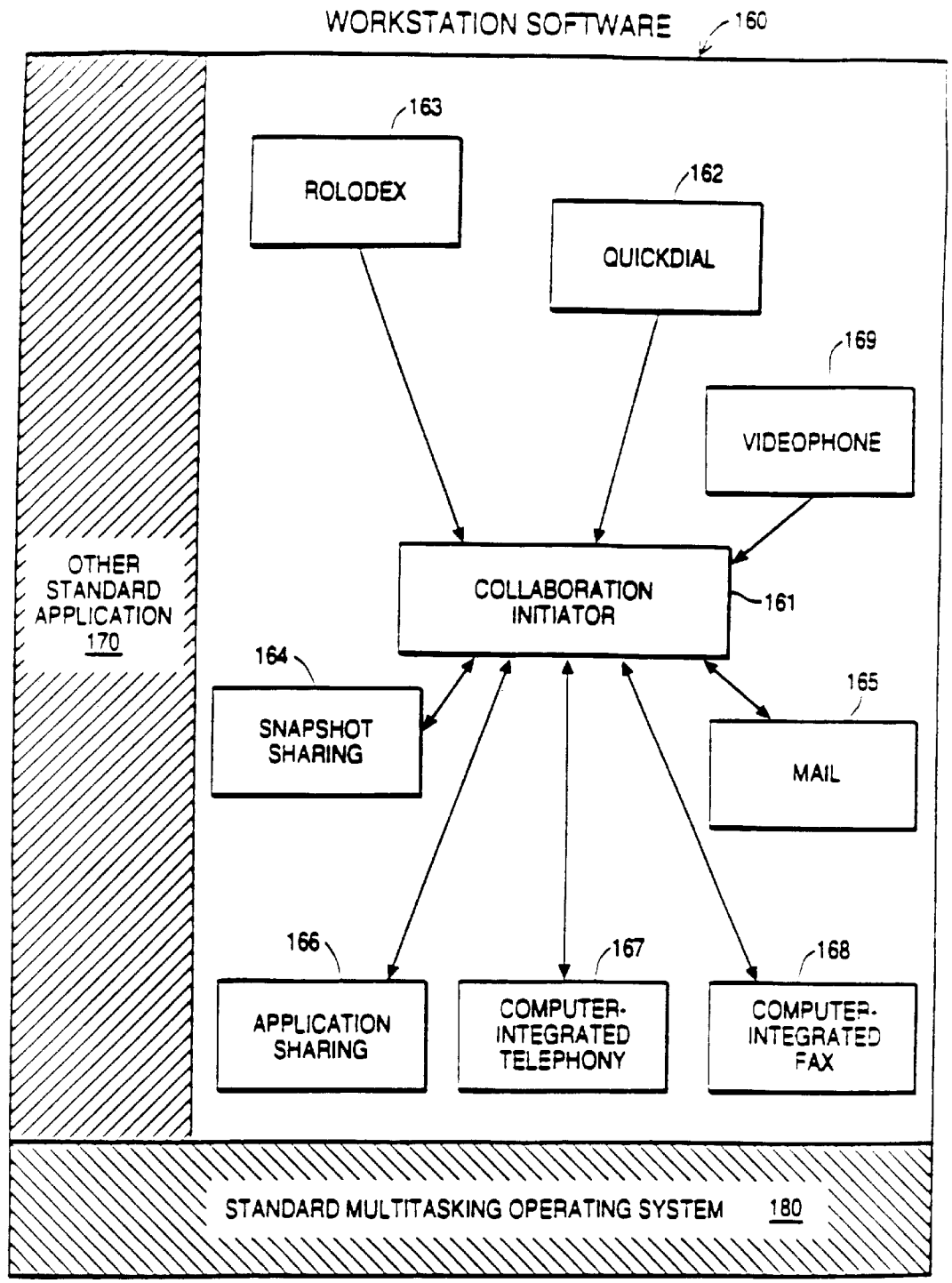
FIG. 20 illustrates CMW software in accordance with a preferred embodiment of the present invention, integrated with standard multitasking operating system and applications software.

Data conferencing is implemented in the preferred embodiment by certain Snapshot Sharing software provided at the CMW (see FIG. 20). This software permits a "snapshot" of a selected portion of a participant's CMW screen (such as a window) to be displayed on the CMW screens of other selected participants (whether or not those participants are also involved in a videoconference). Any number of snapshots may be shared simultaneously. Once displayed, any participant can then telepoint on or annotate the snapshot, which animated actions and results will appear (virtually simultaneously) on the screens of all other participants. The annotation capabilities provided include lines of several different widths and text of several different sizes. Also, to facilitate participant identification, these annotations may be provided in a different color for each participant Any annotation may also be erased by any participant. FIG. 2B (lower left window) illustrates a CMW screen having a shared graph on which participants have drawn and typed to call attention to or supplement specific portions of the shared image.

A participant may initiate data conferencing with selected participants (selected and added as described above for videoconference calls) by clicking on a SHARE button on the screen (available in the Rolodex or Collaboration Initiator windows, shown in FIG. 2A, as are CALL and ADD buttons), followed by selection of the window to be shared. When a participant clicks on his SHARE button, his Collaboration Initiator module 161 (FIG. 20) queries the AVNM to locate the Collaboration Initiators of the selected participants, resulting in invocation of their respective Snapshot Sharing modules 164. The Snapshot Sharing software modules at the CMWs of each of the selected participants query their local operating system 180 to determine available graphic formats, and then send this information to the initiating Snapshot Sharing module, which determines the format that will produce the most advantageous display quality and performance for each selected participant.

After the snapshot to be shared is displayed on all CMWs, each participant may telepoint on or annotate the snapshot, which actions and results are displayed on the CMW screens of all participants. This is preferably accomplished by monitoring the actions made at the CMW (e.g., by tracking mouse movements) and sending these "operating system commands" to the CMWs of the other participants, rather than continuously exchanging bitmaps, as would be the case with traditional "remote control" products.

Figure 28:
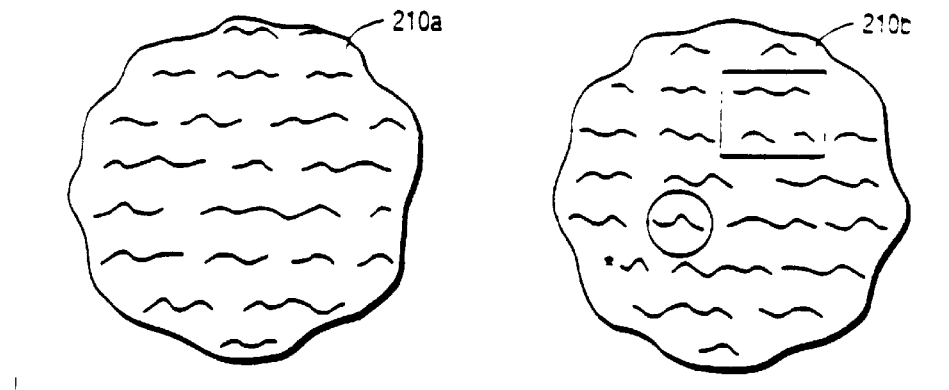
FIG. 28 diagrammatically illustrates how a snapshot with annotations may be stored in a plurality of bitmaps during data sharing.

As illustrated in FIG. 28, the original unchanged snapshot is stored in a first bitmap 210a. A second bitmap 210b stores the combination of the original snapshot and any annotations. Thus, when desired (e.g., by clicking on a CLEAR button located in each participant's Share window, as illustrated in FIG. 2B), the original unchanged snapshot can be restored (i.e., erasing all annotations) using bitmap 210a. Selective erasures can be accomplished by copying into (i.e., restoring) the desired erased area of bitmap 210b with the corresponding portion from bitmap 210a.

Rather than causing a new Share window to be created whenever a snapshot is shared, it is possible to replace the contents of an existing Share window with a new image. This can be achieved in either of two ways. First, the user can click on the GRAB button and then select a new window whose contents should replace the contents of the existing Share window. Second, the user can click on the REGRAB button to cause a (presumably modified) version of the original source window to replace the contents of the existing Share window. This is particularly useful when one participant desires to share a long document that cannot be displayed on the screen in its entirety. For example, the user might display the first page of a spreadsheet on his screen, use the SHARE button to share that page, discuss and perhaps annotate it, then return to the spreadsheet application to position to the next page, use the REGRAB button to share the new page, and so on. This mechanism represents a simple, effective step toward application sharing.

Further, instead of sharing a snapshot of data on his current screen, a user may instead choose to share a snapshot that had previously been saved as a file. This is achieved via the LOAD button, which causes a dialog box to appear, prompting the user to select a file. Conversely, via the SAVE button, any snapshot may be saved, with all current annotations.

The capabilities described above were carefully selected to be particularly effective in environments where the principal goal is to share existing information, rather than to create new information. In particular, user interfaces are designed to make snapshot capture, telepointing and annotation extremely easy to use. Nevertheless, it is also to be understood that, instead of sharing snapshots, a blank "whiteboard" can also be shared (via the WHITEBOARD button provided by the Rolodex, Collaboration Initiator, and active call windows), and that more complex paintbox capabilities could easily be added for application areas that require such capabilities.

Figure 29:
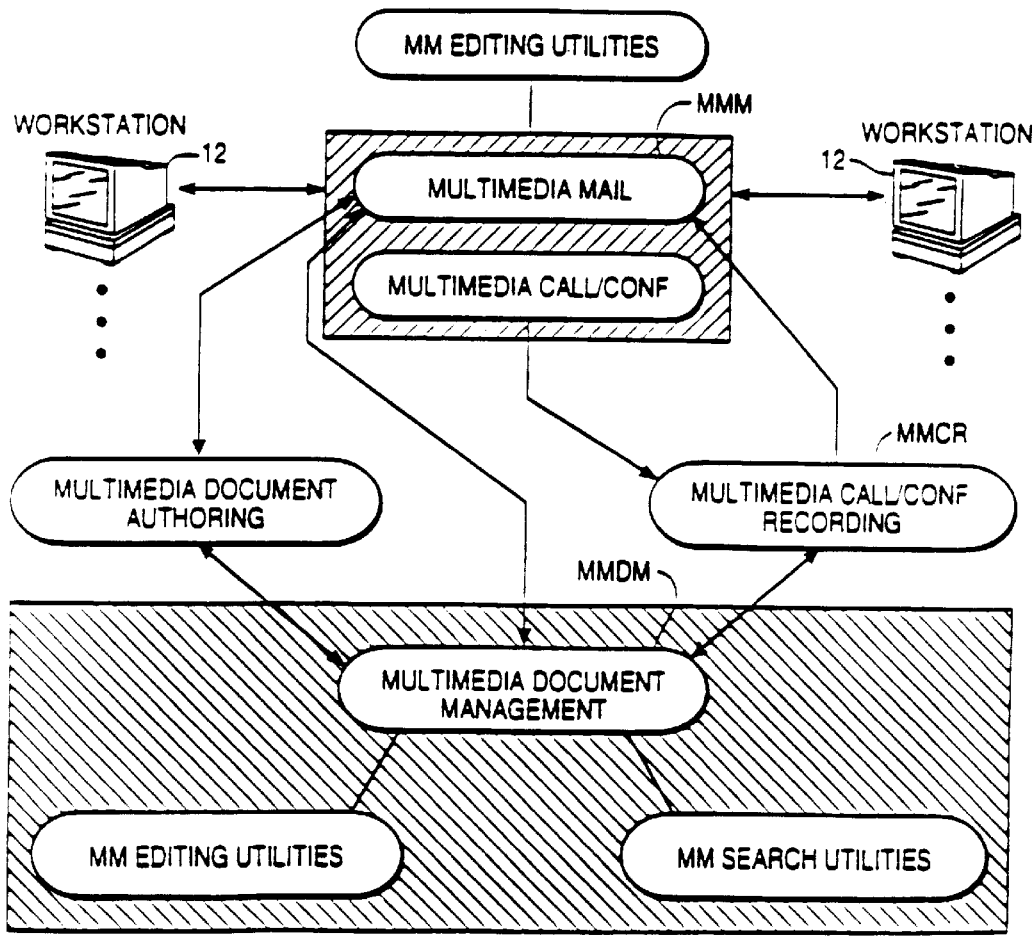
FIG. 29 is a schematic and diagrammatic illustration of the interaction among multimedia mail (MMM), multimedia call/conference recording (MMCR) and multimedia document management (MMDM) facilities.

As pointed out previously herein, important features of the present invention reside in the manner in which the capabilities and advantages of multimedia mail (MMM), multimedia conference recording (MMCR), and multimedia document management (MMDM) are tightly integrated with audio/video/data teleconferencing to provide a multimedia collaboration system that facilitates an unusually higher level of communication and collaboration between geographically dispersed users than has heretofore been achievable by known prior art systems. FIG. 29 is a schematic and diagrammatic view illustrating how multimedia calls/conferences, MMCR, MMM and MMDM work together to provide the above-described features. In the preferred embodiment, MM Editing Utilities shown supplementing MMM and MMDM may be identical.

Having already described various preferred embodiments and examples of audio/video/data teleconferencing, next to be considered are various preferred ways of integrating MMCR, MMM and MMDM with audio/video/data teleconferencing in accordance with the invention. For this purpose, basic preferred approaches and features of each will be considered along with preferred associated hardware and software.

MULTIMEDIA DOCUMENTS

Figure 30:
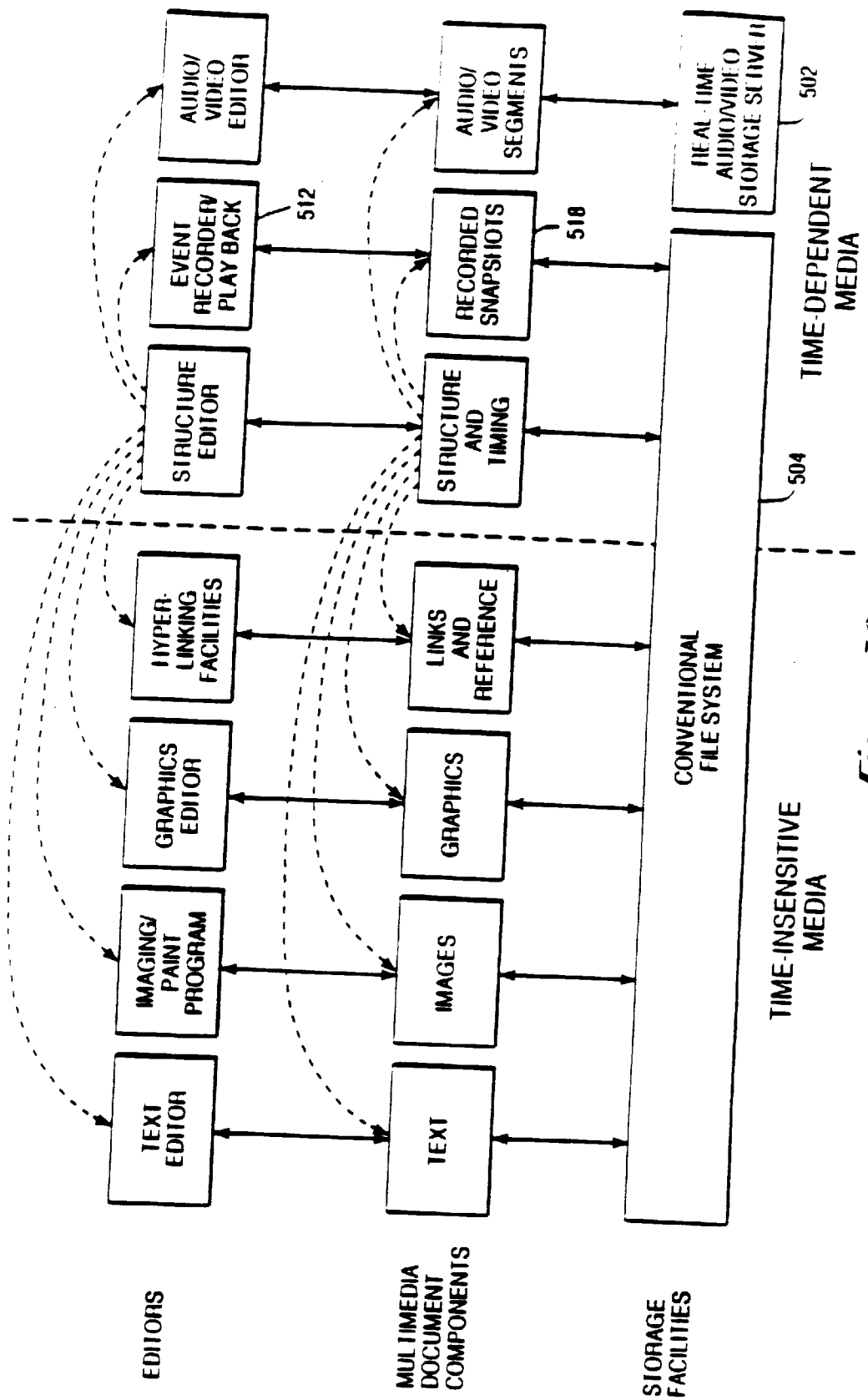
FIG. 30 is a schematic and diagrammatic illustration of the multimedia document architecture employed in a preferred embodiment of the invention.

In the preferred embodiment, the creation, storage, retrieval and editing of multimedia documents serve as the basic element common to MMCR, MMM and MMDM. Accordingly, the preferred embodiment advantageously provides a universal format for multimedia documents. This format defines multimedia documents as a collection of individual components in multiple media combined with an overall structure and timing component that captures the identities, detailed dependencies, references to, and relationships among the various other components. The information provided by this structuring component forms the basis for spatial layout, order of presentation, hyperlinks, temporal synchronization, etc., with respect to the composition of a multimedia document. FIG. 30 shows the structure of such documents as well as their relationship with editing and storage facilities.

Each of the components of a multimedia document uses its own editors for creating, editing, and viewing. In addition, each component may use dedicated storage facilities. In the preferred embodiment, multimedia documents are advantageously structured for authoring, storage, playback and editing by storing some data under conventional file systems and some data in special-purpose storage servers as will be discussed later. The Conventional File System 504 can be used to store all non-time-sensitive portions of a multimedia document. In particular, the following are examples of non-time-sensitive data that can be stored in a conventional type of computer file system:

1. structured and unstructured text
2. raster images
3. structured graphics and vector graphics (e.g., PostScript)
4. references to files in other file systems (video, hi-fidelity audio, etc.) via pointers
5. restricted forms of executables
6. structure and timing information for all of the above (spatial layout, order of presentation, hyperlinks, temporal synchronization, etc.)

Of particular importance in multimedia documents is support for time-sensitive media and media that have synchronization requirements with other media components. Some of these time-sensitive media can be stored on conventional file systems while others may require special-purpose storage facilities.

Examples of time-sensitive media that can be stored on conventional file systems are small audio files and short or low-quality video clips (e.g. as might be produced using QuickTime or Video for Windows). Other examples include window event lists as supported by the Window-Event Record and Play system 512 shown in FIG. 30. This component allows for storing and replaying a user's interactions with application programs by capturing the requests and events exchanged between the client program and the window system in a time-stamped sequence. After this "record" phase, the resulting information is stored in a conventional file that can later be retrieved and "played" back. During playback the same sequence of window system requests and events reoccurs with the same relative timing as when they were recorded. In prior-art systems, this capability has been used for creating automated demonstrations. In the present invention it can be used, for example, to reproduce annotated snapshots as they occurred at recording.

As described above in connection with collaborative workstation software, Snapshot Share 514 shown in FIG. 30 is a utility used in multimedia calls and conferencing for capturing window or screen snapshots, sharing with one or more call or conference participants, and permitting group annotation, telepointing, and re-grabs. Here, this utility is adapted so that its captured images and window events can be recorded by the Window-Event Record and Play system 512 while being used by only one person. By synchronizing events associated with a video or audio stream to specific frame numbers or time codes, a multimedia call or conference can be recorded and reproduced in its entirety. Similarly, the same functionality is preferably used to create multimedia mail whose authoring steps are virtually identical to participating in a multimedia call or conference (though other forms of MMM are not precluded).

Some time-sensitive media require dedicated storage servers in order to satisfy real-time requirements. High-quality audio/video segments, for example, require dedicated real-time audio/video storage servers. A preferred embodiment of such a server will be described later. Next to be considered is how the current invention guarantees synchronization between different media components.

MEDIA SYNCHRONIZATION

A preferred manner for providing multimedia synchronization in the preferred embodiment will next be considered. Only multimedia documents with real-time material need include synchronization functions and information. Synchronization for such situations may be provided as described below.

Audio or video segments can exist without being accompanied by the other. If audio and video are recorded simultaneously ("co-recorded"), the preferred embodiment allows the case where their streams are recorded and played back with automatic synchronization—as would result from conventional VCRs, laserdisks, or time-division multiplexed ("interleaved") audio/video streams. This excludes the need to tightly synchronize (i.e., "lip-sync") separate audio and video sequences. Rather, reliance is on the co-recording capability of the Real-Time Audio/Video Storage Server 502 to deliver all closely synchronized audio and video directly at its signal outputs.

Each recorded video sequence is tagged with time codes (e.g. SMPTE at 1/30 second intervals) or video frame numbers. Each recorded audio sequence is tagged with time codes (e.g., SMPTE or MIDI) or, if co-recorded with video, video frame numbers.

The preferred embodiment also provides synchronization between window events and audio and/or video streams. The following functions are supported:
1. Media-time-driven Synchronization
   synchronization of window events to an audio, video, or audio/video stream, using the real-time media as the timing source.
2. Machine-time-driven-Synchronization
   a. synchronization of window events to the system clock
   b. synchronization of the start of an audio, video, or audio/video segment to the system clock If no audio or video is involved, machine-time-driven synchronization is used throughout the document. Whenever audio and/or video is playing, media-time-synchronization is used. The system supports transition between machine-time and media-time synchronization whenever an audio/video segment is started or stopped.

As an example, viewing a multimedia document might proceed as follows:
  Document starts with an annotated share (machine-time-driven synchronization).
  Next, start audio only (a "voice annotation") as text and graphical annotations on the share continue (audio is timing source for window events).
  Audio ends, but annotations continue (machine-time-driven synchronization).
  Next, start co-recorded audio/video continuing with further annotations on same share (audio is timing source for window events).
  Next, start a new share during the continuing audio/video recording; annotations happen on both shares (audio is timing source for window events).
  Audio/video stops, annotations on both shares continue (machine-time-driven synchronization).
  Document ends.

AUDIO/VIDEO STORAGE

As described above, the present invention can include many special-purpose servers that provide storage of time-sensitive media (e.g. audio/video streams) and support coordination with other media. This section describes the preferred embodiment for audio/video storage and recording services.

Although storage and recording services could be provided at each CMW, it is preferable to employ a centralized server 502 coupled to MLAN 10, as illustrated in FIG. 31. A centralized server 502, as shown in FIG. 31, provides the following advantages:

1. The total amount of storage hardware required can be far less (due to better utilization resulting from statistical averaging).
2. Bulky and expensive compression/decompression hardware can be pooled on the storage servers and shared by multiple clients. As a result, fewer compression/decompression engines of higher performance are required than if each workstation were equipped with its own compression/decompression hardware.
3. Also, more costly centralized codecs can be used to transfer mail wide area among campuses at far lower costs that attempting to use data WAN technologies.
4. File system administration (e.g. backups and file system replication, etc.) are far less costly and higher performance.

Figure 31A:
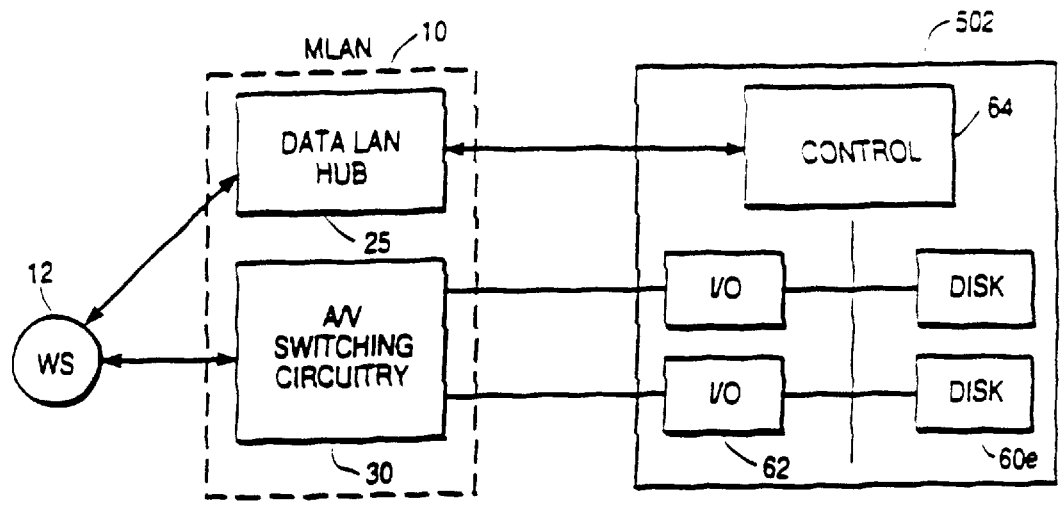
FIG. 31A illustrates a centralized Audio/Video Storage Server.

The Real-Time Audio/Video Storage Server 502 shown in FIG. 31A structures and manages the audio/video files recorded and stored on its storage devices. Storage devices may typically include computer-controlled VCRs, as well as rewritable magnetic or optical disks. For example, server 502 in FIG. 31A includes disks 60e for recording and playback. Analog information is transferred between disks 60e and the A/V Switching Circuitry 30 via analog I/O 62. Control is provided by control 64 coupled to Data LAN hub 25.

At a high level, the centralized audio/video storage and playback server 502 in FIG. 31A performs the following functions:

File Management

It provides mechanisms for creating, naming, time-stamping, storing, retrieving, copying, deleting, and playing back some or all portions of an audio/video file.

File Transfer and Replication

The audio/video file server supports replication of files on different disks managed by the same file server to facilitate simultaneous access to the same files. Moreover, file transfer facilities are provided to support transmission of audio/video files between itself and other audio/video storage and playback engines. File transfer can also be achieved by using the underlying audio/video network facilities: servers establish a real-time audio/video network connection between themselves so one server can "play back" a file while the second server simultaneously records it.

Disk Management

The storage facilities support specific disk allocation, garbage collection and defragmentation facilities. They also support mapping disks with other disks (for replication and staging modes, as appropriate) and mapping disks, via I/O equipment, with the appropriate Video/Audio network port.

Synchronization support

Synchronization between audio and video is ensured by the multiplexing scheme used by the storage media, typically by interleaving the audio and video streams in a time-division-multiplexed fashion. Further, if synchronization is required with other stored media (such as window system graphics), then frame numbers, time codes, or other timing events are generated by the storage server. An advantageous way of providing this synchronization in the preferred embodiment is to synchronize record and playback to received frame number or time code events.

Searching

To support intra-file searching, at least start, stop, pause, fast forward, reverse, and fast reverse operations are provided. To support inter-file searching, audio/video tagging, or more generalized "go-to" operations and mechanisms, such as frame numbers or time code, are supported at a search-function level.

Connection Management

The server handles requests for audio/video network connections from client programs (such as video viewers and editors running on client workstations) for real-time recording and real-time playback of audio/video files.

Next to be considered is how centralized audio/video storage servers provide for real-time recording and playback of video streams.

REAL-TIME DISK DELIVERY

To support real-time audio/video recording and playback, the storage server needs to provide a real-time transmission path between the storage medium and the appropriate audio/video network port for each simultaneous client accessing the server. For example, if one user is viewing a video file at the same time several other people are creating and storing new video files on the same disk, multiple simultaneous paths to the storage media are required. Similarly, video mail sent to large distribution groups, video databases, and similar functions may also require simultaneous access to the same video files, again imposing multiple access requirements on the video storage capabilities.

For storage servers that are based on computer-controlled VCRs or rewritable laserdisks, a real-time transmission path is readily available through the direct analog connection between the disk or tape and the network port. However, because of this single direct connection, each VCR or laserdisk can only be accessed by one client program at the same time (multi-head laserdisks are an exception). Therefore, storage servers based on VCRs and laserdisks are difficult to scale for multiple access usage. In the preferred embodiment, multiple access to the same material is provided by file replication and staging, which greatly increases storage requirements and the need for moving information quickly among storage media units serving different users.

Figure 32:
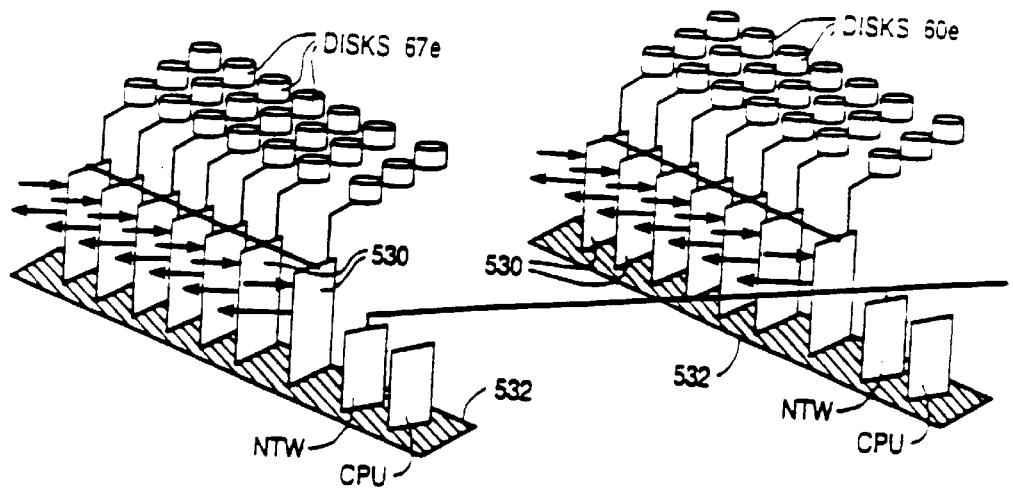
FIG. 32 illustrates a generalized hardware implementation of a scalable Audio/Video Storage Server.

Video systems based on magnetic disks are more readily scalable for simultaneous use by multiple people. A generalized hardware implementation of such a scalable storage and playback system 502 is illustrated in FIG. 32. Individual I/O cards 530 supporting digital and analog I/O are linked by intra-chassis digital networking (e.g. buses) for file transfer within chassis 532 holding some number of these cards. Multiple chassis 532 are linked by inter-chassis networking. The Digital Video Storage System available from Parallax Graphics is an example of such a system implementation.

The bandwidth available for the transfer of files among disks is ultimately limited by the bandwidth of these intra-chassis and inter-chassis networking. For systems that use sufficiently powerful video compression schemes, real-time delivery requirements for a small number of users can be met by existing file system software (such as the Unix file system), provided that the block-size of the storage system is optimized for video storage and that sufficient buffering is provided by the operating system software to guarantee continuous flow of the audio/video data.

Figure 33:
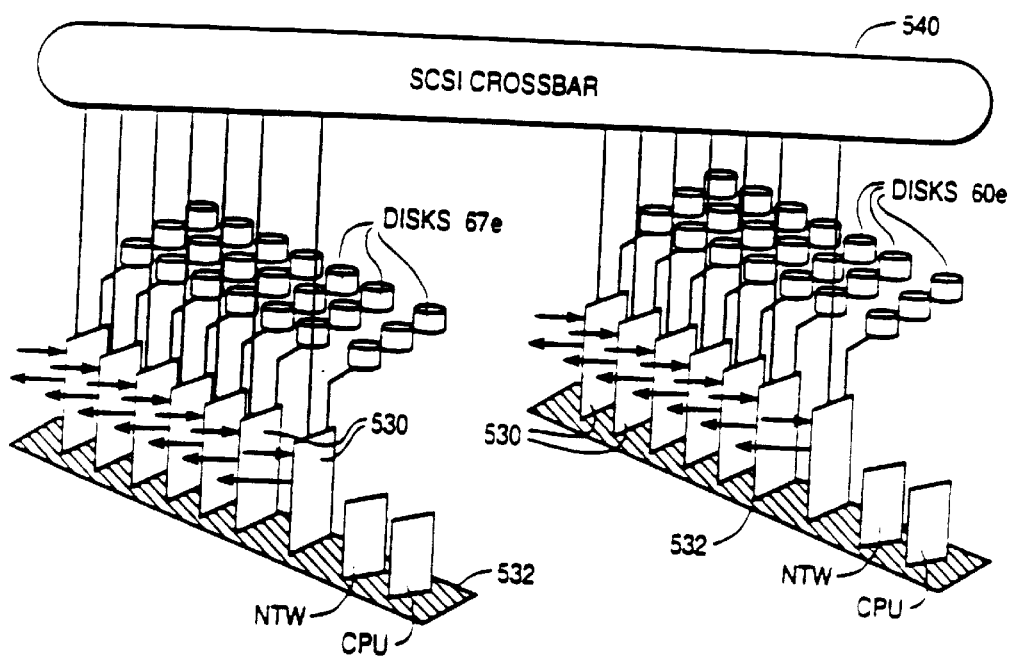
FIG. 33 illustrates a higher throughput version of the server illustrated in FIG. 32, using SCSI-based crosspoint switching to increase the number of possible simultaneous file transfers.

Special-purpose software/hardware solutions can be provided to guarantee higher performance under heavier usage or higher bandwidth conditions. For example, a higher throughput version of FIG. 32 is illustrated in FIG. 33, which uses crosspoint switching, such as provided by SCSI Crossbar 540, which increases the total bandwidth of the inter-chassis and intra-chassis network, thereby increasing the number of possible simultaneous file transfers.

REAL-TIME NETWORK DELIVERY

By using the same audio/video format as used for audio/video teleconferencing, the audio/video storage system can leverage the previously described network facilities: the MLANs 10 can be used to establish a multimedia network connection between client workstations and the audio/video storage servers. Audio/Video editors and viewers running on the client workstation use the same software interfaces as the multimedia teleconferencing system to establish these network connections.

Figure 31B:
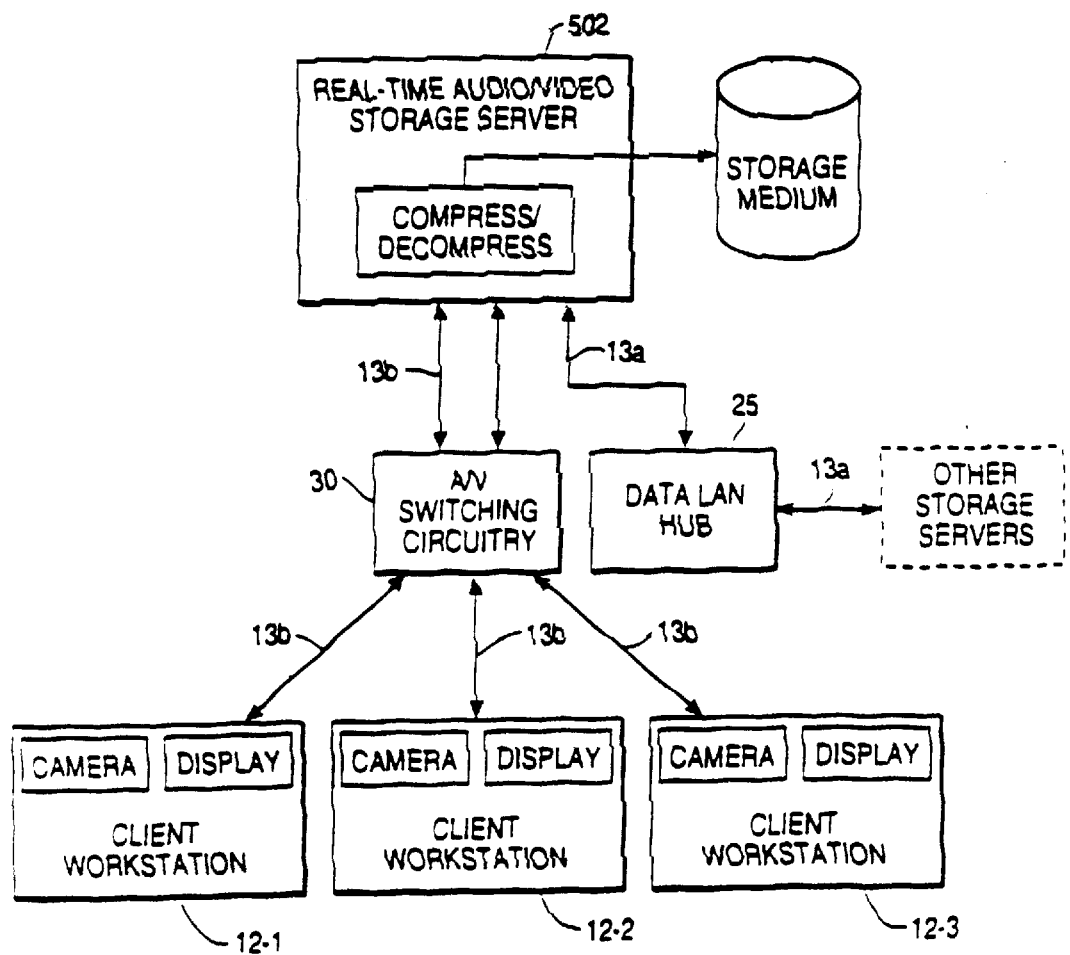
FIG. 31B is a schematic and diagrammatic illustration of the interactions between the Audio/Video Storage Server and the remainder of the CMW System.
Figure 31C:
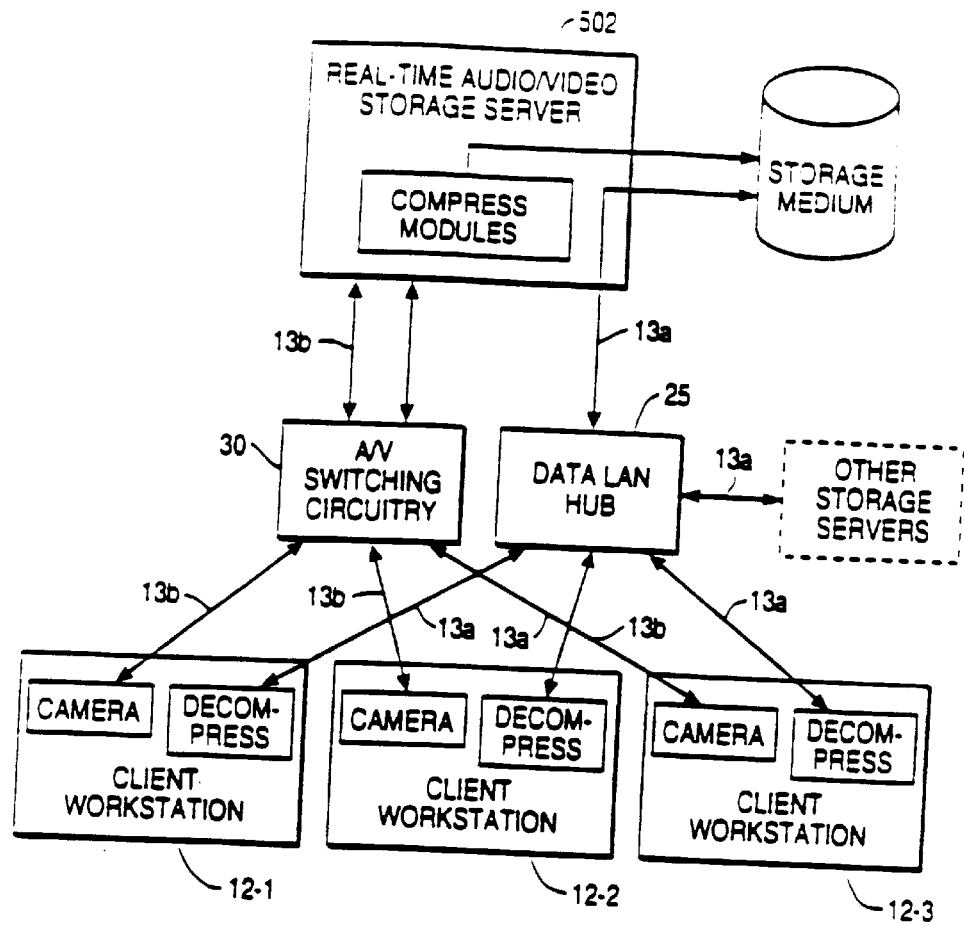
FIG. 31C illustrates an alternative embodiment of the interactions illustrated in FIG. 31B.

The resulting architecture is shown in FIG. 31B. Client workstations use the existing audio/video network to connect to the storage server's network ports. These network ports are connected to compression/decompression engines that plug into the server bus. These engines compress the audio/video streams that come in over the network and store them on the local disk. Similarly, for playback, the server reads stored video segments from its local disk and routes them through the decompression engines back to client workstations for local display.

The present invention allows for alternative delivery strategies. For example, some compression algorithms are asymmetric, meaning that decompression requires much less compute power than compression. In some cases, real-time decompression can even be done in software, without requiring any special-purpose decompression hardware. As a result, there is no need to decompress stored audio and video on the storage server and play it back in realtime over the network. Instead, it can be more efficient to transfer an entire audio/video file from the storage server to the client workstation, cache it on the workstation's disk, and play it back locally. These observations lead to a modified architecture as presented in FIG. 31C. In this architecture, clients interact with the storage server as follows:

- To record video, clients set up real-time audio/video network connections to the storage server as before (this connection could make use of an analog line).
- In response to a connection request, the storage server allocates a compression module to the new client.
- As soon as the client starts recording, the storage server routes the output from the compression hardware to an audio/video file allocated on its local storage devices.
- For playback, this audio/video file gets transferred over the data network to the client workstation and pre-staged on the workstation's local disk.
- The client uses local decompression software and/or hardware to play back the audio/video on its local audio and video hardware.

This approach frees up audio/video network ports and compression/decompression engines on the server. As a result, the server is scaled to support a higher number of simultaneous recording sessions, thereby further reducing the cost of the system. Note that such an architecture can be part of a preferred embodiment for reasons other than compression/decompression asymmetry (such as the economics of the technology of the day, existing embedded base in the enterprise, etc.).

MULTIMEDIA CONFERENCE RECORDING

Multimedia conference recording (MMCR) will next be considered. For full-feature multimedia desktop calls and conferencing (e.g. audio/video calls or conferences with snapshot share), recording (storage) capabilities are preferably provided for audio and video of all parties, and also for all shared windows, including any telepointing and annotations provided during the teleconference. Using the multimedia synchronization facilities described above, these capabilities are provided in a way such that they can be replayed with accurate correspondence in time to the recorded audio and video, such as by synchronizing to frame numbers or time code events.

A preferred way of capturing audio and video from calls would be to record all calls and conferences as if they were multi-party conferences (even for two-party calls), using video mosaicing, audio mixing and cut-and-pasting, as previously described in connection with FIGS. 7–11. It will be appreciated that MMCR as described will advantageously permit users at their desktop to review real-time collaboration as it previously occurred, including during a later teleconference. The output of a MMCR session is a multimedia document that can be stored, viewed, and edited using the multimedia document facilities described earlier.

Figure 31D:
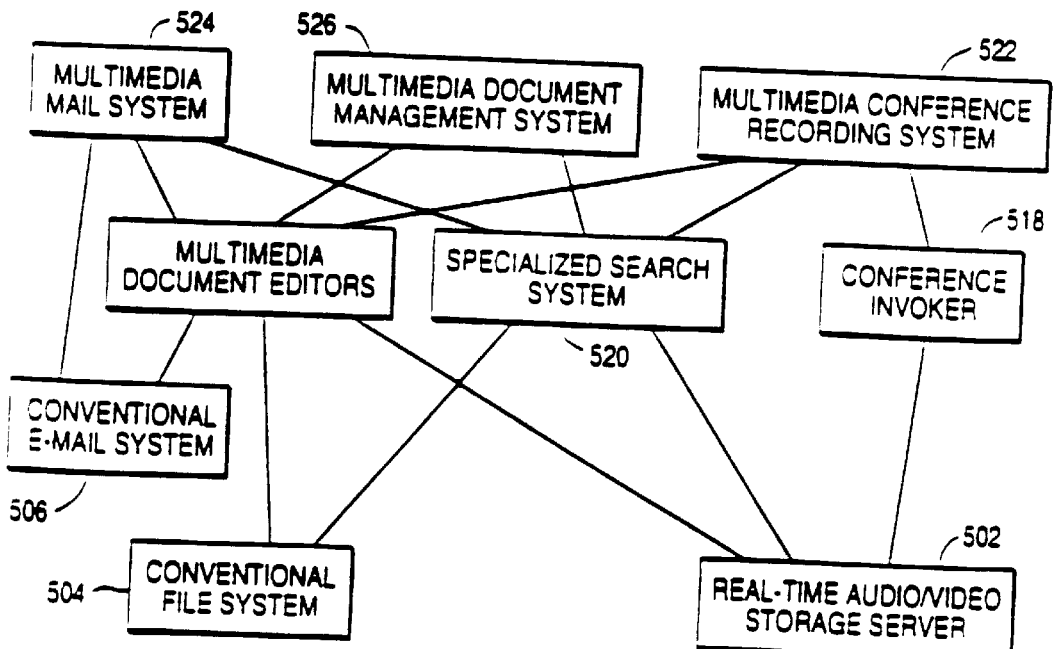
FIG. 31D is a schematic and diagrammatic illustration of the integration of MMM, MMCR and MMDM facilities in a preferred embodiment of the invention.

FIG. 31D shows how conference recording relates to the various system components described earlier. The Multimedia Conference Record/Play system 522 provides the user with the additional GUIs (graphical user interfaces) and other functions required to provide the previously described MMCR functionality.

The Conference Invoker 518 shown in FIG. 31D is a utility that coordinates the audio/video calls that must be made to connect the audio/video storage server 502 with special recording outputs on conference bridge hardware (35 in FIG. 3). The resulting recording is linked to information identifying the conference, a function also performed by this utility.

MULTIMEDIA MAIL

Now considering multimedia mail (MMM), it will be understood that MMM adds to the above-described MMCR the capability of delivering delayed collaboration, as well as the additional ability to review the information multiple times and, as described hereinafter, to edit, re-send, and archive it. The captured information is preferably a superset of that captured during MMCR, except that no other user is involved and the user is given a chance to review and edit before sending the message.

The Multimedia Mail system 524 in FIG. 31D provides the user with the additional GUIs and other functions required to provide the previously described MMM functionality. Multimedia Mail relies on a conventional Email system 506 shown in FIG. 31D for creating, transporting, and browsing messages. However, multimedia document editors and viewers are used for creating and viewing message bodies. Multimedia documents (as described above) consist of time-insensitive components and time-sensitive components. The Conventional Email system 506 relies on the Conventional File system 504 and Real-Time Audio/Video Storage Server 502 for storage support. The time-insensitive components are transported within the Conventional Email system 506, while the real-time components may be separately transported through the audio/video network using file transfer utilities associated with the Real-Time Audio/Video Storage Server 502.

MULTIMEDIA DOCUMENT MANAGEMENT

Multimedia document management (MMDM) provides long-term, high-volume storage for MMCR and MMM. The MMDM system assists in providing the following capabilities to a CMW user:

1. Multimedia documents can be authored as mail in the MMM system or as call/conference recordings in the MMCR system and then passed on to the MMDM system.
2. To the degree supported by external compatible multimedia editing and authoring systems, multimedia documents can also be authored by means other than MMM and MMCR.
3. Multimedia documents stored within the MMDM system can be reviewed and searched.
4. Multimedia documents stored within the MMDM system can be used as material in the creation of subsequent MMM.
5. Multimedia documents stored within the MMDM system can be edited to create other multimedia documents.

The Multimedia Document Management system 526 in FIG. 31D provides the user with the additional GUIs and other functions required to provide the previously described MMDM functionality. The MMDM includes sophisticated searching and editing capabilities in connection with the MMDM multimedia document such that a user can rapidly access desired selected portions of a stored multimedia document. The Specialized Search system 520 in FIG. 30 comprises utilities that allow users to do more sophisticated searches across and within multimedia documents. This includes context-based and content-based searches (employing operations such as speech and image recognition, information filters, etc.), time-based searches, and event-based searches (window events, call management events, speech/audio events, etc.).

CLASSES OF COLLABORATION

Figure 34:
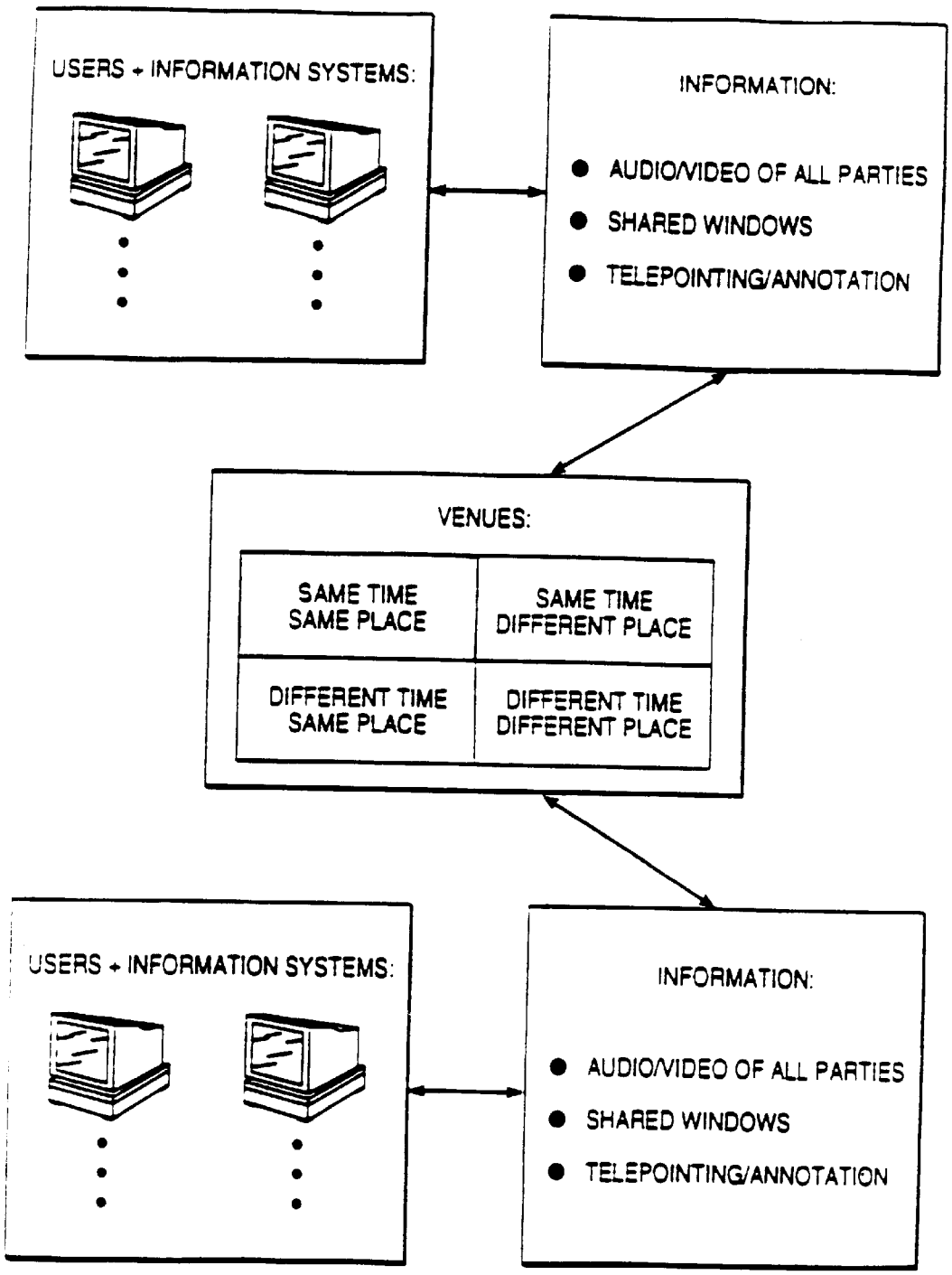
FIG. 34 illustrates the resulting multimedia collaboration environment achieved by the integration of audio/video/data teleconferencing and MMCR, MMM and MMDM.

The resulting multimedia collaboration environment achieved by the above-described integration of audio/video/data teleconferencing, MMCR, MMM and MMDM is illustrated in FIG. 34. It will be evident that each user can collaborate with other users in real-time despite separations in space and time. In addition, collaborating users can access information already available within their computing and information systems, including information captured from previous collaborations. Note in FIG. 34 that space and time separations are supported in the following ways:

1. Same time, different place Multimedia calls and conferences
2. Different time, same place MMDM access to stored MMCR and MMM information, or use of MMM directly (i.e., copying mail to oneself)
3. Different time, different place MMM
4. Same time, same place Collaborative, face-to-face, multimedia document creation By use of the same user interfaces a network functions, the present invention smoothly spans these three venus.

REMOTE ACCESS TO EXPERTISE

In order to illustrate how the present invention may be implemented and operated, an exemplary preferred embodiment will be described having features applicable to the aforementioned scenario involving remote access to expertise. It is to be understood that this exemplary embodiment is merely illustrative, and is not to be considered as limiting the scope of the invention, since the invention may be adapted for other applications (such as in engineering and manufacturing) or uses having more or less hardware, software and operating features and combined in various ways.

Consider the following scenario involving access from remote sites to an in-house corporate "expert" in the trading of financial instruments such as in the securities market:

The focus of the scenario revolves around the activities of a trader who is a specialist in securities. The setting is the start of his day at his desk in a major financial center (NYC) at a major U.S. investment bank.

The Expert has been actively watching a particular security over the past week and upon his arrival into the office, he notices it is on the rise. Before going home last night, he previously set up his system to filter overnight news on a particular family of securities and a security within that family. He scans the filtered news and sees a story that may have a long-term impact on this security in question. He believes he needs to act now in order to get a good price on the security. Also, through filtered mail, he sees that his counterpart in London, who has also been watching this security, is interested in getting our Expert's opinion once he arrives at work.

The Expert issues a multimedia mail message on the security to the head of sales worldwide for use in working with their client base. Also among the recipients is an analyst in the research department and his counterpart in London. The Expert, in preparation for his previously established "on-call" office hours, consults with others within the corporation (using the videoconferencing and other collaborative techniques described above), accesses company records from his CMW, and analyzes such information, employing software-assisted analytic techniques. His office hours are now at hand, so he enters "intercom" mode, which enables incoming calls to appear automatically (without requiring the Expert to "answer his phone" and elect to accept or reject the call).

Figure 35:
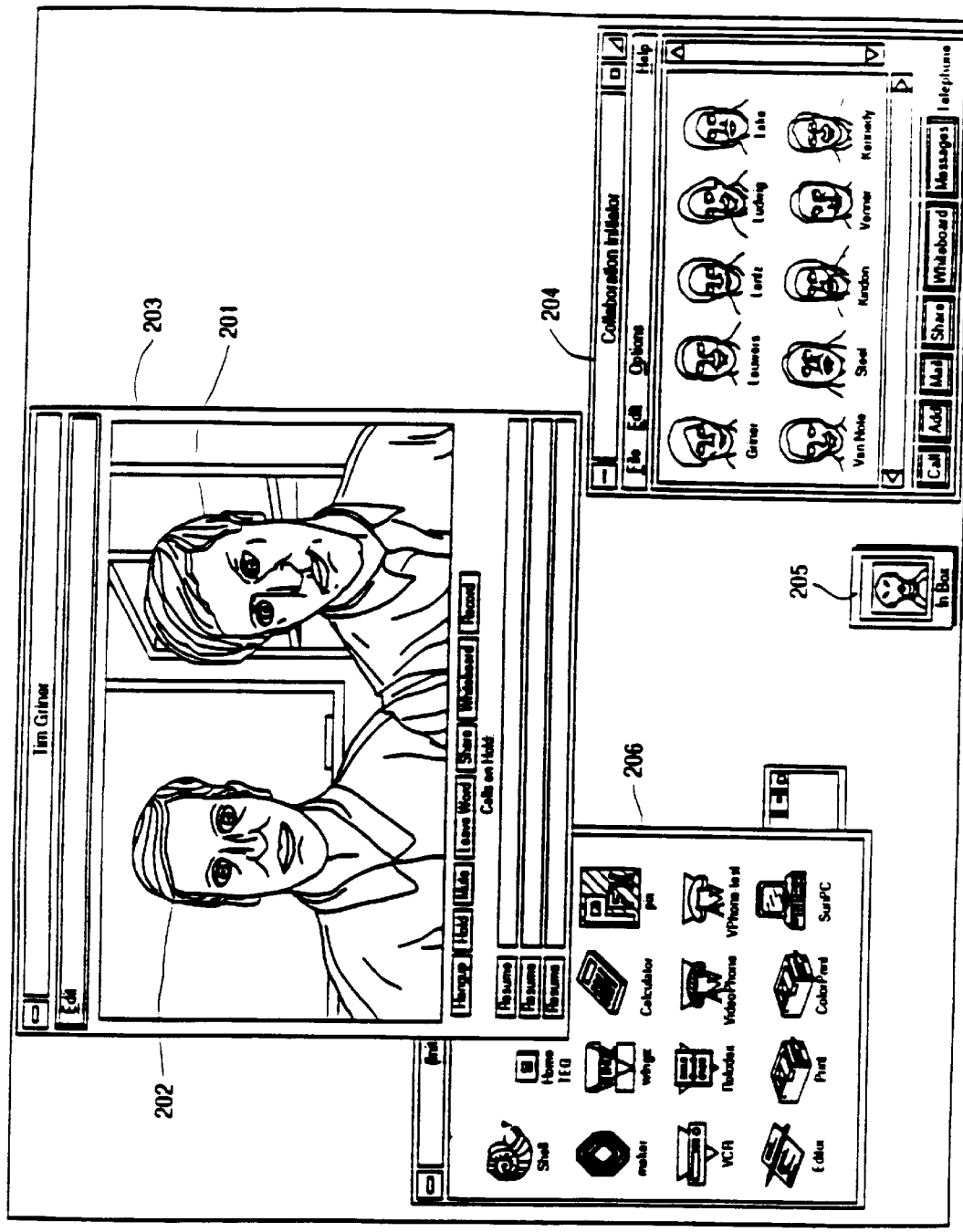
FIGS. 35–42 illustrate a series of CMW screens which may be generated during operation of a preferred embodiment of the present invention for a typical scenario involving a remote expert who takes advantage of many of the features provided by the present invention.

The Expert's computer beeps, indicating an incoming call, and the image of a field representative 201 and his client 202 who are located at a bank branch somewhere in the U.S. appears in video window 203 of the Expert's screen (shown in FIG. 35). Note that, unless the call is converted to a "conference" call (whether explicitly via a menu selection or implicitly by calling two or more other participants or adding a third participant to a call), the callers will see only each other in the video window and will not see themselves as part of a video mosaic.

Also illustrated on the Expert's screen in FIG. 35 is the Collaboration Initiator window 204 from which the Expert can (utilizing Collaboration Initiator software module 161 shown in FIG. 20) initiate and control various collaborative sessions. For example, the user can initiate with a selected participant a video call (CALL button) or the addition of that selected participant to an existing video call (ADD button), as well as a share session (SHARE button) using a selected window or region on the screen (or a blank region via the WHITEBOARD button for subsequent annotation). The user can also invoke his MAIL software (MAIL button) and prepare outgoing or check incoming Email messages (the presence of which is indicated by a picture of an envelope in the dog's mouth in In Box icon 205), as well as check for "I called" messages from other callers (MESSAGES button) left via the LEAVE WORD button in video window 203. Video window 203 also contains buttons from which many of these and certain additional features can be invoked, such as hanging up a video call (HANGUP button), putting a call on hold (HOLD button), resuming a call previously put on hold (RESUME button) or muting the audio portion of a call (MUTE button). In addition, the user can invoke the recording of a conference by the conference RECORD button. Also present on the Expert's screen is a standard desktop window 206 containing icons from which other programs (whether or not part of this invention) can be launched.

Figure 36:
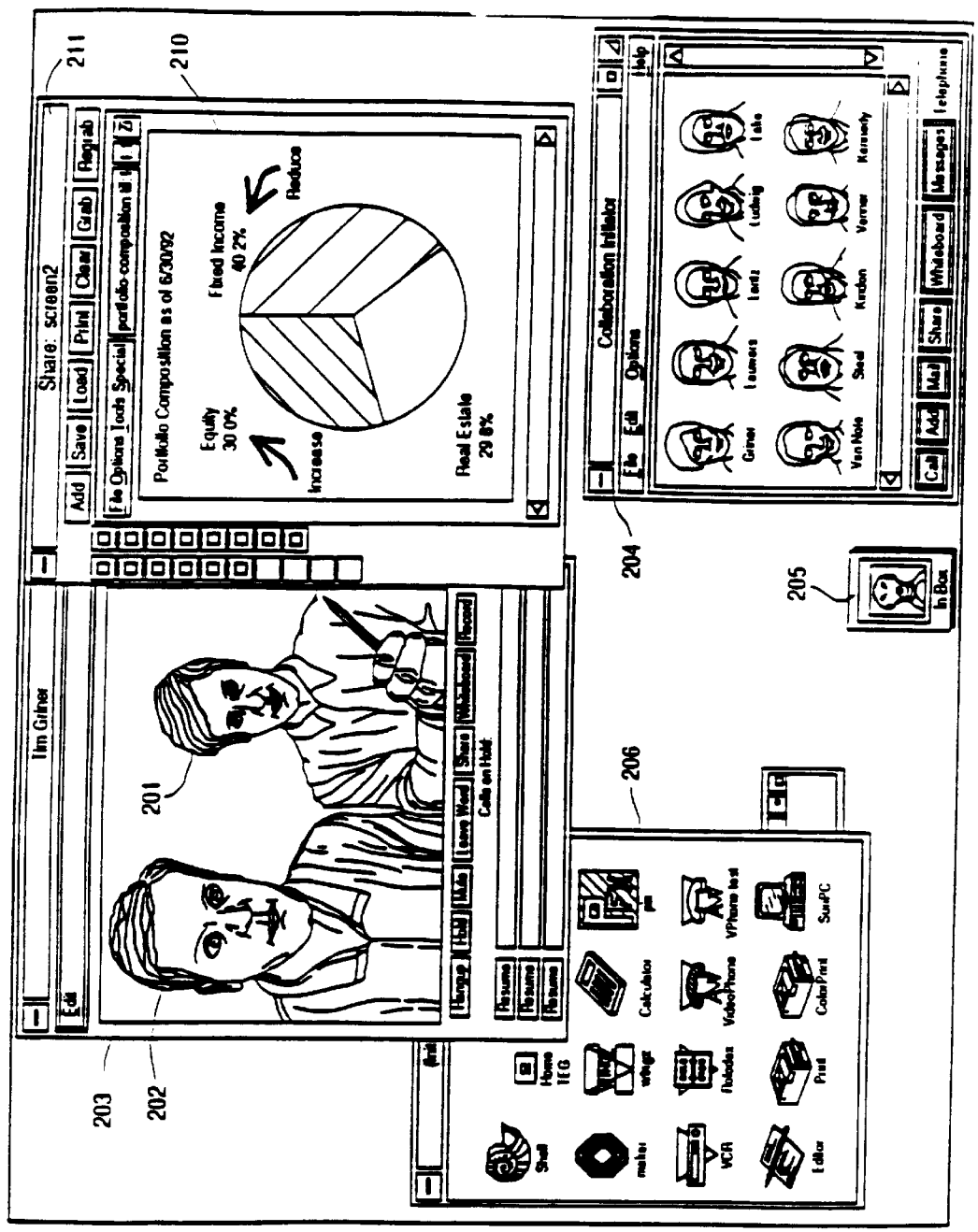
Figure 37:
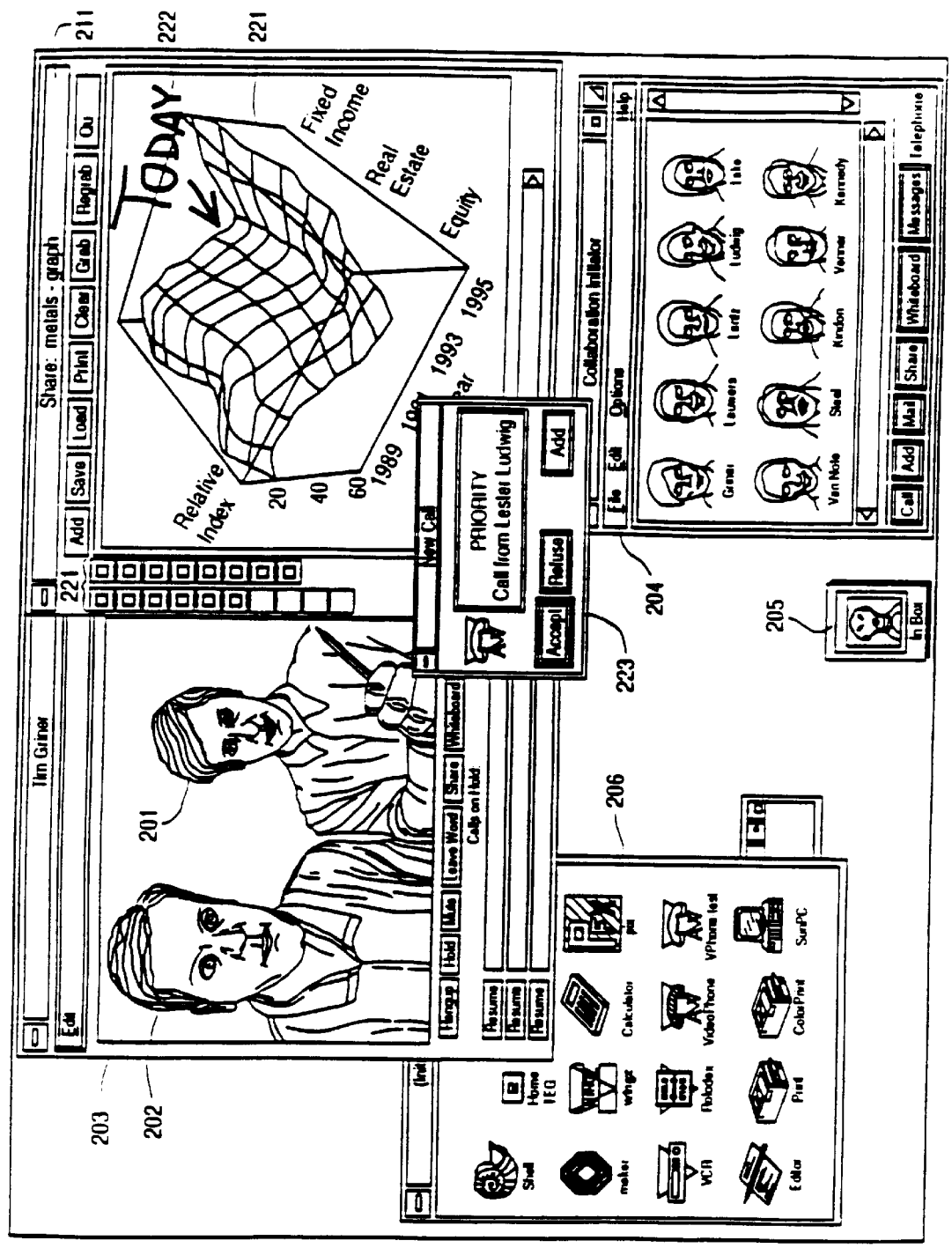

Returning to the example, the Expert is now engaged in a videoconference with field representative 201 and his client 202. In the course of this videoconference, as illustrated in FIG. 36, the field representative shares with the Expert a graphical image 210 (pie chart of client portfolio holdings) of his client's portfolio holdings (by clicking on his SHARE button, corresponding to the SHARE button in video window 203 of the Expert's screen, and selecting that image from his screen, resulting in the shared image appearing in the Share window 211 of the screen of all participants to the share) and begins to discuss the client's investment dilemma. The field representative also invokes a command to secretly bring up the client profile on the Expert's screen.

After considering this information, reviewing the shared portfolio and asking clarifying questions, the Expert illustrates his advice by creating (using his own modeling software) and sharing a new graphical image 220 (FIG. 37) with the field representative and his client. Either party to the share can annotate that image using the drawing tools 221 (and the TEXT button, which permits typed characters to be displayed) provided within Share window 211, or "regrab" a modified version of the original image (by using the REGRAB button), or remove all such annotations (by using the CLEAR button of Share window 211), or "grab" a new image to share (by clicking on the GRAB button of Share window 211 and selecting that new image from the screen).

In addition, any participant to a shared session can add a new participant by selecting that participant from the rolodex or quick-dial list (as described above for video calls and for data conferencing) and clicking the ADD button of Share window 211. One can also save the shared image (SAVE button), load a previously saved image to be shared (LOAD button), or print an image (PRINT button).

While discussing the Expert's advice, field representative 201 makes annotations 222 to image 220 in order to illustrate his concerns. While responding to the concerns of field representative 201, the Expert hears a beep and receives a visual notice (New Call window 223) on his screen (not visible to the field representative and his client), indicating the existence of a new incoming call and identifying the caller. At this point, the Expert can accept the new call (ACCEPT button), refuse the new call (REFUSE button, which will result in a message being displayed on the caller's screen indicating that the Expert is unavailable) or add the new caller to the Expert's existing call (ADD button). In this case, the Expert elects yet another option (not shown)—to defer the call and leave the caller a standard message that the Expert will call back in X minutes (in this case, 1 minute). The Expert then elects also to defer his existing call, telling the field representative and his client that he will call them back in 5 minutes, and then elects to return the initial deferred call.

It should be noted that the Expert's act of deferring a call results not only in a message being sent to the caller, but also in the caller's name (and perhaps other information associated with the call, such as the time the call was deferred or is to be resumed) being displayed in a list 230 (see FIG. 38) on the Expert's screen from which the call can be reinitiated. Moreover, the "state" of the call (e.g., the information being shared) is retained so that it can be recreated when the call is reinitiated. Unlike a "hold" (described above), deferring a call actually breaks the logical and physical connections, requiring that the entire call be reinitiated by the Collaboration Initiator and the AVNM as described above.

Figure 38:
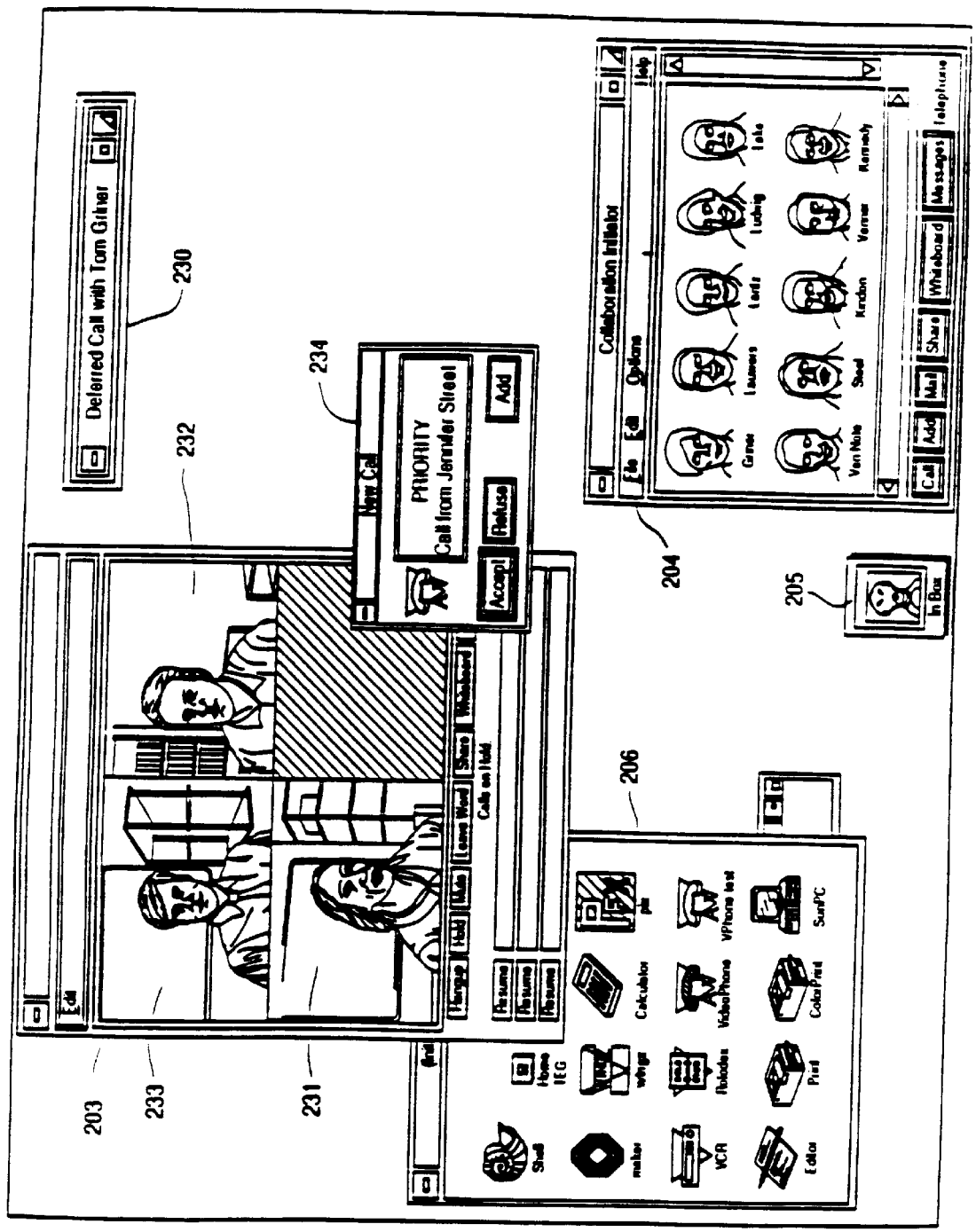

Upon returning to the initial deferred call, the Expert engages in a videoconference with caller 231, a research analyst who is located 10 floors up from the Expert with a complex question regarding a particular security. Caller 231 decides to add London expert 232 to the videoconference (via the ADD button in Collaboration Initiator window 204) to provide additional information regarding the factual history of the security. Upon selecting the ADD button, video window 203 now displays, as illustrated in FIG. 38, a video mosaic consisting of three smaller images (instead of a single large image displaying only caller 231) of the Expert 233, caller 231 and London expert 232.

During this videoconference, an urgent PRIORITY request (New Call window 234) is received from the Expert's boss (who is engaged in a three-party videoconference call with two members of the bank's operations department and is attempting to add the Expert to that call to answer a quick question). The Expert puts his three-party videoconference on hold (merely by clicking the HOLD button in video window 203) and accepts (via the ACCEPT button of New Call window 234) the urgent call from his boss, which results in the Expert being added to the boss' three-party videoconference call.

Figure 39:
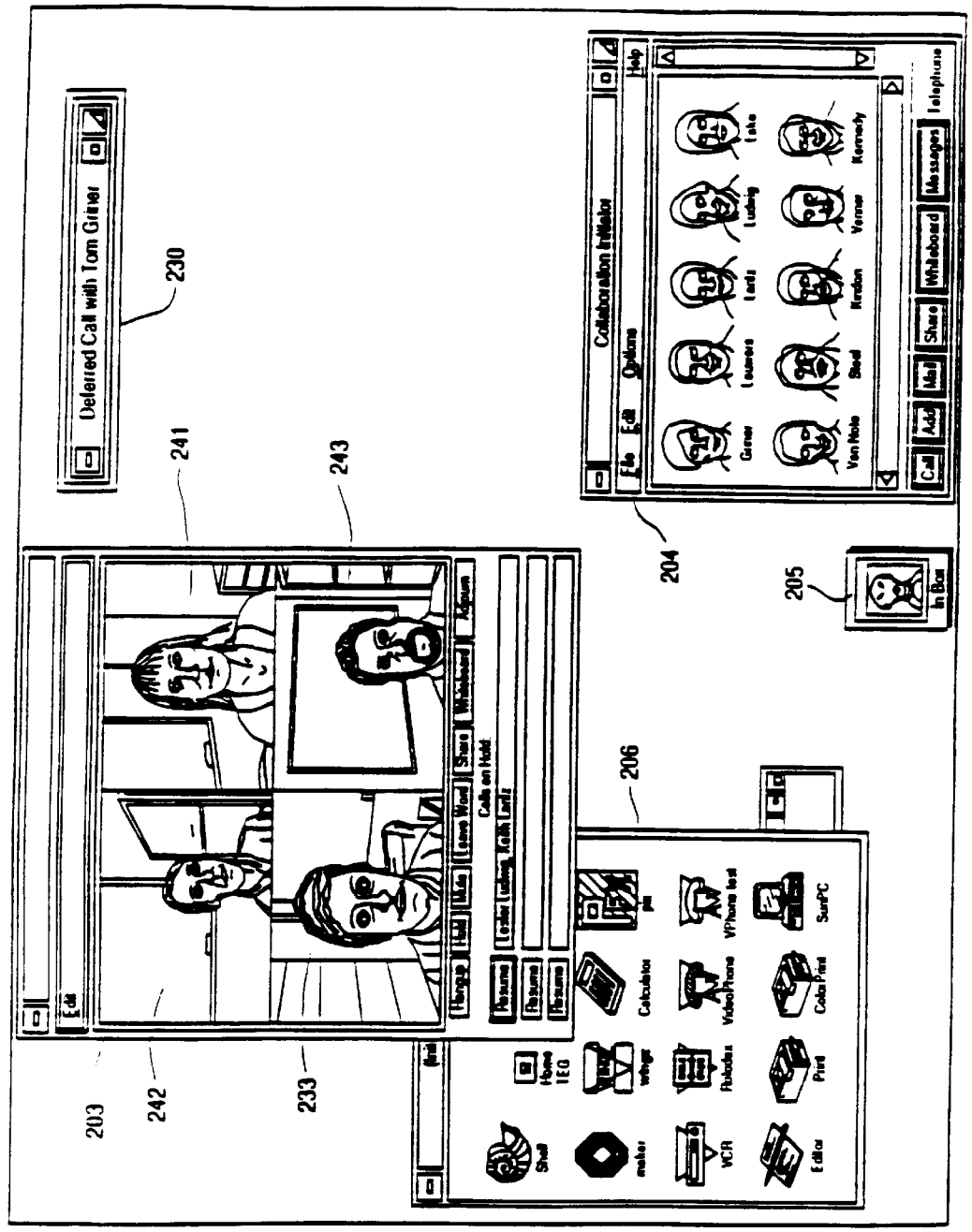

As illustrated in FIG. 39, video window 203 is now replaced with a four-person video mosaic representing a four-party conference call consisting of the Expert 233, his boss 241 and the two members 242 and 243 of the bank's operations department. The Expert quickly answers the boss' question and, by clicking on the RESUME button (of video window 203) adjacent to the names of the other participants to the call on hold, simultaneously hangs up on the conference call with his boss and resumes his three-party conference call involving the securities issue, as illustrated in video window 203 of FIG. 40.

While that call was on hold, however, analyst 231 and London expert 232 were still engaged in a two-way videoconference (with a blackened portion of the video mosaic on their screens indicating that the Expert was on hold) and had shared and annotated a graphical image 250 (see annotations 251 to image 250 of FIG. 40) illustrating certain financial concerns. Once the Expert resumed the call, analyst 231 added the Expert to the share session, causing Share window 211 containing annotated image 250 to appear on the Expert's screen. Optionally, snapshot sharing could progress while the video was on hold.

Figure 40:
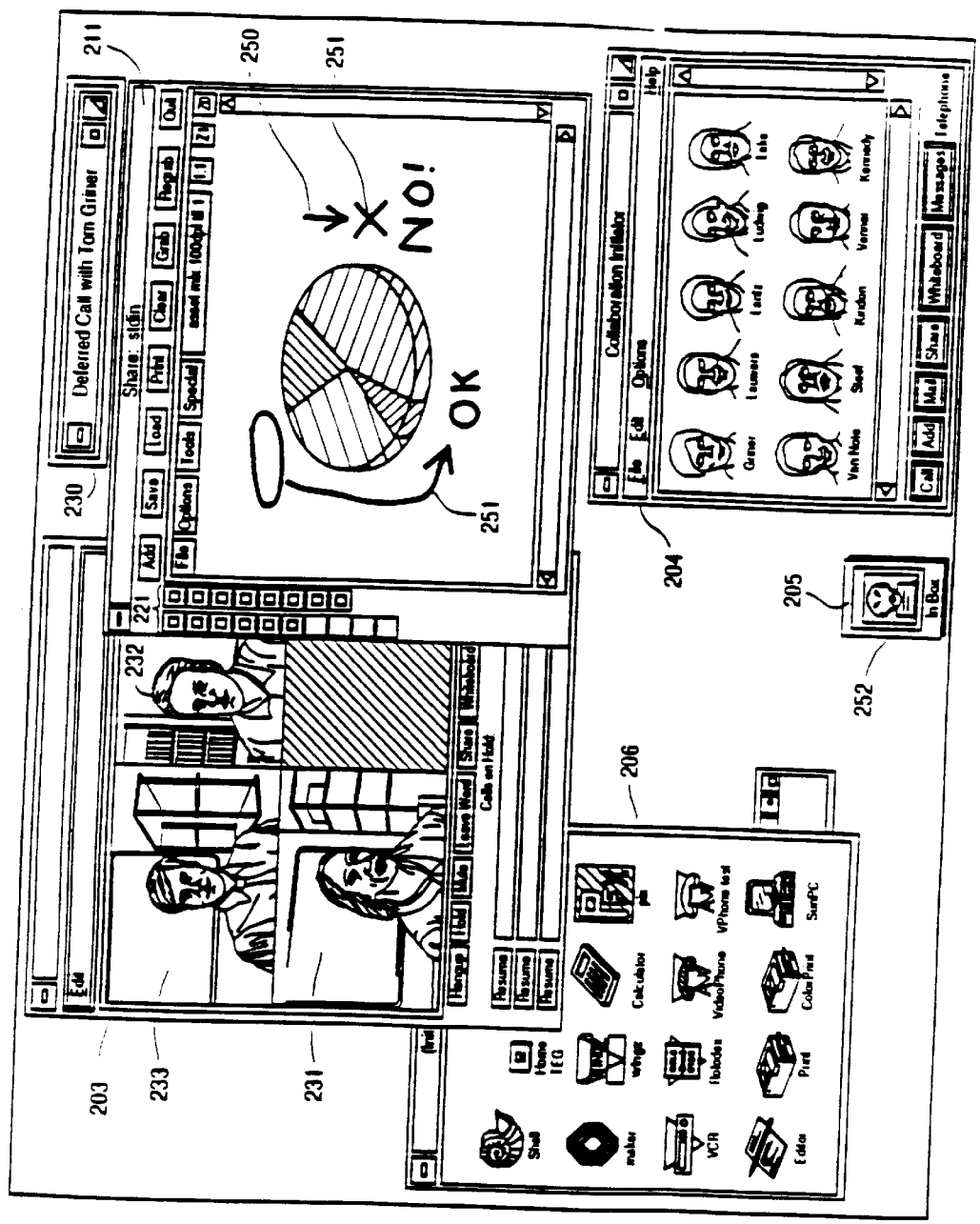

Before concluding his conference regarding the securities, the Expert receives notification of an incoming multimedia mail message—e.g., a beep accompanied by the appearance of an envelope 252 in the dog's mouth in In Box icon 205 shown in FIG. 40. Once he concludes his call, he quickly scans his incoming multimedia mail message by clicking on In Box icon 205, which invokes his mail software, and then selecting the incoming message for a quick scan, as generally illustrated in the top two windows of FIG. 2B. He decides it can wait for further review as the sender is an analyst other than the one helping on his security question.

Figure 41:
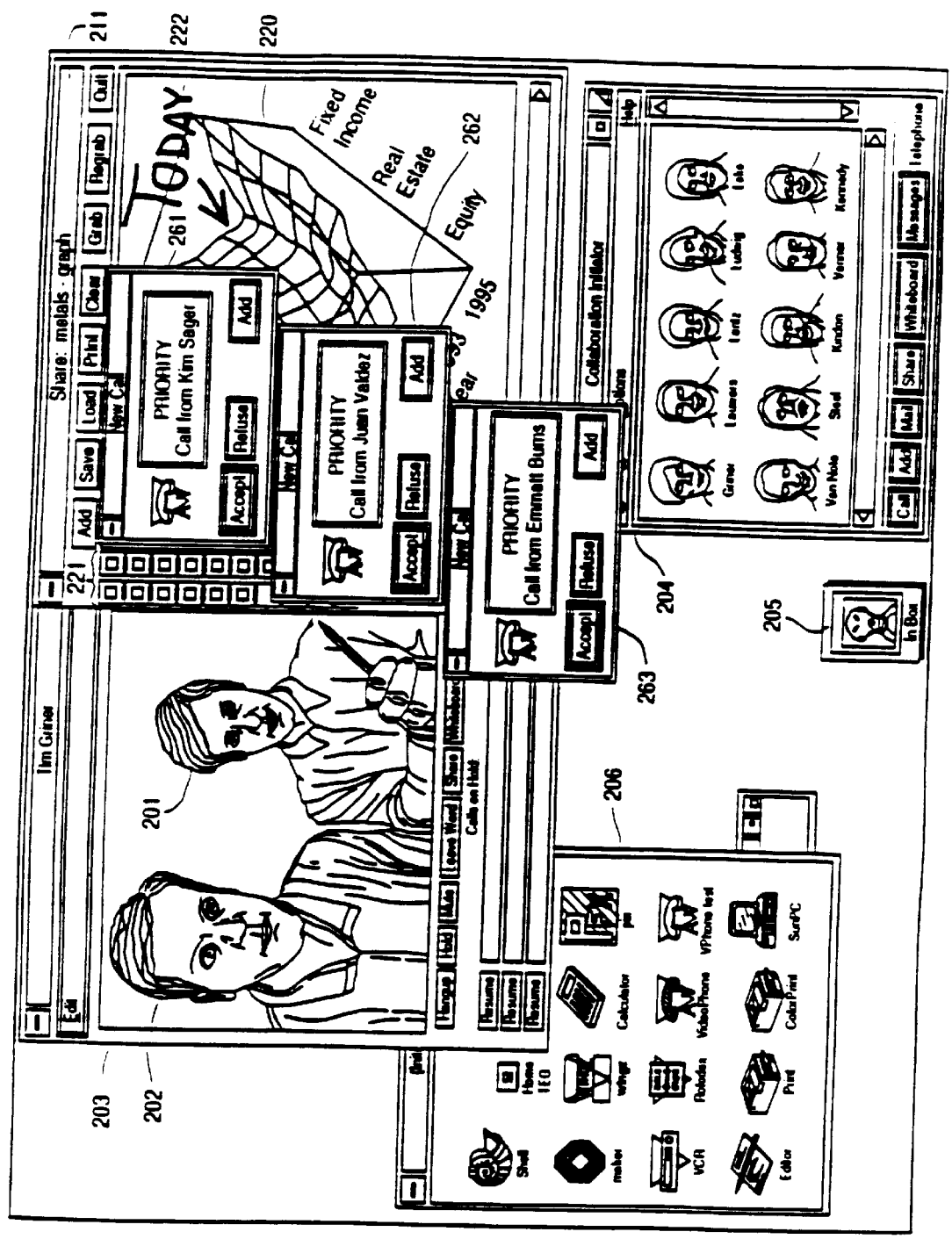

He then reinitiates (by selecting deferred call indicator 230, shown in FIG. 40) his deferred call with field representative 201 and his client 202, as shown in FIG. 41. Note that the full state of the call is also recreated, including restoration of previously shared image 220 with annotations 222 as they existed when the call was deferred (see FIG. 37). Note also in FIG. 41 that, having reviewed his only unread incoming multimedia mail message, In Box icon 205 no longer shows an envelope in the dog's mouth, indicating that the Expert currently has no unread incoming messages.

As the Expert continues to provide advice and pricing information to field representative 201, he receives notification of three priority calls 261–263 in short succession. Call 261 is the Head of Sales for the Chicago office. Working at home, she had instructed her CMW to alert her of all urgent news or messages, and was subsequently alerted to the arrival of the Expert's earlier multimedia mail message. Call 262 is an urgent international call. Call 263 is from the Head of Sales in Los Angeles. The Expert quickly winds down and then concludes his call with field representative 201.

The Expert notes from call indicator 262 that this call is not only an international call (shown in the top portion of the New Call window), but he realizes it is from a laptop user in the field in Central Mexico. The Expert elects to prioritize his calls in the following manner: 262, 261 and 263. He therefore quickly answers call 261 (by clicking on its ACCEPT button) and puts that call on hold while deferring call 263 in the manner discussed above. He then proceeds to accept the call identified by international call indicator 262.

Figure 42:
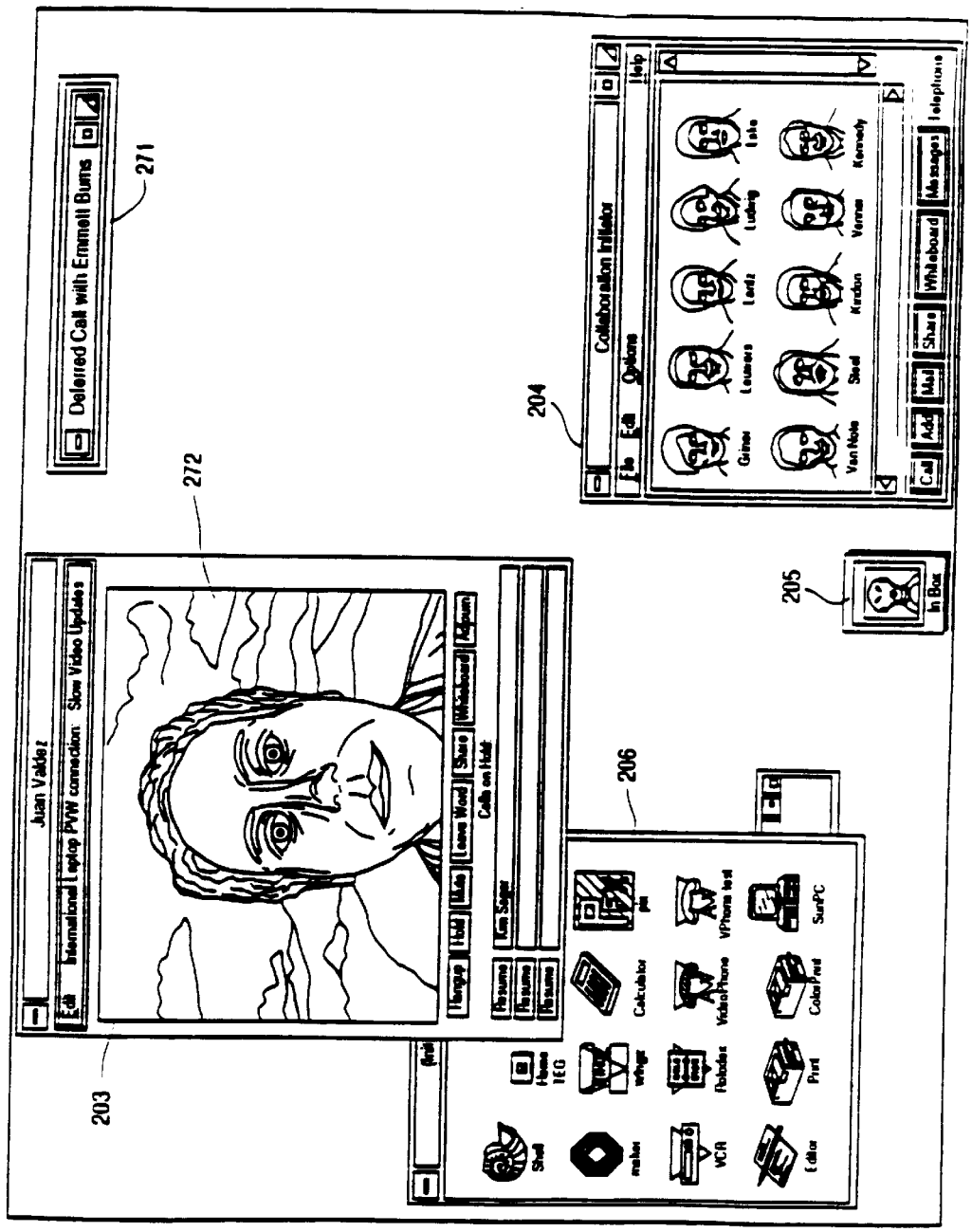

Note in FIG. 42 deferred call indicator 271 and the indicator for the call placed on hold (next to the highlighted RESUME button in video window 203), as well as the image of caller 272 from the laptop in the field in Central Mexico. Although Mexican caller 272 is outdoors and has no direct access to any wired telephone connection, his laptop has two wireless modems permitting dial-up access to two data connections in the nearest field office (through which his calls were routed). The system automatically (based upon the laptop's registered service capabilities) allocated one connection for an analog telephone voice call (using his laptop's built-in microphone and speaker and the Expert's computer-integrated telephony capabilities) to provide audio teleconferencing. The other connection provides control, data conferencing and one-way digital video (i.e., the laptop user cannot see the image of the Expert) from the laptop's built-in camera, albeit at a very slow frame rate (e.g., 3–10 small frames per second) due to the relatively slow dial-up phone connection.

It is important to note that, despite the limited capabilities of the wireless laptop equipment, the present invention accommodates such capabilities, supplementing an audio telephone connection with limited (i.e., relatively slow) one-way video and data conferencing functionality. As telephony and video compression technologies improve, the present invention will accommodate such improvements automatically. Moreover, even with one participant to a teleconference having limited capabilities, other participants need not be reduced to this "lowest common denominator." For example, additional participants could be added to the call illustrated in FIG. 42 as described above, and such participants could have full videoconferencing, data conferencing and other collaborative functionality vis-a-vis one another, while having limited functionality only with caller 272.

As his day evolved, the off-site salesperson 272 in Mexico was notified by his manager through the laptop about a new security and became convinced that his client would have particular interest in this issue. The salesperson therefore decided to contact the Expert as shown in FIG. 42. While discussing the security issues, the Expert again shares all captured graphs, charts, etc.

The salesperson 272 also needs the Expert's help on another issue. He has hard copy only of a client's portfolio and needs some advice on its composition before he meets with the client tomorrow. He says he will fax it to the Expert for analysis. Upon receiving the fax—on his CMW, via computer-integrated fax—the Expert asks if he should either send the Mexican caller a "QuickTime" movie (a lower quality compressed video standard from Apple Computer) on his laptop tonight or send a higher-quality CD via FedX tomorrow—the notion being that the Expert can produce an actual video presentation with models and annotations in video form. The salesperson can then play it to his client tomorrow afternoon and it will be as if the Expert is in the room. The Mexican caller decides he would prefer the CD.

Continuing with this scenario, the Expert learns, in the course of his call with remote laptop caller 272, that he missed an important issue during his previous quick scan of his incoming multimedia mail message. The Expert is upset that the sender of the message did not utilize the "video highlight" feature to highlight this aspect of the message. This feature permits the composer of the message to define "tags" (e.g., by clicking a TAG button, not shown) during record time which are stored with the message along with a "time stamp," and which cause a predefined or selectable audio and/or visual indicator to be played/displayed at that precise point in the message during playback.

Because this issue relates to the caller that the Expert has on hold, the Expert decides to merge the two calls together by adding the call on hold to his existing call. As noted above, both the Expert and the previously held caller will have full video capabilities vis-a-vis one another and will see a three-way mosaic image (with the image of caller 272 at a slower frame rate), whereas caller 272 will have access only to the audio portion of this three-way conference call, though he will have data conferencing functionality with both of the other participants.

The Expert forwards the multimedia mail message to both caller 272 and the other participant, and all three of them review the video enclosure in greater detail and discuss the concern raised by caller 272. They share certain relevant data as described above and realize that they need to ask a quick question of another remote expert. They add that expert to the call (resulting in the addition of a fourth image to the video mosaic, also not shown) for less than a minute while they obtain a quick answer to their question. They then continue their three-way call until the Expert provides his advice and then adjourns the call.

The Expert composes a new multimedia mail message, recording his image and audio synchronized (as described above) to the screen displays resulting from his simultaneous interaction with his CMW (e.g., running a program that performs certain calculations and displays a graph while the Expert illustrates certain points by telepointing on the screen, during which time his image and spoken words are also captured). He sends this message to a number of salesforce recipients whose identities are determined automatically by an outgoing mail filter that utilizes a database of information on each potential recipient (e.g., selecting only those whose clients have investment policies which allow this type of investment).

The Expert then receives an audio and visual reminder (not shown) that a particular video feed (e.g., a short segment of a financial cable television show featuring new financial instruments) will be triggered automatically in a few minutes. He uses this time to search his local securities database, which is dynamically updated from financial information feeds (e.g., prepared from a broadcast textual stream of current financial events with indexed headers that automatically applies data filters to select incoming events relating to certain securities). The video feed is then displayed on the Expert's screen and he watches this short video segment.

After analyzing this extremely up-to-date information, the Expert then reinitiates his previously deferred call, from indicator 271 shown in FIG. 42, which he knows is from the Head of Sales in Los Angeles, who is seeking to provide his prime clients with securities advice on another securities transaction based upon the most recent available information. The Expert's call is not answered directly, though he receives a short prerecorded video message (left by the caller who had to leave his home for a meeting across town soon after his priority message was deferred) asking that the Expert leave him a multimedia mail reply message with advice for a particular client, and explaining that he will access this message remotely from his laptop as soon as his meeting is concluded. The Expert complies with this request and composes and sends this mail message.

The Expert then receives an audio and visual reminder on his screen indicating that his office hours will end in two minutes. He switches from "intercom" mode to "telephone" mode so that he will no longer be disturbed without an opportunity to reject incoming calls via the New Call window described above. He then receives and accepts a final call concerning an issue from an electronic meeting several months ago, which was recorded in its entirety.

The Expert accesses this recorded meeting from his "corporate memory". He searches the recorded meeting (which appears in a second video window on his screen as would a live meeting, along with standard controls for stop/play/rewind/fast forward/etc.) for an event that will trigger his memory using his fast forward controls, but cannot locate the desired portion of the meeting. He then elects to search the ASCII text log (which was automatically extracted in the background after the meeting had been recorded, using the latest voice recognition techniques), but still cannot locate the desired portion of the meeting. Finally, he applies an information filter to perform a content-oriented (rather than literal) search and finds the portion of the meeting he was seeking. After quickly reviewing this short portion of the previously recorded meeting, the Expert responds to the caller's question, adjourns the call and concludes his office hours.

It should be noted that the above scenario involves many state-of-the-art desktop tools (e.g., video and information feeds, information filtering and voice recognition) that can be leveraged by our Expert during videoconferencing, data conferencing and other collaborative activities provided by the present invention—because this invention, instead of providing a dedicated videoconferencing system, provides a desktop multimedia collaboration system that integrates into the Expert's existing workstation/LAN/WAN environment.

It should also be noted that all of the preceding collaborative activities in this scenario took place during a relatively short portion of the expert's day (e.g., less than an hour of cumulative time) while the Expert remained in his office and continued to utilize the tools and information available from his desktop. Prior to this invention, such a scenario would not have been possible because many of these activities could have taken place only with face-to-face collaboration, which in many circumstances is not feasible or economical and which thus may well have resulted in a loss of the associated business opportunities.

Although the present invention has been described in connection with particular preferred embodiments and examples, it is to be understood that many modifications and variations can be made in hardware, software, operation, uses, protocols and data formats without departing from the scope to which the inventions disclosed herein are entitled. For example, for certain applications, it will be useful to provide some or all of the audio/video signals in digital form. Accordingly, the present invention is to be considered as including all apparatus and methods encompassed by the appended claims.

We claim:

1. A teleconferencing system for conducting a teleconference among a plurality of participants comprising:
   (a) a plurality of video display devices each having associated
      (i) participant video capture capabilities, and
      (ii) participant audio
         (1) capture and
         (2) reproduction capabilities; and
   (b) at least one communication path
      (i) along which signals
         (1) representing participant audio and video
         (ii) can be transmitted; wherein the system is configured to display,
      (i) a first and a second set of potential participants in which
         (1) the first set includes names of potential participants and
         (2) the second set includes icons representing potential participants, and
      (ii) a set of collaboration types; wherein the system is further configured to allow a selecting participant
         (i) to initiate
            (1) collaboration
         (ii) by selecting
            (1) one or more participants
               i. from the displayed sets of potential participants, and
            (2) at least one collaboration type
               i. from the displayed set of collaboration types, and thereby
         (iii) establish communication
            (1) of the selected type,
            (2) with each selected participant.

2. The teleconferencing system of claim 1, wherein the second set of participants is a subset of participants, and wherein, the system allows the selecting participant to:
   (a) select
      (i) one or more desired participants
      (ii) from the first set of the potential participants; and
   (b) select
      (i) one or more desired participants
      (ii) from the second set of potential participants, and thereby
   (c) establishing communication
      (i) with all selected participants.

3. The teleconferencing system of claim 2, wherein
   (a) the selecting participant
   (b) can use
      (i) at least one computer graphic user interface
      (ii) to select
         (1) at least one of the participant(s) and/or
         (2) at least one of the collaboration types.

4. The teleconferencing system of claim 1, wherein
   (a) the set of collaboration types includes at least one of:
      (i) data conferencing, videoconferencing, telephone conferencing, sending faxes, sending electronic mail, and the sending of multimedia mail messages.

5. The teleconferencing system of claim 1, wherein the system
   (a) defaults to
      (i) to a default collaboration type
      (ii) upon selection of a participant.

6. The teleconferencing system of claim 1, wherein the system
   (a) allows pre-selecting
      (i) a desired participant; and
      (ii) a default collaboration type.

7. The teleconferencing system of claim 1, wherein the system is configured to allow a participant:
   (a) to select
      (i) a further participant
      (ii) from among a plurality of potential participants and
   (b) add
      (i) the new participant
      (i) to an active teleconference call.

8. The teleconferencing system of claim 1, wherein the system is further configured to:
   (a) detect
      (i) during a first teleconference call
         (1) between a first and a second participant,
      (ii) an attempt
         (1) by a third caller
         (2) to initiate a second teleconference call
         (3) with the second participant;
   (b) notify
      (i) the second participant (ii) of the attempt; and
(c) allow
(i) the second participant
(ii) to add
(1) the third caller
(2) to the first teleconference call.

9. The teleconferencing system of claim 1, wherein the system is configured to:
(a) allow
(i) at least one participant
(ii) access
(1) to at least one audio and/or video signal source; and
(b) reproduce
(i) audio and video
(1) based on signals
(2) from the accessed signal source
(ii) for another participant.

10. The teleconferencing system of claim 1, wherein the system is configured to
(a) support a maximum number of N calls
(i) for a participant; and
(b) enable that participant,
(i) when faced with M, greater than N, possible calls,
(ii) to select N of the M possible calls.

11. The teleconferencing system of claim 1, wherein the system is configured to:
(a) allow a participant
(i) in a teleconference call with
(1) a plurality of other participants
(ii) to place on hold
(iii) at least one of the other participants.

12. The teleconferencing system of claim 1, configured to:
(a) allow a participant
(i) in a teleconference call with
(1) a plurality of other participants
(ii) to disconnect
(iii) at least one of the other participants.

13. A method for conducting a teleconference among a plurality of participants, each having an associated video capture and display and audio capture and reproduction capabilities, the method comprising the steps of:
(a) displaying
(i) a first and a second set of potential participants in which
(1) the first set includes names of potential participants and
(2) the second set includes icons representing potential participants, and
(ii) a set of collaboration types;
(b) selecting
(i) one or more participants
(ii) from among a plurality of the displayed sets of potential participants;
(c) selecting
(i) a desired collaboration type
(ii) from among a plurality of the displayed collaboration types; and
(d) establishing communication
(i) of the selected type,
(ii) with the selected participant to define a teleconference call.

14. The method of claim 13, wherein the second set is a subset of the first set, the method further comprising the steps of:
(a) selecting
(i) one or more desired participants
(ii) from the first set of potential participants; and
(b) selecting
(i) one or more desired participants
(ii) from the second set of potential participants; and thereby
(d) establishing communications
(i) with all selected participants.

15. The method of claim 13, wherein
(a) the plurality of collaboration types includes at least one of:
(i) data conferencing, videoconferencing, telephone conferencing, sending faxes, sending electronic mail and sending multimedia mail messages.

16. The method of claim 13, wherein
(a) the step of selecting
(i) one or more participants
(ii) invokes a default collaboration type.

17. The method of claim 13, further comprising the steps of:
(a) selecting
(i) a new participant
(ii) from among a plurality of potential participants; and
(b) adding
(i) the new participant
(ii) to an active teleconference call.

18. The method of claim 13, further comprising the steps of:
(a) detecting,
(i) during a first teleconference call
(1) between a first and a second participant,
(ii) an attempt
(1) by a third caller
(2) to initiate a second teleconference call
(3) with the second participant;
(b) notifying
(i) the second participant
(ii) of the attempt; and
(c) adding
(i) the third caller
(ii) to the first teleconference call.

19. The method of claim 13, further comprising the steps of
(a) allowing at least one participant
(1) access to at least one audio and/or video signal source; and
(b) reproducing video and/or audio
(i) based on signals,
(ii) from the accessed signal source;
(iii) for another participant.

20. The method of claim 13, wherein a maximum number of calls equal to N can be supported for a participant, the method further comprising the steps of:
(a) enabling that participant,
(i) in a teleconference call,
(ii) when faced with M, greater than N, possible calls
(iii) to select N of the M possible calls.

21. The method of claim 13, further comprising the step of
(a) allowing a participant
(i) in a teleconference call with
(1) a plurality of other participants
(ii) to place on hold (iii) at least one of the other participants.

22. The method of claim 13, further comprising the step of
 (a) allowing a participant
  (i) in a teleconference call with
   (1) a plurality of other participants
  (ii) to disconnect
  (iii) at least one of the other participants.

23. A teleconferencing system for conducting a teleconference among a plurality of participants comprising:
 (a) a plurality of video display devices each having associated
  (i) participant video capture capabilities, and
  (ii) participant audio
   (1) capture and
   (2) reproduction capabilities;
 (b) at least one communication path
  (i) along which signals
   (1) representing participant audio and video
  (ii) can be transmitted;
 (c) an A/V switching circuitry
  (i) to provide port-to-port connections for
   (1) signals transmitted
   (2) between the participants; and wherein the system is configured to allow a selecting participant
  (i) to initiate
   (1) any of a plurality of types of collaboration
  (ii) by selecting
   (1) one or more desired participants from among a plurality of potential participants; and
   (2) desired collaboration type from among a set of collaboration types, including, at least one of, data conferencing, videoconferencing, telephone conferencing, the sending of faxes and the sending of multimedia mail messages; and
  (iii) establishing communication
   (1) of the selected type,
   (2) with the selected participant(s).

24. A method for conducting a teleconference among a plurality of participants, each having an associated video capture and display and audio and video AV capture and reproduction capabilities, the method comprising the steps of:
 (a) selecting
  (i) one or more desired participants
  (ii) from among a plurality of potential participants;
 (b) selecting
  (i) desired collaboration type
  (ii) from among a plurality of collaboration types,
   (1) including data conferencing, videoconferencing, telephone conferencing, the sending of faxes and the sending of multimedia mail messages; and
 (c) producing signals
  (i) representative of the selected collaboration type; and
 (d) switching produced signals by an A/V switching circuitry to provide port-to-port connections
  (i) between the participants
  (ii) to establish communication
   (1) of the selected type,
   (2) with the selected participant(s).

* * * * *

UNITED STATES PATENT AND TRADEMARK OFFICE
CERTIFICATE OF CORRECTION

PATENT NO. : 5,854,893
DATED : Dec. 29, 1998
INVENTOR(S) : Lester F. Ludwig, et al Page 1 of 7

It is certified that error appears in the above-identified patent and that said Letters Patent is hereby corrected as shown below:

Column 12, lines 32-33 reading "an other" should read - -an-other- -.

Column 12, line 67 reading "output 38-1" should read - -output 38a-1- -

Column 13, line 47 reading "116c derived" should read - -116c and 116d derived- -;

Column 14, line 20 reading "three" should read - -two- -;

Column 14, line 21 reading "B and C" should read - -and B- -;

Column 14, line 24 reading "C mosaic" should read - -and D or C mosaic, respectively- -;

Column 14, line 26 reading "required for only" should read - -only required for- -;

Column 14, line 33 "Sites #1 and Sites #3" should read - -Site #1 and Site #3- -.

Column 24, line 12 reading "respectively are" should read - -respectively, are- -;

Column 24, line 32 reading "form" should read - -from- -;

Column 24, line 39 reading "acts a" should read - -acts as a- -.

Column 26, line 7 reading "party, (for" should read - -party (for- -.

Column 30, line 54 reading "that attempting" should read - -than attempting- -.

Column 34 line 63 reading "30" should read - -31D- -;

Column 35, line 25 reading "a network" should read - -and network- -.

Signed and Sealed this

Twelfth Day of December, 2000

Attest:

Q. TODD DICKINSON

*Attesting Officer*  *Director of Patents and Trademarks*

UNITED STATES PATENT AND TRADEMARK OFFICE
CERTIFICATE OF CORRECTION

Patent No.: 5,854,893

Page 2 of 7

Dated: December 29, 1998

Inventor(s): Lester F. Ludwig, et al.

It is certified that error appears in the above-identified patent and that said Letters Patent is hereby corrected as shown.

Drawings:

In the drawings, Sheet 6, Figure 7, the reference numeral reading "122-n" should read
- -112-n- -.

In the drawings, Sheet 10, Figure 12A, in the first square block at the top, a solid vertical line should separate "C" and "D" and divide the block in half; please see attached Figure 12A.

Also in Figure 12A, in the square block below the block described above, a solid vertical line should separate "A" and "B" and divide the block in half; please see attached Figure 12A.

Also in Figure 12A, in the first box on the right, indicated by "SITE NO. 2" the line reading "PARTICIPANT A" should read - -PARTICIPANT C- -;

Also in the same box, the line reading "PARTICIPANT B" should read - -PARTICIPANT D- -;

Please see attached Figure 12A.

In the drawings, Sheet 10, Figure 12B, in the first box on the right, indicated by "SITE NO. 2" the line reading "PARTICIPANT A" should read - -PARTICIPANT C- -; also in the same box, the line reading "PARTICIPANT B" should read - -PARTICIPANT D- -; please see attached Figure 12B.

In the drawings, Sheet 10, Figure 13B, the line reading "A,B = 0 UNIT DELAY" should read - -A,B,C = 0 UNIT DELAY- -; please see attached Figure 13B.

In the drawings, Sheet 11, Figure 14B, the description above the arrow pointing from the middle box to the left box reading "A + B + C" should read - -A + B + D- -; please see attached Figure 14B. Also in Figure 14B, the line below the left box reading "C HEARS A + B + C" should read - -C HEARS A + B + D- -; please see attached Figure 14B.

In the drawings, Sheet 11, Figure 15A, in the two square blocks between the middle rectangular block and the right rectangular block, there should be vertical lines in the shaded areas dividing the blocks in half; please see attached Figure 15A.

In the drawings, Sheet 12, Figure 16, in the square block below the arrow pointing from the top middle rectangular block to the right rectangular block, the lower-left reference reading "D" should read - -C- -; please see attached Figure 16.

In the drawings, Sheet 13, Figure 17A, in the square block just above the lowest rectangular block, the lower-left reference reading "D" should read - -C- -; please see attached Figure 17A.

In the drawings, Sheet 13, Figure 17B, below the top left rectangular block, insert
- -A HEARS B + C + D- -; also in Figure 17B, below the top middle rectangular block, insert
- -B HEARS A + C + D- -; also in Figure 17B, below the top right rectangular block, insert
- -C HEARS A + B + D- -; also in Figure 17B, below the bottom middle rectangular block, insert - -D HEARS A + B + C- -; please see attached Figure 17B.

UNITED STATES PATENT AND TRADEMARK OFFICE
CERTIFICATE OF CORRECTION

Patent No.: 5,854,893                                       Page 3 of 7

Dated:      December 29, 1998

Inventor(s): Lester F. Ludwig, et al.

It is certified that error appears in the formal drawings in the above-identified patent and that said Letters Patent is hereby corrected as shown.

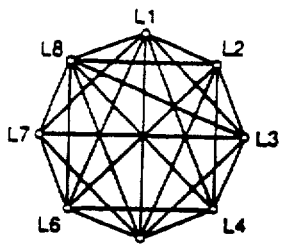

FIGURE 5

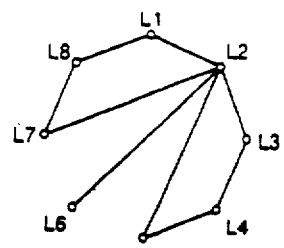

FIGURE 6

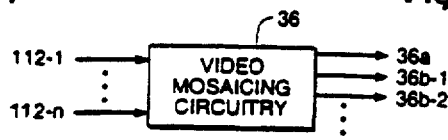

FIGURE 7

FIGURE 9

FIGURE 10

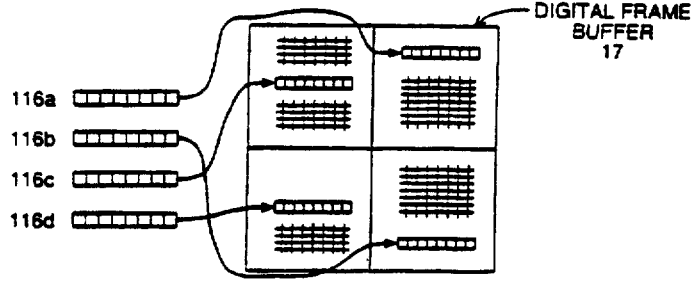

FIGURE 11

UNITED STATES PATENT AND TRADEMARK OFFICE
CERTIFICATE OF CORRECTION

Patent No.: 5,854,893            Page 4 of 7

Dated: December 29, 1998

Inventor(s): Lester F. Ludwig, et al.

It is certified that error appears in the formal drawings in the above-identified patent and that said Letters Patent is hereby corrected as shown.

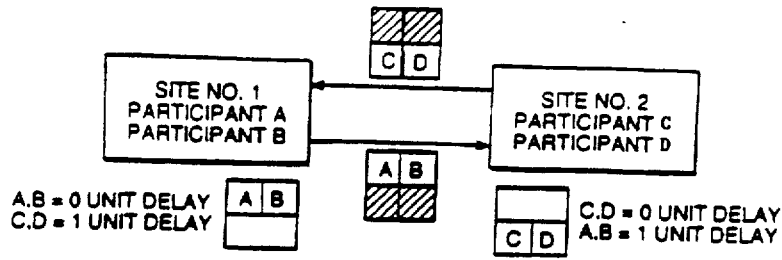

FIGURE 12A

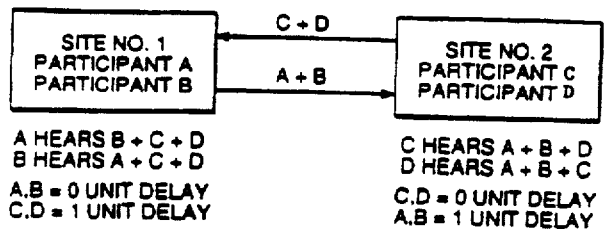

FIGURE 12B

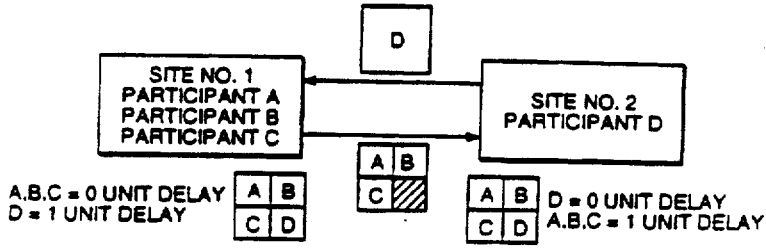

FIGURE 13A

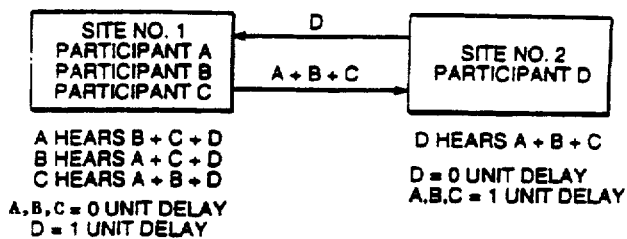

FIGURE 13B

UNITED STATES PATENT AND TRADEMARK OFFICE
CERTIFICATE OF CORRECTION

Patent No.: 5,854,893            Page 5 of 7

Dated: December 29, 1998

Inventor(s): Lester F. Ludwig, et al.

It is certified that error appears in the formal drawings in the above-identified patent and that said Letters Patent is hereby corrected as shown.

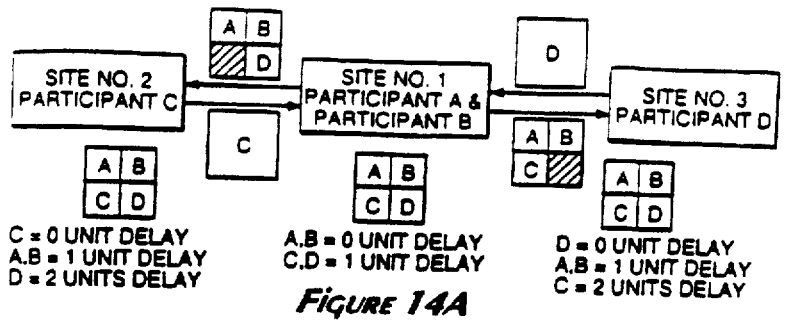

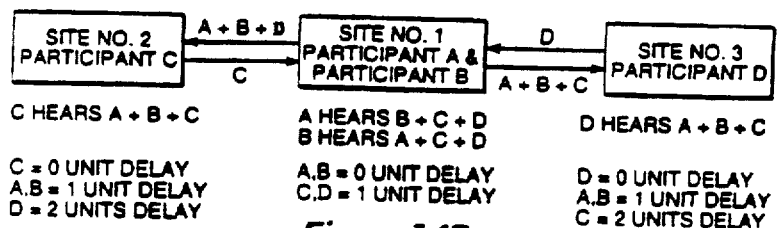

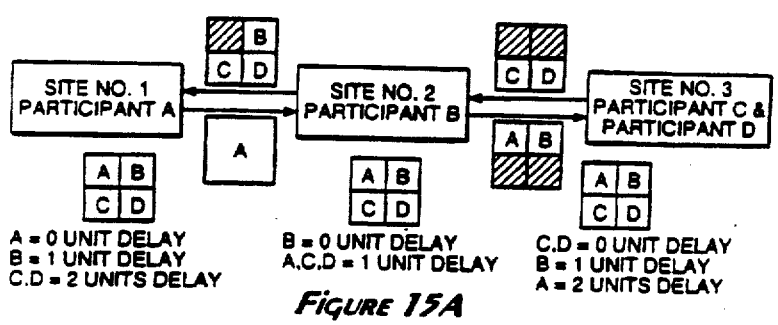

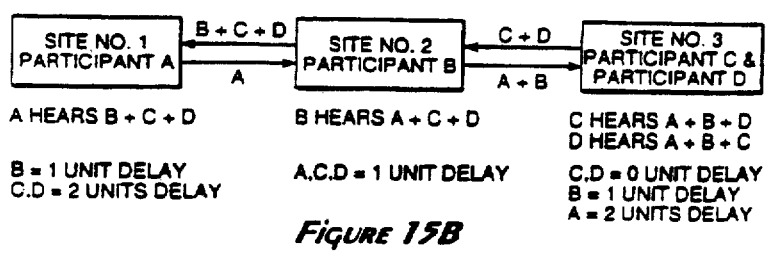

UNITED STATES PATENT AND TRADEMARK OFFICE
CERTIFICATE OF CORRECTION

Patent No.: 5,854,893          Page 6 of 7

Dated: December 29, 1998

Inventor(s): Lester F. Ludwig, et al.

It is certified that error appears in the formal drawings in the above-identified patent and that said Letters Patent is hereby corrected as shown.

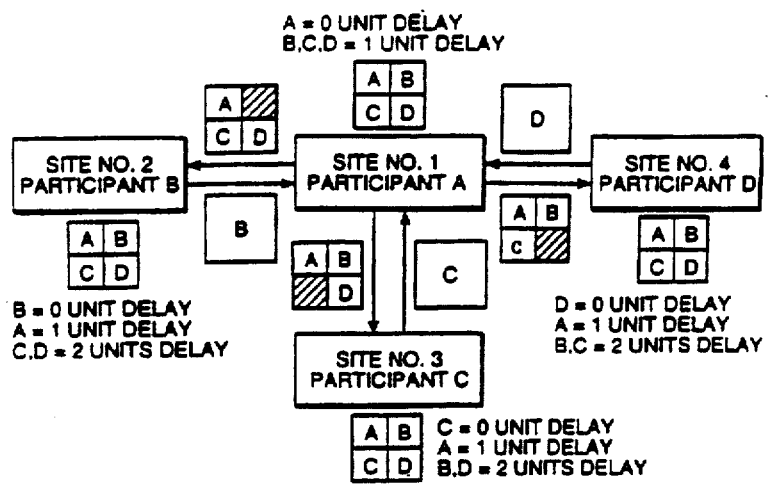

Figure 16

UNITED STATES PATENT AND TRADEMARK OFFICE
CERTIFICATE OF CORRECTION

Patent No.: 5,854,893

Dated: December 29, 1998

Inventor(s): Lester F. Ludwig, et al.

It is certified that error appears in the formal drawings in the above-identified patent and that said Letters Patent is hereby corrected as shown.

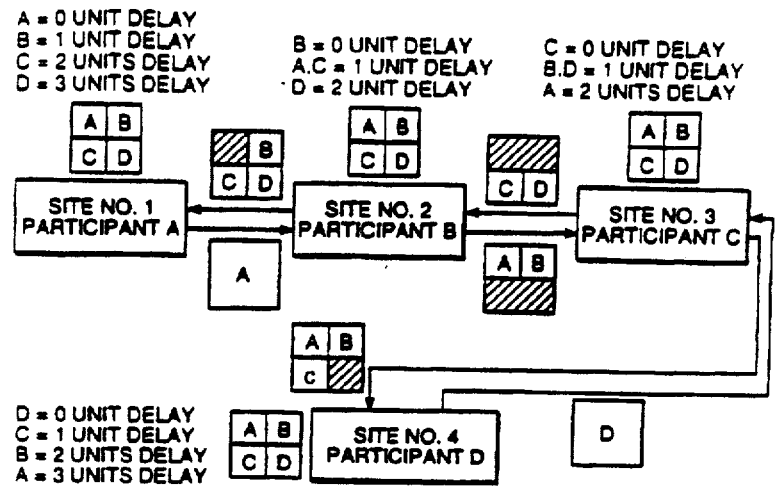

FIGURE 17A

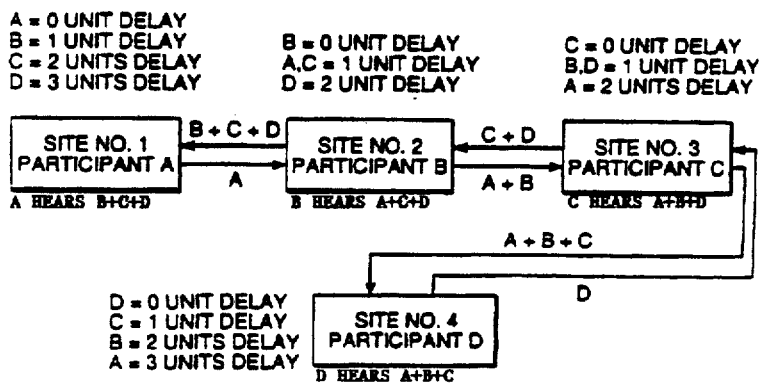

FIGURE 17B

(12) EX PARTE REEXAMINATION CERTIFICATE (7056th)
United States Patent
Ludwig et al.

(10) Number: US 5,854,893 C1
(45) Certificate Issued: Sep. 15, 2009

(54) SYSTEM FOR TELECONFERENCING IN WHICH COLLABORATION TYPES AND PARTICIPANTS BY NAMES OR ICONS ARE SELECTED BY A PARTICIPANT OF THE TELECONFERENCE

(75) Inventors: Lester F. Ludwig, Foster City, CA (US); J. Chris Lauwers, Menlo Park, CA (US); Keith A. Lantz, Los Altos, CA (US); Gerald J. Burnett, Atherton, CA (US); Emmett R. Burns, Incline Village, NV (US)

(73) Assignee: Avistar Communications Corporation

Reexamination Request:
No. 90/009,014, Feb. 26, 2008

Reexamination Certificate for:
Patent No.: 5,854,893
Issued: Dec. 29, 1998
Appl. No.: 08/660,880
Filed: Jun. 10, 1996

Related U.S. Application Data

(62) Division of application No. 08/131,523, filed on Oct. 1, 1993, now Pat. No. 5,689,641.

(51) Int. Cl.
*G06Q 10/00* (2006.01)
*H04N 7/14* (2006.01)
*H04N 7/15* (2006.01)
*H04L 12/58* (2006.01)
*H04L 12/18* (2006.01)
*H04L 29/06* (2006.01)
*H04M 3/56* (2006.01)
*H04M 3/50* (2006.01)
*H04M 3/53* (2006.01)
*H04M 7/00* (2006.01)
*H04M 7/12* (2006.01)
*H04M 3/42* (2006.01)
*H04M 3/428* (2006.01)

(52) U.S. Cl. .................. 709/204; 709/205; 709/227; 709/231; 709/246; 709/249; 348/E7.081; 348/E7.082; 348/E7.083; 348/E7.084

(58) Field of Classification Search .................. None
See application file for complete search history.

(56) References Cited

U.S. PATENT DOCUMENTS 3,721,777 A 3/1973 Thomas (Continued)

FOREIGN PATENT DOCUMENTS

DE 35 07 152 8/1985

(Continued)

OTHER PUBLICATIONS

Vin, Harrick M., et al., Designing a Multi–User HDTV Storage Server, Jan. 1993, IEEE Journal on Selected Areas in Communications, vol. 11, No. 1, pp. 1–24.

(Continued)

*Primary Examiner*—William H. Wood

(57) ABSTRACT

A multimedia collaboration system that integrates separate real-time and asynchronous networks—the former for real-time audio and video, and the latter for control signals and textual, graphical and other data—in a manner that is interoperable across different computer and network operating system platforms and which closely approximates the experience of face-to-face collaboration, while liberating the participants from the limitations of time and distance. These capabilities are achieved by exploiting a variety of hardware, software and networking technologies in a manner that preserves the quality and integrity of audio/video/data and other multimedia information, even after wide area transmission, and at a significantly reduced networking cost as compared to what would be required by presently known approaches. The system architecture is readily scalable to the largest enterprise network environments. It accommodates differing levels of collaborative capabilities available to individual users and permits high-quality audio and video capabilities to be readily superimposed onto existing personal computers and workstations and their interconnecting LANs and WANs. In a particular preferred embodiment, a plurality of geographically dispersed multimedia LANs are interconnected by a WAN. The demands made on the WAN are significantly reduced by employing multi-hopping techniques, including dynamically avoiding the unnecessary decompression of data at intermediate hops, and exploiting video mosaicing, cut-and-paste and audio mixing technologies so that significantly fewer wide area transmission paths are required while maintaining the high quality of the transmitted audio/video.

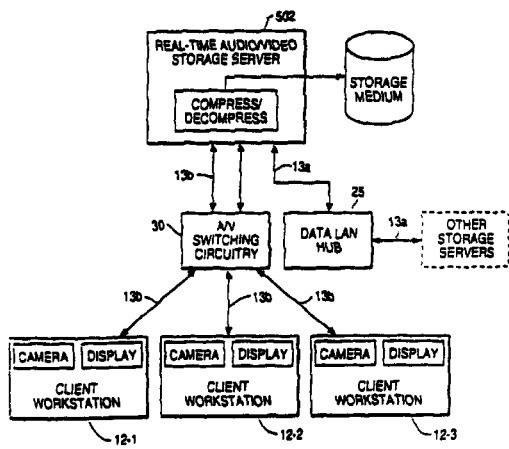

U.S. PATENT DOCUMENTS

| | | |
|---|---|---|
| 3,723,653 A | 3/1973 | Tatsuzawa |
| 3,873,771 A | 3/1975 | Kleinerman et al. |
| 3,922,488 A | 11/1975 | Gabr |
| 3,974,337 A | 8/1976 | Tatsuzawa |
| 4,005,265 A | 1/1977 | Verhoeckx et al. |
| 4,054,908 A | 10/1977 | Poirier et al. |
| 4,210,927 A | 7/1980 | Yumde et al. |
| 4,400,724 A | 8/1983 | Fields |
| 4,430,526 A | 2/1984 | Brown et al. |
| 4,441,180 A | 4/1984 | Schussler |
| 4,451,705 A | 5/1984 | Burke et al. |
| 4,475,193 A | 10/1984 | Brown |
| 4,476,349 A | 10/1984 | Cottrell et al. |
| 4,479,195 A | 10/1984 | Herr et al. |
| 4,500,960 A | 2/1985 | Babecki et al. |
| 4,516,156 A | 5/1985 | Fabris et al. |
| 4,529,839 A | 7/1985 | Colton et al. |
| 4,529,840 A | 7/1985 | Colton et al. |
| 4,531,024 A | 7/1985 | Colton et al. |
| 4,574,374 A | 3/1986 | Scordo |
| 4,577,065 A | 3/1986 | Frey et al. |
| 4,599,611 A | 7/1986 | Bowker et al. |
| 4,625,081 A | 11/1986 | Lotito et al. |
| 4,645,872 A | 2/1987 | Pressman et al. |
| 4,650,929 A | 3/1987 | Boerger et al. |
| 4,653,090 A | 3/1987 | Hayden |
| 4,672,442 A | 6/1987 | Yamaguchi et al. |
| 4,686,698 A | 8/1987 | Tompkins et al. |
| 4,691,347 A | 9/1987 | Stanley et al. |
| 4,710,917 A | 12/1987 | Tompkins et al. |
| 4,713,806 A | 12/1987 | Oberlander et al. |
| 4,716,585 A | 12/1987 | Tompkins et al. |
| 4,720,850 A | 1/1988 | Oberlander et al. |
| 4,739,509 A | 4/1988 | Bourg |
| 4,741,025 A | 4/1988 | Maruyama et al. |
| 4,786,741 A | 11/1988 | Sachs |
| 4,796,293 A | 1/1989 | Blinken et al. |
| 4,800,344 A | 1/1989 | Graham |
| 4,805,205 A | 2/1989 | Faye |
| 4,817,018 A | 3/1989 | Cree et al. |
| 4,837,798 A | 6/1989 | Cohen et al. |
| 4,847,829 A | 7/1989 | Tompkins et al. |
| 4,849,811 A | 7/1989 | Kleinerman |
| 4,850,009 A | 7/1989 | Zook et al. |
| 4,885,747 A | 12/1989 | Foglia |
| 4,888,795 A | 12/1989 | Ando et al. |
| 4,890,320 A | 12/1989 | Monslow et al. |
| 4,893,326 A | 1/1990 | Duran et al. |
| 4,914,586 A | 4/1990 | Swinehart et al. |
| 4,922,523 A | 5/1990 | Hashimoto |
| 4,931,872 A | 6/1990 | Stoddard et al. |
| 4,953,159 A | 8/1990 | Hayden et al. |
| 4,961,211 A | 10/1990 | Tsugane et al. |
| 4,965,819 A | 10/1990 | Kannes |
| 4,977,520 A | 12/1990 | McGauhey et al. |
| 4,987,492 A | 1/1991 | Stults et al. |
| 4,995,071 A | 2/1991 | Weber et al. |
| 4,995,078 A | 2/1991 | Monslow et al. |
| 4,998,243 A | 3/1991 | Kao |
| 5,003,532 A | 3/1991 | Ashida et al. |
| 5,010,399 A | 4/1991 | Goodman et al. |
| 5,012,509 A | 4/1991 | Nakamura et al. |
| 5,014,267 A | 5/1991 | Tompkins et al. |
| 5,016,976 A | 5/1991 | Horner et al. |
| 5,027,400 A | 6/1991 | Baji et al. |
| 5,042,062 A | 8/1991 | Lee et al. |
| 5,056,136 A | 10/1991 | Smith |
| 5,061,046 A | 10/1991 | Lee et al. |
| 5,072,442 A | 12/1991 | Todd |
| 5,073,926 A | 12/1991 | Suzuki et al. |
| 5,099,510 A | 3/1992 | Blinken, Jr. et al. |
| 5,109,515 A | 4/1992 | Laggis et al. |
| 5,109,517 A | 4/1992 | Houda et al. |
| 5,121,426 A | 6/1992 | Baumbauer, Jr. et al. |
| 5,127,041 A | 6/1992 | O'Sullivan |
| 5,130,399 A | 7/1992 | Ikeno et al. |
| 5,130,793 A | 7/1992 | Bordry et al. |
| 5,130,801 A | 7/1992 | Yamaguchi |
| 5,133,079 A | 7/1992 | Ballantyne et al. |
| 5,146,325 A | 9/1992 | Ng |
| 5,155,761 A | 10/1992 | Hammond |
| 5,157,491 A | 10/1992 | Kassatly |
| 5,170,427 A | 12/1992 | Guichard et al. |
| 5,190,586 A | 3/1993 | Mizuguchi et al. |
| 5,191,611 A | 3/1993 | Lang |
| 5,195,086 A | 3/1993 | Baumgartner et al. |
| 5,195,087 A | 3/1993 | Bennett et al. |
| 5,200,989 A | 4/1993 | Milone |
| 5,202,828 A | 4/1993 | Vertelney et al. |
| 5,202,957 A | 4/1993 | Serrao |
| 5,218,627 A | 6/1993 | Corey et al. |
| 5,224,094 A | 6/1993 | Maher et al. |
| 5,231,492 A | 7/1993 | Dangi et al. |
| 5,239,466 A | 8/1993 | Morgan et al. |
| 5,249,218 A | 9/1993 | Sainton |
| 5,253,362 A | 10/1993 | Nolan et al. |
| 5,260,941 A | 11/1993 | Wilder et al. |
| 5,262,875 A | 11/1993 | Mincer et al. |
| 5,283,637 A | 2/1994 | Goolcharan |
| 5,293,619 A | 3/1994 | Dean |
| 5,303,343 A | 4/1994 | Ohya et al. |
| 5,315,633 A | 5/1994 | Champa |
| 5,319,795 A | 6/1994 | Hamabe et al. |
| 5,323,472 A | 6/1994 | Falk |
| 5,325,423 A | 6/1994 | Lewis |
| 5,333,133 A | 7/1994 | Andrews et al. |
| 5,333,299 A | 7/1994 | Kovai et al. |
| 5,335,321 A | 8/1994 | Harney et al. |
| 5,341,374 A | 8/1994 | Lewen et al. |
| 5,345,258 A | 9/1994 | Matsubara et al. |
| 5,351,276 A | 9/1994 | Doll, Jr. et al. |
| 5,353,398 A | 10/1994 | Kitahara et al. |
| 5,363,441 A | 11/1994 | Feiner et al. |
| 5,363,507 A | 11/1994 | Nakayama et al. |
| 5,365,265 A | 11/1994 | Shibata et al. |
| 5,367,629 A | 11/1994 | Chu et al. |
| 5,373,549 A | 12/1994 | Bales et al. |
| 5,374,952 A | 12/1994 | Flohr |
| 5,375,068 A | 12/1994 | Palmer et al. |
| 5,379,374 A | 1/1995 | Ishizaki et al. |
| 5,382,972 A | 1/1995 | Kannes |
| 5,384,598 A | 1/1995 | Rodriguez et al. |
| 5,384,772 A | 1/1995 | Marshall |
| 5,386,581 A | 1/1995 | Suzuki et al. |
| 5,390,316 A | 2/1995 | Cramer et al. |
| 5,392,223 A | 2/1995 | Caci |
| 5,392,277 A | 2/1995 | Bernstein |
| 5,392,346 A | 2/1995 | Hassler et al. |
| 5,404,316 A | 4/1995 | Klingler et al. |
| 5,404,435 A | 4/1995 | Rosenbaum |
| 5,408,526 A | 4/1995 | McFarland et al. |
| 5,408,662 A | 4/1995 | Katsurabayashi |
| 5,410,595 A | 4/1995 | Park et al. |
| 5,416,618 A | 5/1995 | Juday |
| 5,422,883 A | 6/1995 | Hauris et al. |
| 5,432,525 A | 7/1995 | Maruo et al. |
| 5,440,624 A | 8/1995 | Schoof, II |
| 5,444,476 A | 8/1995 | Conway |
| 5,467,288 A | 11/1995 | Fasciano et al. |
| 5,471,318 A | 11/1995 | Ahuja et al. |
| 5,473,679 A | 12/1995 | La Porta et al. |

| | | |
|---|---|---|
| 5,475,421 A | 12/1995 | Palmer et al. |
| 5,477,546 A | 12/1995 | Shibata et al. |
| 5,485,504 A | 1/1996 | Ohnsorge |
| 5,491,695 A | 2/1996 | Meagher et al. |
| 5,506,954 A | 4/1996 | Arshi et al. |
| 5,515,491 A | 5/1996 | Bates et al. |
| 5,517,652 A | 5/1996 | Miyamoto et al. |
| 5,526,024 A | 6/1996 | Gaglianello et al. |
| 5,550,966 A | 8/1996 | Drake et al. |
| 5,553,222 A | 9/1996 | Milne et al. |
| 5,561,736 A | 10/1996 | Moore et al. |
| 5,565,910 A | 10/1996 | Rowse et al. |
| 5,581,702 A | 12/1996 | McArdle |
| 5,590,128 A | 12/1996 | Maloney et al. |
| 5,594,495 A | 1/1997 | Palmer et al. |
| 5,602,580 A | 2/1997 | Tseng |
| 5,608,653 A | 3/1997 | Palmer et al. |
| 5,610,972 A | 3/1997 | Emery et al. |
| 5,623,690 A | 4/1997 | Palmer et al. |
| 5,659,369 A | 8/1997 | Imaiida |
| 5,689,553 A | 11/1997 | Ahuja et al. |
| 5,719,786 A | 2/1998 | Nelson et al. |
| 5,751,336 A | 5/1998 | Aggarwal et al. |
| 5,777,663 A | 7/1998 | Shibata et al. |
| 5,796,727 A | 8/1998 | Harrison et al. |
| 5,815,233 A | 9/1998 | Morokawa et al. |
| 5,864,844 A | 1/1999 | James et al. |
| 5,872,923 A | 2/1999 | Schwartz et al. |
| 5,881,168 A | 3/1999 | Takaoka et al. |
| 6,181,867 B1 | 1/2001 | Kenner et al. |
| 6,336,143 B1 | 1/2002 | Diedrich et al. |
| 6,343,314 B1 | 1/2002 | Ludwig et al. |
| 6,577,324 B1 | 6/2003 | Palmer et al. |
| 7,152,093 B2 | 12/2006 | Ludwig et al. |

FOREIGN PATENT DOCUMENTS

| | | |
|---|---|---|
| EP | 0 190 060 | 8/1986 |
| EP | 0 354 370 | 2/1990 |
| EP | 376588 | 7/1990 |
| EP | 0 403 118 | 12/1990 |
| EP | 410378 | 1/1991 |
| EP | 0 414 222 | 2/1991 |
| EP | 0 436 345 | 7/1991 |
| EP | 0 453 128 | 10/1991 |
| EP | 0 497 022 | 8/1992 |
| EP | 0 516 371 | 12/1992 |
| EP | 0 523 618 | 1/1993 |
| EP | 0 523 626 | 1/1993 |
| EP | 0 535 601 | 4/1993 |
| EP | 0 548 597 | 6/1993 |
| EP | 561133 | 9/1993 |
| EP | 0 561 381 | 9/1993 |
| EP | 574138 | 12/1993 |
| EP | 0 604 053 | 6/1994 |
| JP | 62091045 | 4/1987 |
| JP | 1318136 | 12/1989 |
| JP | 2002441 | 1/1990 |
| JP | 2089482 | 3/1990 |
| JP | 2 285 759 | 11/1990 |
| JP | 5014525 | 1/1993 |
| JP | 6086276 | 3/1994 |
| WO | WO 9100664 | 1/1991 |
| WO | WO 9103116 | 3/1991 |
| WO | WO 9120149 | 12/1991 |
| WO | WO 9212583 | 7/1992 |
| WO | WO 9221211 | 11/1992 |
| WO | WO 9307703 | 4/1993 |
| WO | WO 9424803 | 10/1994 |

OTHER PUBLICATIONS

Kendall, et al., "Simulating the Cues of Spatial Hearing in Natural Environments," ICMC '84 Proceedings, 1984, pp. 111–125.

Kobayashi, et al., "Development and Trial Operation of Video Teleconference System," IEEE Globecom, pp. 2059–2063, 1999.

Lake, et al., "A Network Environment for Studying Multimedia Network Architecture and Control" (1989) IEEE, pp. 1232–1236.

Leffler, Samuel J., et. al., An Advanced 4.4BSD interprocess Communication Tutorial, 1986, Computer Systems Research Group, Department of Electrical Engineering and Computer Science, University of California, Berkeley, The Regents of the University of California, pp. 1–44.

Maeno, K., et al., "Distributed Desktop Conferencing System (Mermaid) Based on Group Communication Architecture," IEEE, ICC '91 CH2984–3/91/0000–0520, © 1991, pp. 0520–0525.

Masaki, S., et al. "Multimedia Handling Scheme in a Groupware System for B–ISDN," Globecom '92 pp. 747–751, Dec. 1992.

Rangan, P.V. et al. "Designing an On–Demand Multimedia Service", Jul. 1992, IEEE Communications Magazine, vol. 30, No. 7, pp. 56–64.

Rowe, L. and Smith, B., "A Continuous Media Player", Nov. 1992, In Proc. 3rd Int. Workshop on Network and Operating System Support for Digital Audio and Video, pp. 1–15.

16.2 IPv4: The Internet Protocol Version 4.

Addeo, et al., "An Experimental Multi–Media Bridging System", ACM 1988.

Addeo, et al., "Personal Multi–media Multi–point Communications Services for Broadband Networks", IEEE CH2535–3/88/0000–0053 1988.

Ahuja, et al., "Coordination and Control of Multimedia Conferencing," IEEE Communication Magazine, pp. 38–42, May 1992.

Ahuja, et al., "The Rapport Multimedia Conferencing System", Conference on Office Information Systems, Mar. 1988.

Ahuja, et al., A Comparison of Application Sharing Mechanisms in Real–Time Desktop Conferencing Systems, 1990.

Ahuja, et al., Networking Requirements of the Rapport Multimedia Conferencing System, 1988 IEEE.

Andersen, Plato People: Term–talk: Plato's Instant Messaging, Dec. 19, 2002.

Anderson, D. P. and Homsy, G., "A Continuous Media I/O Server and Its Synchronization Mechanism", Oct. 1991, Computer 24, 10 (Oct. 1991), 51–57.

Banks, Michael A., "America Online: A Graphics–based Success" Link–Up, Jan./Feb. 1992.

Bellcore News, "IMAL Makes Media Merging Magic," 5(20), Nov. 9, 1988.

Belville, Sharon, "Zephyr on Athena," Massachusetts Institute of Technology, ver. 3, Sep. 10, 1991.

Biswas, et al., "Distributed Scheduling of Meetings: A Case Study in Prototyping Distributed Application," System Integration, 1992 2.sup.nd International Conference.

Boll, et al., "Suppression of Acoustic Noise in Speech Using Two Microphone Adaptive Noise Cancellation," IEEE Transactions on Acoutics, Speech, and Signal Processing, vol. ASSP–28, No. 6, Dec. 1980.

Cheng, et al., "A model for secure distributed computations in a heterogeneous environment," Proc. Of the Aerospace Computer Security Applications Conference, Orlando, Dec. 12–16, 1988, Washington, IEEE Comp., Soc. Press, US, vol. Conf. 4, p. 233–241.

Chu, P.L., Picture Tel Corporation, "Audio Compression and Echo Cancellation for Low Bit Rate Video Teleconferencing", Applications of Signal Process to Audio and Acoustics, Oct. 1991.

Cohen, et al., "Audio Windows for Binaural Telecommunciation," EIC, Tokyo (Oct. 1991).

Cohen, et al., "Audio Windows: User Interface for Manipulating Virtual Acoustic Environments,"pp. 479–480.

Cohen, et al., "Design and Control of Shared Conferencing Environments for Audio Telecommunication," Proceedings of the Second Int'l Symposium on Measurement and Control Robotics (ISMCR '92), Tsukuba Science City, Japan, (Nov. 15–19, 1992), pp. 405–412.

Cohen, et al., "Exocentric Control of Audio Imaging in Biaural Telecommunication," IEICE Trans. Fundamentals, vol. E75–A, No. 2, (Feb. 1992).

Cohen, et al., "Multidimensional Audio Window Management," Int'l Journal of Man–Machine Studies, vol. 34: 319–336 (1991).

Cohen, et al., "Multidimensional Audio Windows: Conference, Concerts and Cocktails," Human Factors Society Meeting, SF, CA, pp. 1–5, Jun. 12, 1991.

Crawford, et al., "Videomatic Switching: System and Services", Digital Communications, 1988 Int. Zurich Seminar 1988.

Crowley, et al., "MMConf: An Infrastructure for Building Shared Multimedia Applications," CSCW 90 Proceedings, Oct. 1990.

DellaFera, et al. "The Zephyr Notification System," Proceedings of the USENIX Winter Technical Conference, Feb. 1988.

Edwards, W. Keith, "The Design and Implementation of the Montage Multimedia Mail System," Communication Software, IEEE TRICOMM '91 Proceeding (Apr. 1991).

Ellis, et al., "Groupware, Some Issues and Experiences", Communications of the ACM, Jan. 1991.

Elrod, S., et al. "Liveboard: A Large Interactive Display Supporting Group meetings, Presentations and Remote Collaboration" CHI '92 (May 3–7, 1992), 1992 ACM at 599–607.

Ensor, et al., "The Rapport Multimedia Conferencing System—Software Overview," Computer Workstation Conference, IEEE, pp. 52–58, 1988.

Ensor, et al., The Rapport Multimedia Communication System (Demonstration), May 1992.

Ensor et al., "User Interfaces For Multimedia Multiparty Communications," IEEE International Conference on Communications ICC '93, pp. 1164–1171, May 23–26, 1993.

Ensor, J.R., et al., "Control Issues in Multimedia Conferencing," IEEE, CH2955–3/91/0000–0133, 1991.

Fitzpatrick, et al., "Smart Icons for Address Book Detailed View Entries," IBM Technical Disclosure Bulletin, Dec. 1992.

FreeBSD Hypertext Man Pages: rwho, Jun. 6, 1993, 1 pg.
FreeBSD Hypertext Man Pages, Login(1), 4th Berkeley Distribution, Jun. 29, 1991, 3 Pgs.
FreeBSD Hypertext Man Pages, UTMP(5), 4th Berkeley Distribution, May 5, 1991, 3 Pgs.

FreeBSD Hypertext Man Pages, Who(1), Apr. 23, 1991, 2 pgs.
FreeBSD Hypertext Man Pages: rwhod, Dec. 11, 1993, 3 Pgs.

Furner, et al., "An ISDN Multipoint Teleconferencing Environment", IEEE Journal on Selected Areas in Communications, vol. 9, May 1991.

Gibbs, "Liza: An Extensible Groupware Toolkit", Human Factors in Computing Systems, CHI 89 Conference Proceedings, May 1989.

Goldberg, et al., "Active Mail: An Architecture for Groupware", Technical Report CS92–1? Weizmann Institute of Science, Oct. 1992.

Gopal, et al. "Directories for networks with casually connected user", IEEE pp. 1060–1064, 1988.

Greenberg, et al., "Issues and Experiences Designing and Implementing Two Group Drawing Tools", Groupware and Computer–Supported Cooperative Work, 1992.

Harris, et al., "Intelligent Network Realization and Evolution: CCITT Capability Set 1 and Beyond," Proceedings of the International Switching Symposium. Yokohama, Oct. 25–30, 1992, Tokyo, IEICE, JP, vol. 2, Symp. 14, p. 127–131, XP000337709.

Harvey, et al. "Some Aspects of Steeophony Applicable to Conference Use", Journal Audio Engineering Society, Jul. 196 v.11, pp. 212–217, 1963.

Hasebe, K. and Yamaguchi, K., "Continuous Media Network Server", Apr. 1992, in: Proceedings of SPIE, vol. 1662, pp. 291–298.

Hill, G. "Improving Audio Quality: Echo Control in Video–Conferencing", Teleconference, Mar.–Apr. 1991.v. 10, n.2, pp. 29–43.

Horn, et al., "An ISDN Multimedia Conference Bridge", TENCON '90–1990 IEEE Region 10 Conference on Computer and Communication, pp. 853–856, 1990.

Hoshi, et al., "B–ISDN Multimedia Communication and Collaboration Platform Using Advanced Video Workstations to Support Cooperative Work," Dec. 1992.

IBM TDB0992, "Public Nicknames in OS/2 Office Address Book,"Sep. 1992.

IBM TDB1192, "Public Search Lists in OS/2 Office Address Book," Nov. 1992.

Ishii, et al., "Beyond Videophones: TeamWorkStation–2 for Narrowband ISDN", Proceedings of the 3rd European Conference on Computer–Supported Cooperative Work, Sep. 1993.

Ishii, H. "TeamWorkstation: Towards a Seamless Shared Workspace", CSCW 90 Proceedings, pp. 13–26, Oct. 1990.

Ishii, H., et al. "Clearboard: A seamless Medium for Shared Drawing and Conversation with Eye Contact," CHI p92 (May 3–7, 1992), 1992 ACM at 525–532.

Ishii, H., et al. "Toward an Open Shared Workspace: Computer and Video Fusion Approach of TeamWorkstation," Communication of the ACM, vol. 34, No. 12, pp. 37–50. Dec. 1991.

Jack Terry, Alternative Technologies and Delivery Systems for Broadband ISDN Access, Aug. 1992, Communications Magazine, IEEE, vol. 30, Issue 8, pp. 58–64.

Kippenhan, et al., "Videoconferencing in the Energy Research Community," National HEPnet Management, Fermi National Accelerator Laboratory, Aug. 1992.

Kirsche, et al., "Communication support for cooperative work" Computer Communications, Sep. 1993.

Koszarek, et al., "A Multi–User Document Review Tool," Multiuser Interfaces and Applications, 1990, p. 207–214.

Lantz, An Experiment in Integrated Multimedia Conferencing, Department of Computer Science, Stanford University, Stanford, CA 94035, Dec. 1986.

Lantz, et al., Collaboration Technology Research at Olivetti Research California, Aug. 1989.

Lauwers, et al., Collaboration Awareness in Support of Collaboration Transparency: Requirements for the Next Generation of Shared Windows Systems, (Olivetti Research California) Version of Apr. 1989.

Lauwers, et al., Replicated Architecture for Shared Window Systems: A Critique, (Olivetti Research California), CHI 90 Proceedings, Version of Apr. 1990.

Leung, et al., "Optimum Connection Paths for a Class of Videoconferences", IEEE 1991.

Lichty, Tom, "America Online Tour Guide", MacIntosh Edition, Version 2, Title Page, Copyright Page, Foreword, xviii, pp. 5–6, 24–44, 67, 69, 70–72, 229–253, 297–298, 373, 375–376, and 388, Ventana Press, 1992.

Ludwig, et al., "Laboratory For Emulation and Study of Integrated and Coordinated Media Communication," Bell Communications Research, 1988.

Ludwig, "Integration of CAD/CAE With Multimedia Teleconferencing and Messaging Via Broadband Networks and Shared Resource Servers", 1990 IEEE.

Ludwig, Lester, "A Threaded/Flow Approach to Reconfigurable Distributed Systems and Service Primitives Architectures," Frontiers in Computer Communications Technology, Sigcom '87 Workshop (Aug. 11–13, 1987).

Maeno, et al., Distributed Desktop Conferencing System (Mermaid) Based on Group Communication Architecture, The Transactions of the Institute of Electronics, Information and Comm. Engineers E74 (1991) Sep., No. 9, Tokyo, JP.

Marshak, Ronni T. "Beyond Mail for Windows—epitomizing the mail–enabled application", Patricia Seybold's Office Computing Report, Sep. 1992 v15 n9. (full text copy from Computer Select 1992 CD).

Martens, et al., "Principal Components Analysis and Resynthesis of Spectral Cues to Perceived Direction," Proc. Of the 1987 Int'l Computer Music Conference, Illinois.

Masaki, et al., "A Desktop Teleconferencing Terminal Based on B–ISDN: PMTC," NTT Review, 4 (4) :81–85, 1992.

Naganawa, et al., "A Study of Audio Communication Devices for ISDN," IEEE Transactions of Consumer Electronics, IEEE Inc. New York, vol. 36, No. 3, Aug. 1, 1990, p. 753–757.

Nakamura, et al., "Personal Multimedia Teleconferencing Terminal,"IEEE, 1990.

Newman–Wolfe, et al., "A Brief Overview of the DCS Distributed Conferencing System", USENIX Summer 1991 Technical Conference Proceedings.

Nunokawa, et al., "Teleconferencing Using Stereo Voice and Electronic OHP", IEEE 1988.

Ohkubo, M., et al., "Design and implementation of a shared workspace by integrating individual workspaces," Conferencing on Supporting Group Work Proceedings of the conference on Office information systems, pp. 142–146, 1990.

P. V. Rangan and H. M. Vin, "Designing file systems for digital video and audio", 1991, in: Proc. of the Thirteenth ACM Symposium on Operating System Principles, pp. 81–94.

Pascoe, R.A., "Interactive Computer Conference Server" IBM Technical Disclosure Bulletin, vol. 34, No. 7A, Dec. 1991.

Pate "Trends in Multimedia Applications and The Network Models to Support Them", Globecom's 90:, 1990.

Perkins, "Spider: An investigation in collaborative technologies and their effects on network performance" 1991.

Poggio, et al., "CCWS: A Computer–Based, Multimedia Information System Computer"—Oct. 1985.

Rangan, et al. "Media synchronization in distributed multimedia file systems," Multimedia Communications, 1992 pp. 315–328.

Rangan, et al., "A Window–Based Editor for Digital Video and Audio," System Sciences, 1992 Hawaii Int'l Conference (1992).

Rangan, et al., "Software Architecture for Integration of Video Services in the, etherphone System," IEEE Journal on Selected Areas in Communications, vol. 9, No. 9, Dec. 1991, pp. 1395–1404.

Sakata, et al., "Development and Evaluation of an In–House Multimedia Desktop Conference System," NEC Research & Development No. 98, pp. 107–117, Jul. 1990.

Sammartino, et al., "Desktop Multimedia Communications—Breaking the Chains," IEEE, 1991.

Saunders, S., "Economical Video Network Uses Unshielded Twisted–Pair Wiring," Data Communications, McGraw Hill., New York, vol. 19, No. 10, p. 103–104, Aug. 1, 1990.

Schooler, Eve M., "A Distributed Architecture for Multimedia Conference Control," ISI/RR–91–289, USC/Information Sciences Institute, Nov. 1991.

Schooler, Eve M., Steven L. Casner, A Packet–switched Multimedia Conferencing System, ACM SIGOIS Bulletin, vol. 1, No. 1, pp. 12–22, Jan. 1989.

Shepherd, et al., "Strudel—An Extensible Electronic Conversation Toolkit", Proceedings of the Conference on Computer–Supported Cooperative Work, Oct. 1990.

Soares, et al., "LAN Based Real Time Audio–Graphics Conferencing System", IEEE Infocom 1989 Proceedings, vol. II.

Stevens, A. I., "The Lotus Open Message Interface," Dr. Dobbs Journal, Mar. 1992.

Swinehart, Daniel C. "Systems Support Requirements for Multi–Media Workstations," Xerox PARC, CSL–89–2, 1989.

Swinehart, Daniel C. "Telephone Management in the Etherphone System,"Xerox PARC, CSL–89–2, May 1989, pp. 1–5.

Tanigawa, H., et al. "Personal Multimedia–Multipoint Teleconference System," Proc. IEEE INFOCOM '91, pp. 1127–1134, 1991.

Terry and Swinehart, "Managing Stored Voice in the Etherphone System," Xerox PARC, CSL–89–2, 1989.

The Challenges of Networking Video Applications, Starlight Networks, Inc., Feb. 1992.

Velthuijsen, Hugo, "Distributed Artificial Intelligence for Runtime Feature–Interaction Resolution," Computer, vol. 26, No. 8, Aug. 1993, p. 48–55.

Vin, et al. "Multimedia Conferencing in the Etherphone Environment", Computer Magazine V.24 Iss. 10 pp. 69–79, Oct. 1991.

Vin, et al., Heirarchical Conferencing Architecture for Inter–Group Multimedia Collaboration, Multimedia Laboratory Department of Computer Science and Engineering University of California at San Diego, La Jolla, 1991.

Watabe, et al., "A Distributed Multiparty Desktop Conferencing System and Its Architecture", IEEE 1990.

Watabe, et al., "Distributed Desktop Conferencing System with Multiuser Multimedia Interface", IEEE Journal on Selected Areas in Communications, vol. 9, No. 4, May 1991, pp. 531–539.

Watabe, K., et al., "Distributed Multiparty Desktop Conferencing System: Mermaid," CSCW 90 Proceedings, pp. 27–38, Oct. 1990.

Weiss, C., "Desk Top Video Conferencing—An Important Feature of Future Visual Communications," ICC 90, pp. 134–139, 1990 Munich—West Germany.

Whitmyer, Claude, "Groupware: The Software for Collaboratiive Computing," The Office, Jun. 1989, p. 28.

Zellweger, "Active Paths through Multimedia Documents," Xerox PARC, CSL–89–2, 1989.

Zellweger, et al., "An Overview of the Etherphone System and Its Applications", 1988, In Proceedings of the 2nd IEEE Conference on Computer Workstations, p. 160–168.

Zimmerman, The Finger User Information Protocol, RFC 1288, Dec. 1991.

Ahuja, S.R., Ensor, J. Robert, and Horn, David N., The Rapport Multimedia Conferencing System, ACM Proceedings Conference on Office Information Systems, pp. 1–8 (1988).

Ahuja, S.R., Ensor, J.R., and Luco, S.E., A Comparison of Application Sharing Mechanisms in Real–Time Desktop Conferencing Systems, Communications of the ACM, pp. 238–248 (1990).

Ensor, J.R., Ahuja, S.R., Connaghan, R.B., Pack, M., and Seligmann, D.D., The Rapport Multimedia Conferencing System (Demonstration), CHI '92, May 3–7, pp. 581–582 (1992).

Ahuja, S.R. and Ensor, J.R., Coordination and Control of Multimedia Conferencing, IEEE Communications Magazine, pp. 38–43 (May 1992).

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 23 and 24 are cancelled.

Claims 1–22 were not reexamined.

* * * * *